United States Patent
Han et al.

(10) Patent No.: US 11,861,930 B2
(45) Date of Patent: Jan. 2, 2024

(54) DISPLAY PANEL AND DISPLAY DEVICE USING THE SAME

(71) Applicant: LG Display Co., Ltd., Seoul (KR)

(72) Inventors: Man Hyeop Han, Paju-si (KR); Joung Mi Choi, Paju-si (KR); Seung Taek Oh, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/397,346

(22) Filed: Aug. 9, 2021

(65) Prior Publication Data

US 2022/0075979 A1 Mar. 10, 2022

(30) Foreign Application Priority Data

Sep. 7, 2020 (KR) ........................ 10-2020-0113876

(51) Int. Cl.
*G06V 40/13* (2022.01)
*G09G 3/3275* (2016.01)
*G09G 3/3233* (2016.01)

(52) U.S. Cl.
CPC ....... *G06V 40/1318* (2022.01); *G09G 3/3233* (2013.01); *G09G 3/3275* (2013.01); *G09G 2300/0443* (2013.01); *G09G 2300/0452* (2013.01); *G09G 2310/027* (2013.01); *G09G 2310/08* (2013.01)

(58) Field of Classification Search
CPC .. G06V 40/1318; G06V 40/13; G09G 3/3233; G09G 3/3275; G09G 2300/0443; G09G 2300/0452; G09G 2310/027; G09G 2310/08; G09G 2300/0426; G09G 2340/0407; G09G 2354/00; G09G 2360/14; G09G 3/3208; H01L 27/3225; H01L 27/1222; H01L 27/3218; H01L 27/326

See application file for complete search history.

(56) References Cited

U.S. PATENT DOCUMENTS

| | | | |
|---|---|---|---|
| 10,229,637 B2 | 3/2019 | Ka et al. | |
| 2017/0289805 A1 | 10/2017 | Hong | |
| 2017/0294491 A1* | 10/2017 | Jo | ........................ H10K 59/131 |
| 2017/0300736 A1* | 10/2017 | Song | .................. G06V 40/1312 |
| 2017/0345367 A1 | 11/2017 | Ka et al. | |
| 2019/0087628 A1* | 3/2019 | Choe | .................. G06V 40/1365 |
| 2019/0157337 A1* | 5/2019 | Lin | .................... G06V 40/1318 |
| 2020/0110918 A1* | 4/2020 | Zhang | .................... G06F 1/1684 |
| 2021/0027751 A1* | 1/2021 | Tang | ...................... G09G 5/391 |
| 2021/0066669 A1* | 3/2021 | Kubota | ............... H01L 51/5246 |

(Continued)

FOREIGN PATENT DOCUMENTS

| KR | 10-2017-0113361 A | 10/2017 |
|---|---|---|
| KR | 10-2017-0136128 A | 12/2017 |
| KR | 10-2019-0090241 A | 8/2019 |

*Primary Examiner* — Roberto W Flores
(74) *Attorney, Agent, or Firm* — Fenwick & West LLP

(57) ABSTRACT

The present disclosure relates to a display panel and a display device using the same. The display panel includes a plurality of first unit pixel areas in which N subpixels (N is a positive integer greater than or equal to 3) for displaying data are disposed, and a plurality of second unit pixel areas in which N-1 subpixels for displaying data are disposed. Each of the first unit pixel areas and each of the second unit pixel areas have the same size. Each of the first and second unit pixel areas is a pixel area in a parallelogram or rhombus shape.

21 Claims, 33 Drawing Sheets

(56) References Cited

U.S. PATENT DOCUMENTS

| | | | |
|---|---|---|---|
| 2021/0158751 A1* | 5/2021 | Cha | G06V 40/1318 |
| 2021/0191552 A1* | 6/2021 | Bok | G06F 1/1658 |
| 2022/0214761 A1* | 7/2022 | Kang | H10K 59/65 |
| 2023/0117024 A1* | 4/2023 | Kubota | H10K 39/34 |
| | | | 257/40 |

* cited by examiner

DISPLAY PANEL AND DISPLAY DEVICE USING THE SAME

CROSS-REFERENCE TO RELATED APPLICATION

This application claims priority to and the benefit of Republic of Korea Patent Application No. 10-2020-0113876, filed Sep. 7, 2020, the disclosure of which is hereby incorporated by reference in its entirety.

BACKGROUND

1. Field

The present disclosure relates to a display panel having display pixels and a fingerprint sensor arranged on the same layer, and a display device using the same.

2. Discussion of Related Art

Electroluminescent display devices are roughly classified into inorganic light emitting display devices and organic light emitting display devices depending on the material of the emission layer. The organic light emitting display device of an active matrix type includes an organic light emitting diode (hereinafter, referred to as "OLED") that emits light by itself, and has an advantage in that the response speed is fast, the luminous efficiency and luminance are good, and the viewing angle is wide. In the organic light emitting display device, an organic light emitting diode (OLED) is formed in each pixel. The organic light emitting display device has a fast response speed, is excellent in terms of luminous efficiency, luminance and viewing angle, and provides an excellent contrast ratio and color reproducibility since it can express the black grayscale in complete black.

Recently, there is a trend that organic light emitting display devices are widely applied as display devices of mobile terminals. Biometric recognition technology is being applied to authentication of users in mobile terminals. As an example of biometric recognition technology, fingerprint sensors are widely applied to smartphones because they provide security and convenience in a user authentication process. A fingerprint sensor applied to a smartphone senses a user's fingerprint when screen unlocking or user authentication is required.

The fingerprint sensor may place many restrictions on the screen design of a smartphone. For example, the existing button-type fingerprint sensor disposed under the screen of the display device has been an obstacle that makes it nearly impossible to implement a full-screen display by increasing the screen size. To implement a full screen display, fingerprint-on-display (FoD) technology is being developed in which the fingerprint sensor is disposed under the display panel and a fingerprint is sensed on the screen. Since the fingerprint sensor module has to be placed under the screen to implement FoD technology, the thickness of the display device is increased and the assembly process of the display panel and the fingerprint sensor module is added, causing a problem of lowering the yield and increasing the manufacturing cost.

SUMMARY

An object of the present disclosure is to solve the aforementioned necessity and/or problem.

The present disclosure provides a display panel that does not require an assembly process for the display panel and a fingerprint sensor module and can improve the image quality of the fingerprint sensing area and the fingerprint sensing performance, and a display device using the same.

The present disclosure provides a mobile terminal including the above display device.

The objects of the present disclosure are not limited to those mentioned above, and other objects not mentioned will be clearly understood by those skilled in the art from the following description.

A display panel of the present disclosure includes: a plurality of first unit pixel areas; and a plurality of second unit pixel areas.

Each of the first unit pixel areas includes N (N is a positive integer equal to or greater than 3) subpixels displaying data. Each of the second unit pixel areas includes N−1 subpixels displaying data.

The first unit pixel areas are arranged at equal intervals in a first direction and a second direction crossing the first direction. The second unit pixel areas are arranged at equal intervals in the first direction and the second direction.

Each of the first unit pixel areas and each of the second unit pixel areas have the same size, and each of the first and second unit pixel areas is a pixel area in a parallelogram or rhombus shape.

A display device of the present disclosure includes the above display panel and a display panel driver configured to write the data to the pixels.

A mobile terminal of the present disclosure includes: a display panel that includes a plurality of first unit pixel areas in which N subpixels (N is a positive integer greater than or equal to 3) for displaying data are disposed, and a plurality of second unit pixel areas in which N−1 subpixels for displaying data and one sensor pixel are disposed; a display panel driver configured to write the data to the pixels; a fingerprint recognition processor configured to amplify an output signal of sensor pixels of the second unit pixel areas, convert it into digital data, and output fingerprint pattern data; and a host system configured to supply data of an input image to the display panel driver, receive the fingerprint pattern data from the fingerprint recognition processor, and process fingerprint authentication.

In the present disclosure, sensor pixels for sensing a fingerprint are embedded together with display pixels in the display panel. In the present disclosure, the structure of the display panel can be simplified by allowing the pixel driving circuit and the sensor driving circuit to share the power wire and the signal wire and by disposing the electrodes of the light emitting element and the photodiode on the same layer.

In the present disclosure, when display pixels and sensor pixels are arranged on the same layer, the resolution of the sensor pixels capable of recognizing a fingerprint can be secured within the resolution limit of a fine metal mask (FMM).

In the present disclosure, it is possible to reduce the difference in luminance between areas having different resolutions or PPIs by controlling the amount of current in the light emitting element differently for different areas, by designing the channel ratio in the transistor for driving the light emitting element differently for different areas, or by designing the emission area of the light emitting element differently for different areas.

The effects of the present disclosure are not limited to those mentioned above, and other effects that are not mentioned will be clearly understood by those skilled in the art from the description of the claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
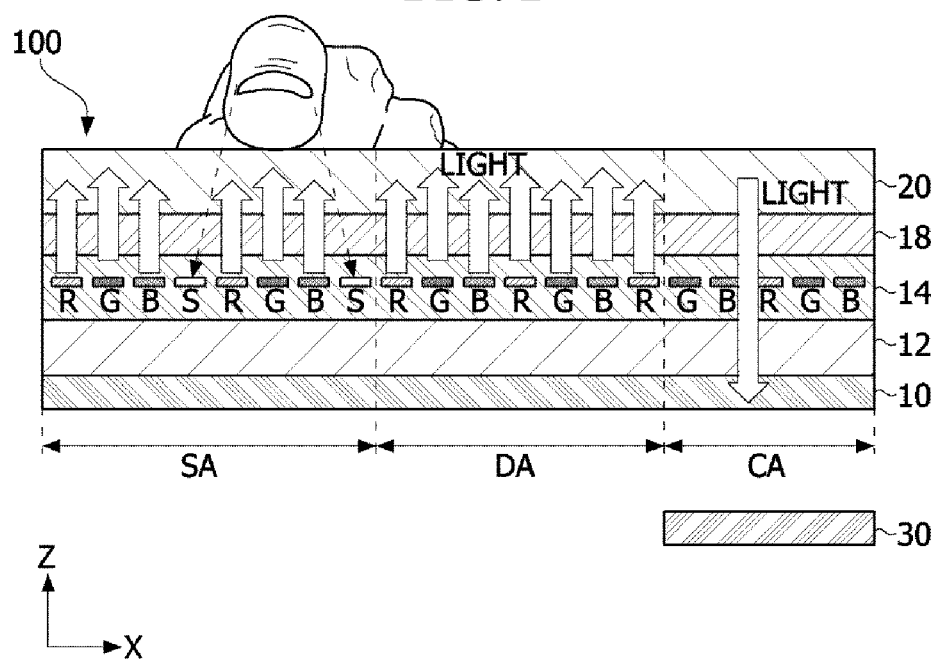
FIG. 1 is a diagram schematically showing a display device according to an embodiment of the present disclosure.

Advantages and features of the present disclosure, and the method for achieving them will become apparent from the embodiments described below in detail together with the accompanying drawings. However, the present disclosure is not limited to the embodiments disclosed below but will be carried out in various forms, these embodiments are provided merely to complete the present disclosure and to fully inform the scope of the invention to those of ordinary skill in the art to which the present disclosure pertains, and the present disclosure is defined only by the scope of the claims.

The shape, size, ratio, angle, and number shown in the drawings for explaining the embodiments of the present disclosure are exemplary, and thus the present disclosure is not limited to the illustrated matters. The same reference symbols refer to the same elements throughout the specification. Additionally, in the description of the present disclosure, when it is determined that a detailed description of a related known technology may unnecessarily obscure the subject matter of the present disclosure, a detailed description thereof will be omitted.

In the present specification, when 'include', 'have', 'composed of', and the like are used, other parts may be added unless 'only' is used. The singular forms are intended to include the plural forms as well, unless the context clearly indicates otherwise.

Components are interpreted as including an error range even if there is no explicit description.

In the description of a positional relationship, when the positional relationship of two parts is described by, for example, 'on', 'above', 'under', and 'next to', one or more other parts may be placed between the two parts unless 'immediately' or 'directly' is used.

In the description of embodiments, the terms 'first' and 'second' may refer to various elements regardless of importance and/or order and are used to distinguish one element from another element without limitation. Hence, a first component may be denoted as a second component, and vice versa without departing from the scope of the present disclosure.

The same reference symbols refer to the same elements throughout the specification.

Features of various embodiments can be integrated or combined with each other in part or in whole and can be technically associated and driven in various ways, and the embodiments may be carried out independently or may be carried out together in a related relationship.

Hereinafter, various embodiments of the present disclosure will be described in detail with reference to the accompanying drawings.

With reference to FIG. 1, the screen of the display panel 100 includes a pixel array on which an input image is reproduced. The pixel array includes a display area DA, and first sensing area SA and second sensing area CA.

Display pixels R, G and B of a first group to which pixel data is written are disposed in the display area DA. Display pixels R, G and B of a second group including sensor pixels S are disposed in the first sensing area SA. Display pixels R, G and B of a third group are disposed in the second sensing area CA.

The display area DA includes display pixels R, G and B arranged at a high resolution or high pixels-per-inch (PPI) to display input data. The input data may be pixel data of an input image or data including various types of information.

The first and second sensing areas SA and CA include display pixels R, G and B arranged at a low resolution or low PPI compared to the display area DA, and display input data in the display mode.

The resolution or PPI of display pixels in the first sensing area SA may be lower than that in the display area DA. The first sensing area SA includes display pixels R, G and B to which pixel data is written, and pixels of an image sensor sensing a fingerprint pattern (hereinafter, referred to as "sensor pixels"). Each of the sensor pixels S includes a photoelectric conversion element, for example, a photodiode.

The first sensing area SA displays input data through display pixels in the display mode. The first sensing area SA senses a fingerprint using sensor pixels in the fingerprint recognition mode. In the first sensing area SA, the display pixels R, G and B and the sensor pixels S share most wires and have a similar cross-sectional structure. Wires necessary for driving the display pixels R, G, and B of the first group and second group are shared between the display area DA and the first sensing area SA.

In the first sensing area SA, the display pixels R, G and B and the sensor pixels S may be arranged on the same plane. The PPI of the display pixels in the sensing area SA may be lower than that of the display pixels in the display area DA due to the portion occupied by the sensor pixels S.

The display pixels R, G and B and the sensor pixels S in the first sensing area SA may be simultaneously formed without a process added to the existing manufacturing process.

The resolution or PPI of display pixels in the second sensing area CA may be lower than that in the display area DA. The resolution or PPI of display pixels in the second sensing area CA may be the same as that in the first sensing area SA. The second sensing area CA includes display pixels R, G and B embedded in the display panel 100, and at least one optical sensor 30 disposed outside the display panel 100. The optical sensor 30 may be disposed under (or, on the rear surface of) the display panel 100 within the second sensing area CA so that the light-receiving surface faces the second sensing area CA.

The display pixels of the second sensing area CA are disposed on the same plane as the display pixels of the display area DA and the first sensing area SA. In the display mode, pixel data is written to the display pixels of the second sensing area CA, which then display an input image.

The optical sensor 30 disposed in the second sensing area CA may include one or more of an imaging element such as a camera, an infrared sensor, and an illuminance sensor. To reproduce an input image and increase the light transmittance, the second sensing area CA may include low PPI display pixels and light transmitting portions. Wires necessary for driving the first and third groups of display pixels R, G and B are shared among the display pixels R, G and B of the second sensing area CA.

The second sensing area CA displays input data through display pixels in the display mode. The optical sensor 30 disposed in the second sensing area CA is driven in the sensing mode. For example, the optical sensor 30 may receive light through the second sensing area CA and photoelectrically convert it to capture an image of an external environment or sense external illuminance.

The resolution of PPI of the first and second sensing areas SA and CA is less than that of the display area DA. To eliminate a difference in image quality between the sensing areas SA and the display area DA, an image quality compensation algorithm for compensating for luminance and color coordinates may be applied to pixel data to be written to the display pixels of the sensing areas SA and CA.

The display pixels R, G and B are arranged not only in the display area DA but also in the sensing areas SA and CA. Accordingly, the display device of the present disclosure can implement a full-screen display.

Each of the display pixels R, G and B arranged in the display area DA and the sensing areas SA and CA includes subpixels having different colors to implement the color of an image. The subpixels include a red subpixel (hereinafter, referred to as "R subpixel"), a green subpixel (hereinafter, referred to as "G subpixel"), and a blue subpixel (hereinafter, referred to as "B subpixel"). Although not shown, each of the pixels P may further include a white subpixel (hereinafter, referred to as "W subpixel"). Each of the subpixels includes a pixel circuit and a light emitting element. In FIG. 1, 'R' denotes an R subpixel, 'G' denotes a G subpixel, and 'B' denotes a B subpixel.

At least one of the display pixels of the first sensing area SA may be driven as a light source in the fingerprint recognition mode activated when a fingerprint recognition event occurs. In the fingerprint recognition mode, when the user places a fingerprint on the cover glass 20 of the sensing area SA, the light sources of the sensing area SA are turned on. The sensor pixels S of the sensing area SA are driven in the fingerprint recognition mode, and convert light reflected from the user's fingerprint contacted on the cover glass 20 into an electrical signal and transmit the electrical signal to a fingerprint recognition processor. The fingerprint recognition processor generates fingerprint pattern data by amplifying the output signals of the sensor pixels S and converting them into digital data. The host system omitted in FIG. 1 performs fingerprint authentication by comparing the fingerprint pattern data received from the fingerprint recognition processor with the pre-registered fingerprint pattern of the user.

The fingerprint recognition processor can be integrated with the timing controller that controls the operation timing of the display panel driver.

In the present disclosure, since a separate fingerprint sensor module is not adhered to the display panel 100, there is no decrease in yield caused by the assembly process of the display panel and the fingerprint sensor module, and the manufacturing cost can be lowered.

The display panel 100 has a width in the X-axis direction, a length in the Y-axis direction, and a thickness in the Z-axis direction. The display panel 100 includes a circuit layer 12 disposed on the substrate 10, a light emitting element and sensor layer 14 disposed on the circuit layer 12. A polarizing plate 18 may be disposed on the light emitting element and sensor layer 14, and a cover glass 20 may be disposed on the polarizing plate 18.

The circuit layer 12 may include a pixel circuit connected to data lines, gate lines and power lines, a gate driver for driving the gate lines, a sensor driving circuit, and the like. The circuit layer 12 may include circuit elements such as a transistor implemented with a thin film transistor (TFT), and a capacitor.

The light emitting element and sensor layer 14 may include a light emitting element driven by a pixel circuit. The light emitting element may be implemented with an OLED. The OLED may include an organic compound layer 14-2 formed between the anode electrode and the cathode electrode. The organic compound layer may include, but not limited to, a hole injection layer (HIL), a hole transport layer (HTL), an emission layer (EML), an electron transport layer (ETL), and an electron injection layer (EIL). When a voltage is applied to the anode electrode and cathode electrode of the OLED, holes passing through the hole transport layer (HTL) and electrons passing through the electron transport layer (ETL) move to the emission layer (EML) to form excitons, so that visible light is emitted from the emission layer (EML). The light emitting element and sensor layer 14 may further include color filters that are disposed on the circuit layer 12 to selectively transmit red, green, and blue wavelengths.

The light emitting element and sensor layer 14 includes a photodiode of the sensor pixel S formed on the same layer as the light emitting elements.

The light emitting element and sensor layer 14 may be covered with a protective layer, and the protective layer may be covered with an encapsulation layer. The passivation layer and the encapsulation layer may have a structure in which an organic film and an inorganic film are alternately stacked. The inorganic film blocks or at least reduces the penetration of moisture or oxygen. The organic film planarizes the surface of the inorganic film. When organic and inorganic films are stacked in multiple layers, the movement path of moisture or oxygen becomes longer compared with a single layer, so that the penetration of moisture/oxygen affecting the light emitting element and sensor layer 14 can be effectively blocked or at least reduced.

Touch sensor electrodes may be disposed on the light emitting element and sensor layer 14. The polarizing plate 18 may be adhered to the encapsulation layer. The polarizing plate 18 improves outdoor visibility of the display device. The polarizing plate 18 reduces light reflected from the surface of the display panel 100 and blocks light reflected from the metal of the circuit layer 12 to thereby improve the brightness of pixels. The polarizing plate 18 may be implemented as a polarizing plate or circular polarizing plate in which a linear polarizing plate and a phase retardation film are bonded.

Figure 2:
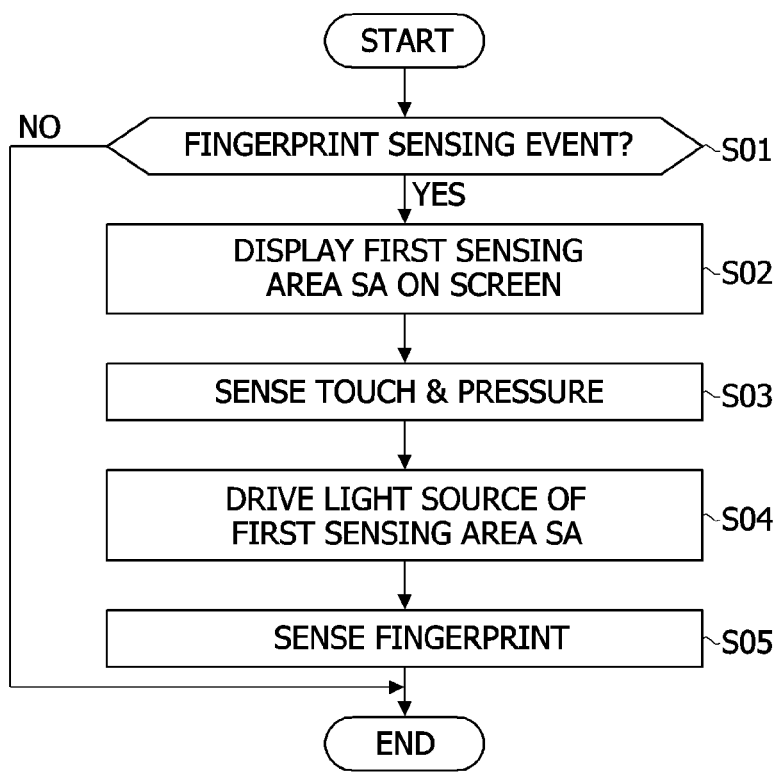
FIG. 2 is a flowchart illustrating a method for driving a first sensing area in the fingerprint recognition mode according to an embodiment of the present disclosure.
Figure 3:
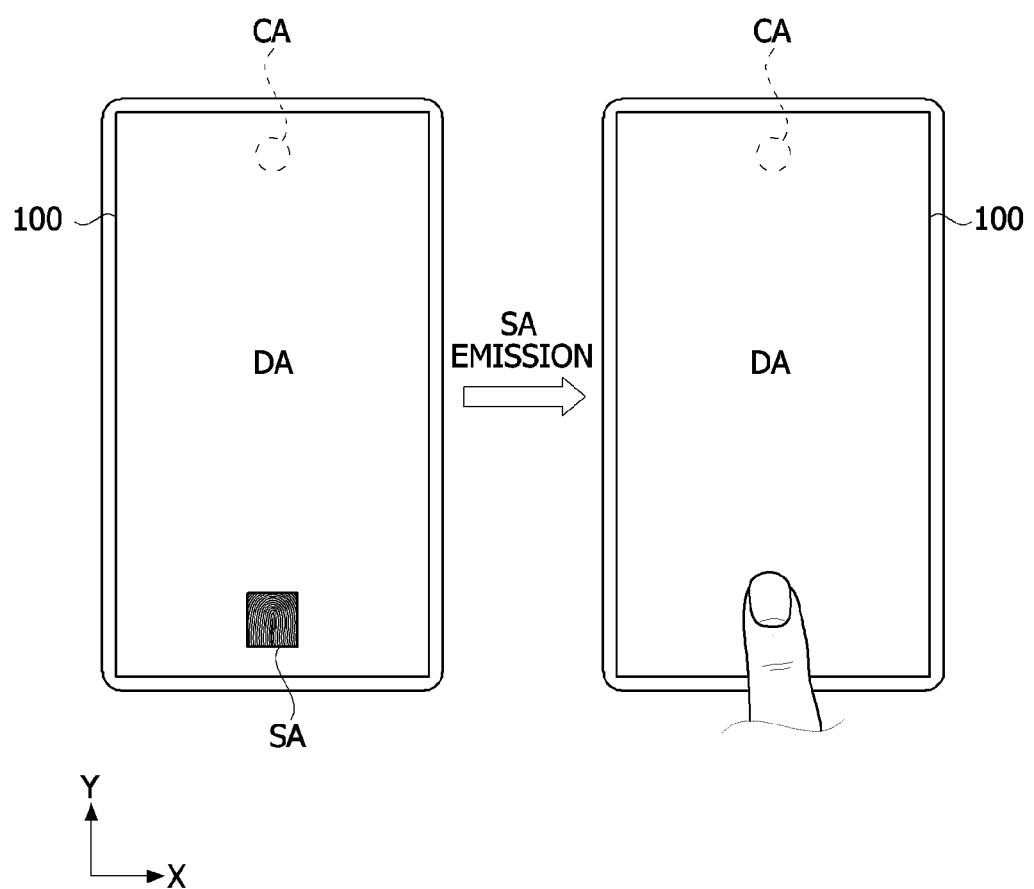
FIG. 3 is a diagram showing an example of fingerprint sensing on the display screen of a mobile terminal according to an embodiment of the present disclosure.

FIG. 2 is a flowchart illustrating a method for driving the first sensing area SA in the fingerprint recognition mode according to an embodiment of the disclosure. FIG. 3 is a diagram showing an example of fingerprint sensing on the display screen of a mobile terminal according to one embodiment.

With reference to FIGS. 2 and 3, when a fingerprint sensing event occurs, the first sensing area SA starts to operate in a fingerprint recognition mode. The host system receives fingerprint pattern data from the fingerprint recognition processor in an application that is connected to the display device and requires user authentication, and performs fingerprint authentication.

When the fingerprint recognition mode is started, the display device may guide the fingerprint sensing position by displaying the sensing area SA on the screen as shown in FIG. 3 (S01, S02). The host system senses a finger placed on the first sensing area SA according to an output signal from the touch sensor or the pressure sensor (S03). The fingerprint recognition processor senses the fingerprint of the finger by driving the light sources and sensor pixels S of the sensing area SA in response to a command from the host system (S04 and S05). In the fingerprint recognition mode, the sensor pixels S perform photoelectric conversion of light reflected from the fingerprint. The fingerprint recognition processor converts the output signals of the sensor pixels S into digital data to generate fingerprint pattern data, and transmits this data to the host system.

As shown in FIGS. 4 to 7, the display panel of the present disclosure includes a plurality of first unit pixel areas in each of which N subpixels (N is a positive integer greater than or equal to 3) for displaying data are disposed, and a plurality of second unit pixel areas in each of which N−1 subpixels for displaying data are disposed. The first unit pixel area and the second unit pixel area are repeated in a first direction (X-axis) and in a second direction (Y-axis) crossing the first direction. The first unit pixel area and the second unit pixel area have different numbers of subpixels within the same size.

The first unit pixel areas may be disposed in the display area DA. The second unit pixel areas may be disposed in the first and second sensing areas SA and CA. One photosensor may be additionally allocated to each of the unit pixel areas of the first sensing area SA.

Figure 4:
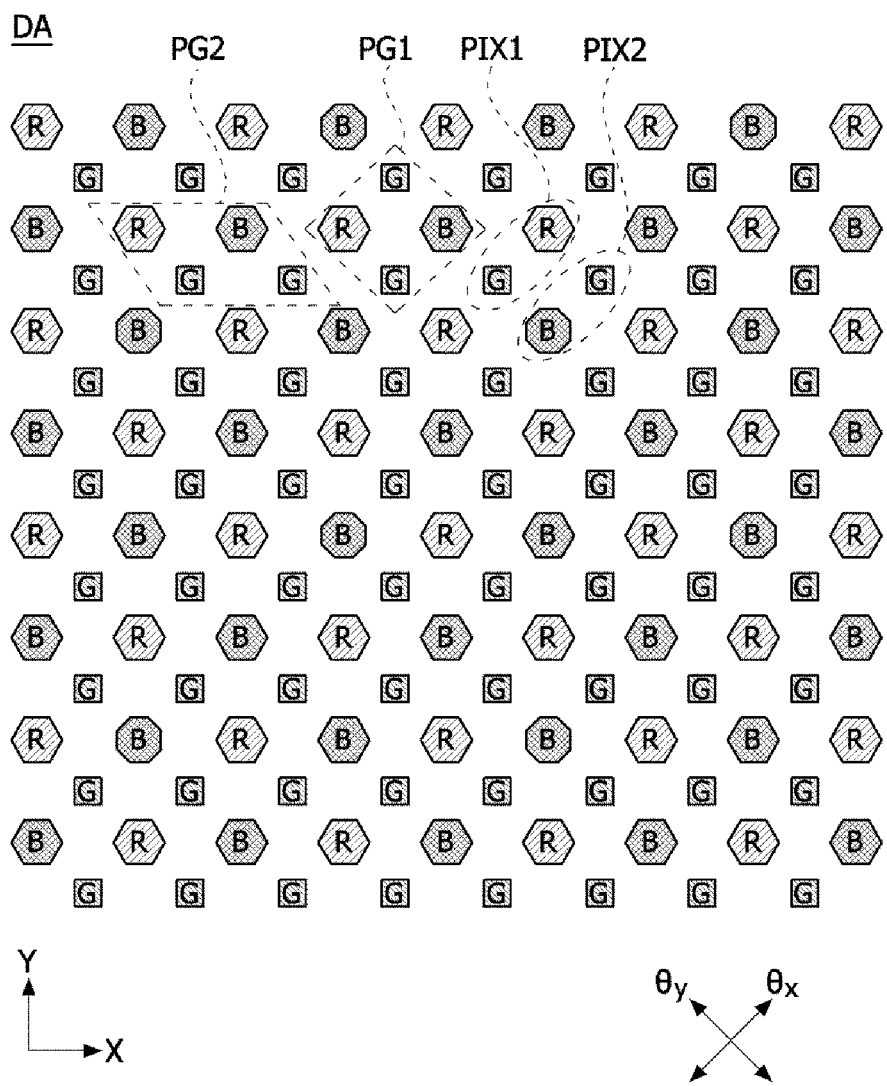
FIG. 4 is a diagram illustrating arrangement of display pixels in the display area according to an embodiment of the present disclosure.

FIG. 4 shows an example in which N is 4, but the present disclosure is not limited thereto. For example, 3 subpixels or 5 subpixels may be disposed in the first unit pixel area, and 2 subpixels or 4 subpixels may be disposed in the second unit pixel area.

Figure 5:
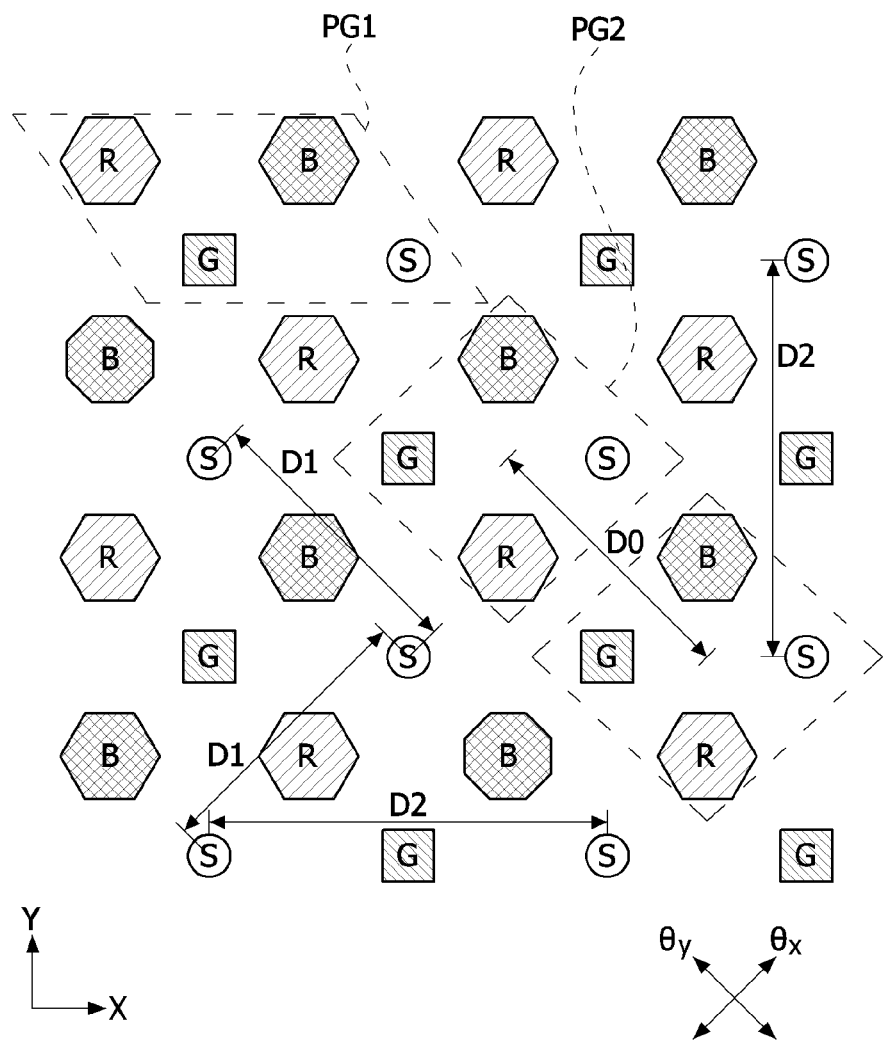
FIG. 5 is a diagram illustrating arrangement of pixels in the first sensing area according to an embodiment of the present disclosure.
Figure 6:
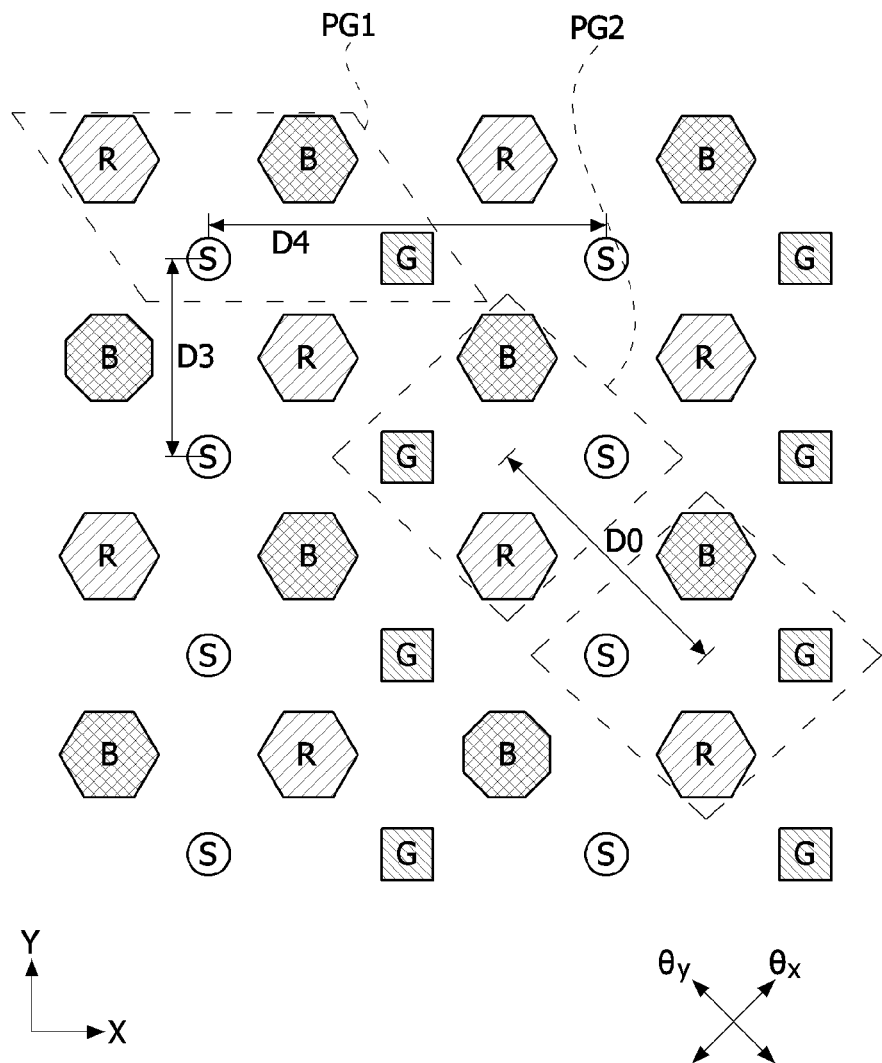
FIG. 6 is a diagram illustrating arrangement of pixels in the first sensing area according to another embodiment of the present disclosure.
Figure 7:
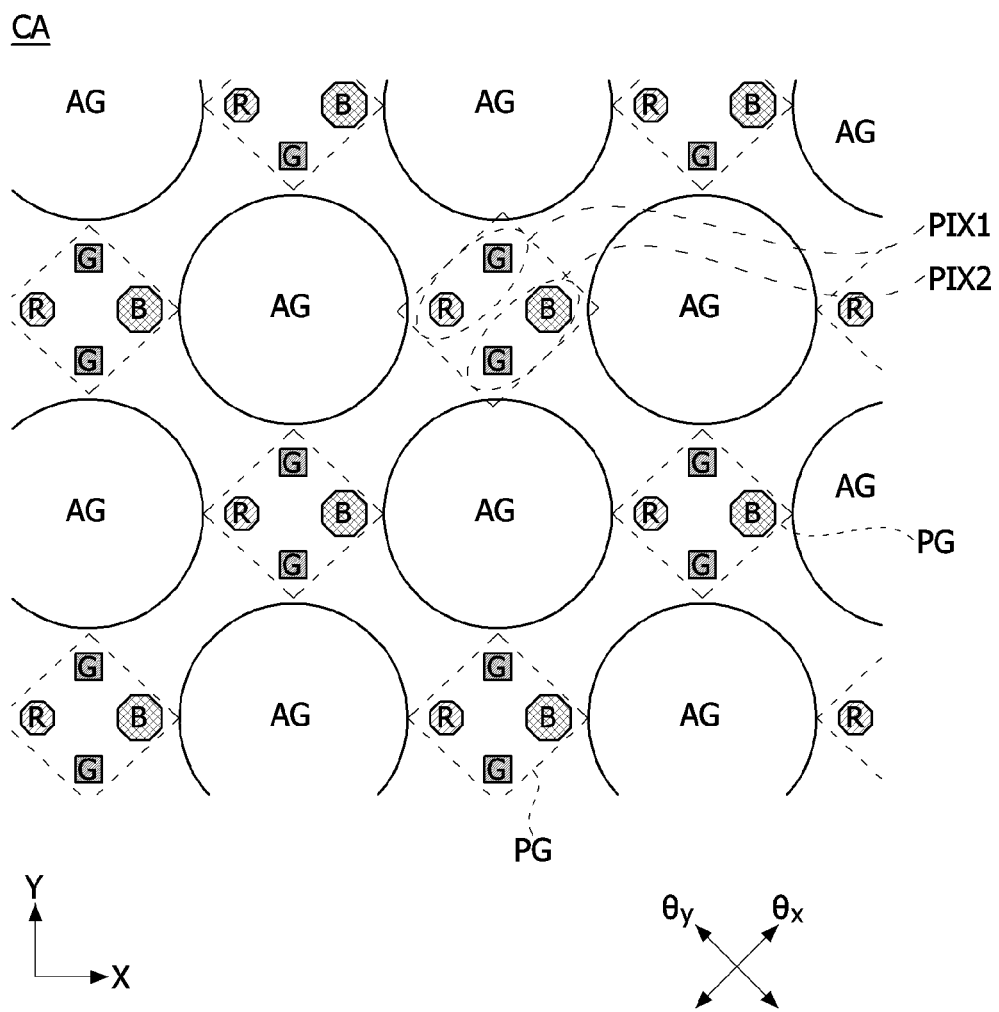
FIG. 7 is a diagram illustrating arrangement of pixels in a second sensing area according to an embodiment of the present disclosure.

FIG. 4 is a diagram illustrating an example of display pixels disposed in the display area DA according to one embodiment. FIGS. 5 and 6 are diagrams illustrating an example of display pixels and sensor pixels disposed in the first sensing area SA according to one embodiment. FIG. 7 is a diagram illustrating an example of display pixels and light transmitting portions disposed in the second sensing area CA according to one embodiment. Wires connected to the display pixels and wires connected to the sensor pixels are omitted in FIGS. 4 to 7.

With reference to FIG. 4, the display area DA includes display pixels of a first group arranged in a matrix form. Display pixels of the first group may be implemented as real color pixels where R, G and B subpixels of three primary colors are configured as one pixel. Also, in the display pixels, two subpixels may be configured as one pixel by using a subpixel rendering algorithm. For example, a first display pixel PIX1 may be composed of R and first G subpixels, and a second display pixel PIX2 may be composed of B and second G subpixels. The insufficient color expression in each of the first and second pixels PIX1 and PIX2 may be compensated with an average value of corresponding color data between neighboring pixels.

The display pixels of the first group may be divided into unit pixel areas PG1 and PG2 having a preset size. The unit pixel areas PG1 and PG2 are repeated in a first direction (X-axis), a second direction (Y-axis) orthogonal to the first direction, and inclination angle directions ($\theta_x$ and $\theta_y$ axes) between the first and second directions. $\theta_x$ and $\theta_y$ indicate the directions of the inclined axes in which the X and Y axes are rotated by 45°, respectively.

The subpixels in the unit pixel areas PG1 and PG1 may have different luminous efficiencies for individual colors. In consideration of this, the subpixels may have different sizes for different colors. For example, among the R, G and B subpixels, the B subpixel may be the largest and the G subpixel may be the smallest.

The unit pixel areas PG1 and PG2 are a pixel area with a preset size including four subpixels. The unit pixel areas PG1 and PG2 may be a parallelogram pixel area PG1 or a rhombic pixel area PG2. The shape of the unit pixel areas PG1 and PG2 should be construed as including a rectangle, a square, and the like.

The subpixels of the unit pixel area PG1 or PG2 include a subpixel of a first color, a subpixel of a second color, and a subpixel of a third color, with two subpixels having one of the first to third colors. For example, the unit pixel area PG1 or PG2 may include one R subpixel, two G subpixels, and one B subpixel.

With reference to FIG. 5, the first sensing area SA according to the first embodiment of the present disclosure may be divided into unit pixel areas PG1 and PG2 having a preset size. The unit pixel areas PG1 and PG2 are repeatedly arranged at equal intervals in a first direction (X-axis), a second direction (Y-axis) orthogonal to the first direction, and inclination angle directions ($\theta_x$ and $\theta_y$ axes) between the first and second directions. The unit pixel area PG1 or PG2 may have the same size and shape as the unit pixel area of the display area DA.

In the first sensing area SA, the subpixels of the unit pixel areas PG1 and PG2 may include one subpixel of a first color, one subpixel of a second color, one subpixel of a third color, and one sensor pixel S. For example, the unit pixel areas PG1 and PG2 may include one R subpixel, one G subpixel, one B subpixel, and one sensor pixel S.

The pitch between the adjacent unit pixel areas PG1 and PG2 is equal to D0 and equally spaced in a first direction (X-axis), a second direction (Y-axis) orthogonal to the first direction, and inclination angle directions ($\theta_x$ and $\theta_y$ axes) between the first and second directions. Subpixels of the same color are arranged in a zigzag shape in the first direction (X-axis) and in the second direction (Y-axis). Similarly, the adjacent sensor pixels S are arranged in a zigzag shape in the first direction (X-axis) and in the second direction (Y-axis). The four adjacent subpixels of the same color may be arranged in a rhombus shape. Similarly, the four adjacent sensor pixels S may be arranged in a rhombus shape.

The unit pixel areas PG1 and PG2 of the display area DA include two subpixels of the same color. In contrast, the unit pixel areas PG1 and PG2 of the first sensing area SA has three subpixels of different colors and additionally includes one sensor pixel. For example, the unit pixel areas PG1 and PG2 of the display area DA may include two G subpixels. When the display pixels R, G and B and the sensor pixel S are arranged on the same plane, to secure the resolution of the sensor pixels S capable of recognizing a fingerprint within the resolution limit of the fine metal mask (FMM), the sensor pixel S is disposed in a space left after one G subpixel is removed in the unit pixel areas PG1 and PG2 of the first sensing area SA. The resolution of the sensor pixels S is the minimum resolution capable of fingerprint recognition, for example, 300 PPI or more.

In each of the first and second inclination angle directions ($\theta_x$ and $\theta_y$ axes) between the first direction (X-axis) and the second direction (Y-axis), the adjacent sensor pixels S are spaced apart at equal intervals D1. D1 may be a length that satisfies the PPI of at least the minimum resolution capable of fingerprint recognition, for example, a length of 80 μm or less. In each of the first direction (X-axis) and the second direction (Y-axis), the pitches between the adjacent sensor pixels S are equal to D2, and are spaced apart at equal intervals. D2 may be set to a length that satisfies the PPI of at least the minimum resolution capable of fingerprint recognition.

In the first direction (X-axis), the sensor pixels S and the G subpixels may be alternately disposed one by one. The G subpixels of the first sensing area SA may be used as a light source in the fingerprint sensing mode. In the fingerprint sensing mode, light of a green wavelength irradiated from the G subpixels toward the cover glass is reflected from the fingerprint and is incident on the light-receiving surface of the sensor pixels S.

In the first sensing area SA, the shortest distance between the R subpixel or B subpixel and the sensor pixel S may be set to be smaller than the shortest distance between the G subpixel and the sensor pixel S.

The unit pixel areas PG1 and PG2 of the display area DA and the first sensing area SA may have the same size and the same shape. The subpixel removed from the first sensing area S is a G subpixel in comparison to the display area DA according to one embodiment. This is because the three primary color subpixels are included in the unit pixel areas PG1 and PG2 of the first sensing area S, so that differences in luminance and color relative to the display area DA can be reduced. A decrease in luminance due to insufficient G subpixels in the first sensing area SA may be compensated for by increasing the luminance of the G subpixels.

Meanwhile, the B and R subpixels have a lower luminance contribution rate and a shorter lifespan compared with the G subpixel. Hence, in case that the R or B subpixels are insufficient in the first sensing area SA, when the remaining R or B sub-pixels are driven with a higher luminance, the deterioration of the corresponding subpixels may be accelerated faster and the lifespan thereof may be reduced.

With reference to FIG. 6, the first sensing area SA according to the second embodiment of the present disclosure may be divided into unit pixel areas PG1 and PG2 having a preset size. The unit pixel areas PG1 and PG2 are repeatedly arranged at equal intervals in each of a first direction (X-axis), a second direction (Y-axis) orthogonal to the first direction, and inclination angle directions ($\theta_x$ and $\theta_y$ axes) between the first direction and the second direction. The unit pixel areas PG1 and PG2 may have the same size and shape as the unit pixel area of the display area DA.

In the first sensing area SA, the subpixels of the unit pixel areas PG1 and PG2 may include a subpixel of a first color, a subpixel of a second color, a subpixel of a third color, and one sensor pixel S. For example, the unit pixel areas PG1 and PG2 may include one R subpixel, one G subpixel, one B subpixel, and one sensor pixel S.

The pitch between the adjacent unit pixel areas PG1 and PG2 is equal to D0 and equally spaced in the first direction (X-axis), the second direction (Y-axis) orthogonal to the first direction, and the inclination angle directions ($\theta_x$ and $\theta_y$ axes) between the first and second directions. The R and B subpixels are arranged in a zigzag shape in the first direction (X-axis) and the second direction (Y-axis). The G subpixels disposed between the sensor pixels S may be arranged in a line along the second direction (Y-axis). The sensor pixels S may be arranged in a line along the second direction (Y-axis).

In the unit pixel areas PG1 and PG2 of the first sensing area SA, the sensor pixel S is disposed in a space left after one G subpixel is removed. The resolution of the sensor pixels S is the minimum resolution capable of fingerprint recognition, for example, 300 PPI or more.

In the second direction (Y-axis), the pitch between the adjacent sensor pixels S is equal to D3, and they are spaced apart at equal intervals. D3 may be a length that satisfies the PPI of at least the minimum resolution capable of fingerprint recognition, for example, a length of 80 μm or less. In the first direction (X-axis), the pitch between the adjacent sensor pixels S is equal to D4, and they are spaced apart at equal intervals. D4 may be larger than D3, but may be set to a length that satisfies the PPI of at least the minimum resolution capable of fingerprint recognition.

In the first direction (X-axis), the sensor pixels S and the G subpixels may be alternately disposed one by one. The G subpixels of the first sensing area SA may be used as a light source in the fingerprint sensing mode. In the fingerprint sensing mode, light of a green wavelength irradiated from the G subpixels toward the cover glass is reflected from the fingerprint and is incident on the light-receiving surface of the sensor pixels S.

In the first sensing area SA, the shortest distance between the R subpixel or B subpixel and the sensor pixel S may be set to be smaller than the shortest distance between the G subpixel and the sensor pixel S.

The unit pixel areas PG1 and PG2 of the display area DA and the first sensing area SA may have the same size and the same shape. The subpixel removed from the first sensing area S is a G subpixel in comparison to the display area DA according to one embodiment. This is because the three primary color subpixels are included in the unit pixel areas PG1 and PG2 of the first sensing area S, so that differences in luminance and color relative to the display area DA can be reduced. A decrease in luminance due to insufficient G subpixels in the first sensing area SA may be compensated for by increasing the luminance of the G subpixels.

With reference to FIG. 7, the second sensing area CA may be divided into unit pixel areas PG having a preset size. The unit pixel areas PG are repeatedly arranged in a first direction (X-axis), a second direction (Y-axis) orthogonal to the first direction, and inclination angle directions ($\theta_x$ and $\theta_y$ axes) between the first and second directions. The unit pixel area PG may have the same size and shape as the unit pixel area of the display area DA.

The unit pixel area PG of the second sensing area CA may be a rhombic pixel area or a parallelogram pixel area as shown in FIG. 7. The subpixels of the unit pixel area PG include a subpixel of a first color, a subpixel of a second color, and a subpixel of a third color, with two subpixels having one of the first to third colors. For example, the unit pixel area PG may include one R subpixel, two G subpixels, and one B subpixel. Two pixels may be disposed in the unit pixel area PG. The first display pixel PIX1 may include R and first G subpixels, and the second display pixel PIX2 may include B and second G subpixels.

In another embodiment, three subpixels including R, G and B subpixels may be disposed in the unit pixel area PG of the second sensing area CA.

The light transmitting portions AG disposed between the unit pixel areas PG have a structure with high light transmittance. External light is incident on the light-receiving surface of the optical sensor 30 disposed under the display panel 100 through the light transmitting portions AG.

The light transmitting portions AG may be made of transparent media only in order to reduce the loss of light incident on the optical sensors 30. The light transmitting portions AG may be made of transparent insulating materials without including metal wires or pixels.

Figure 8:
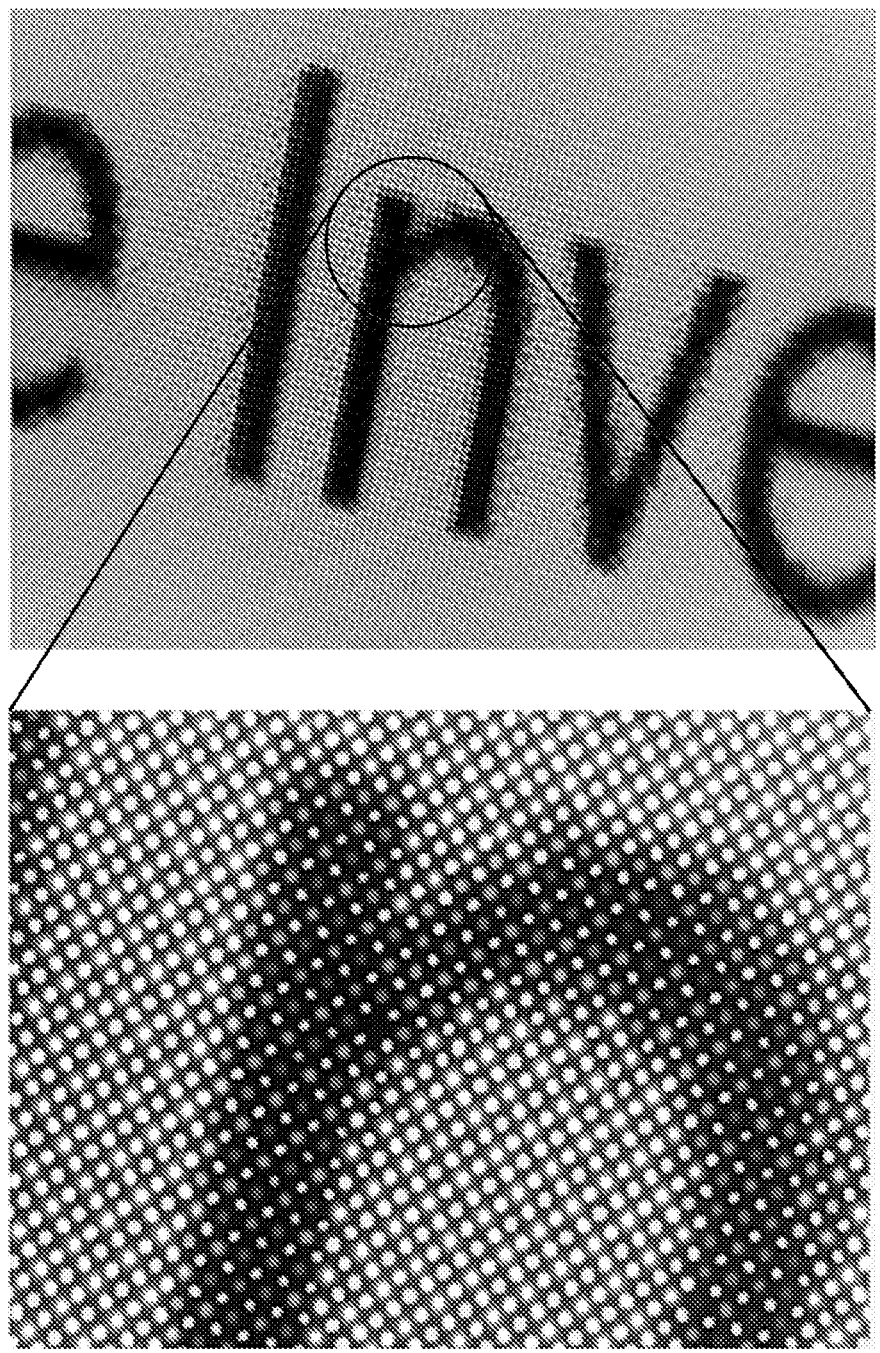
FIG. 8 is a diagram illustrating a sample image displayed on a pixel array of the display area shown in FIG. 4 according to an embodiment of the present disclosure.
Figure 9:
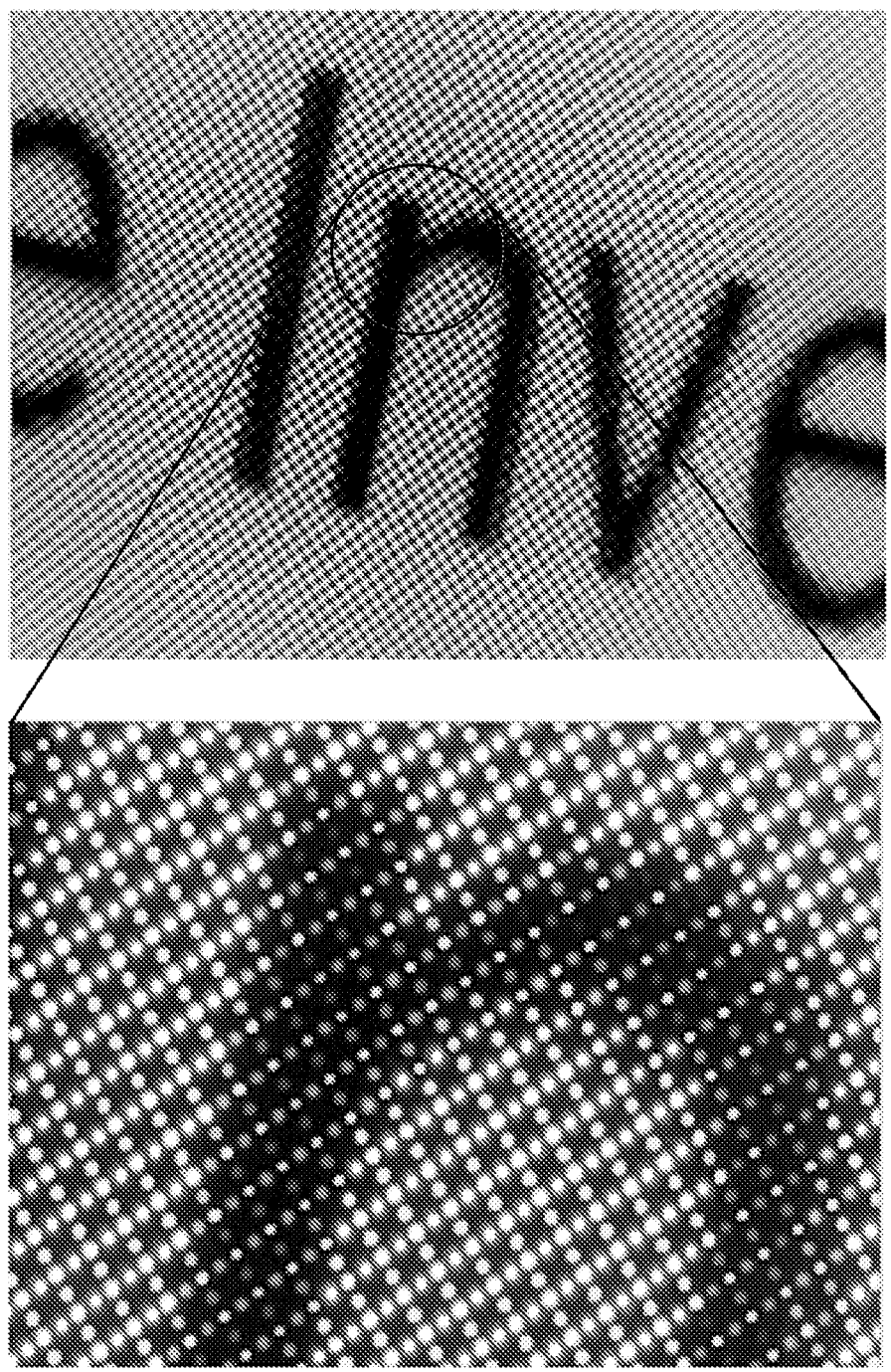
FIG. 9 is a diagram illustrating a sample image displayed on a pixel array of the first sensing area shown in FIG. 5 according to an embodiment of the present disclosure.
Figure 10:
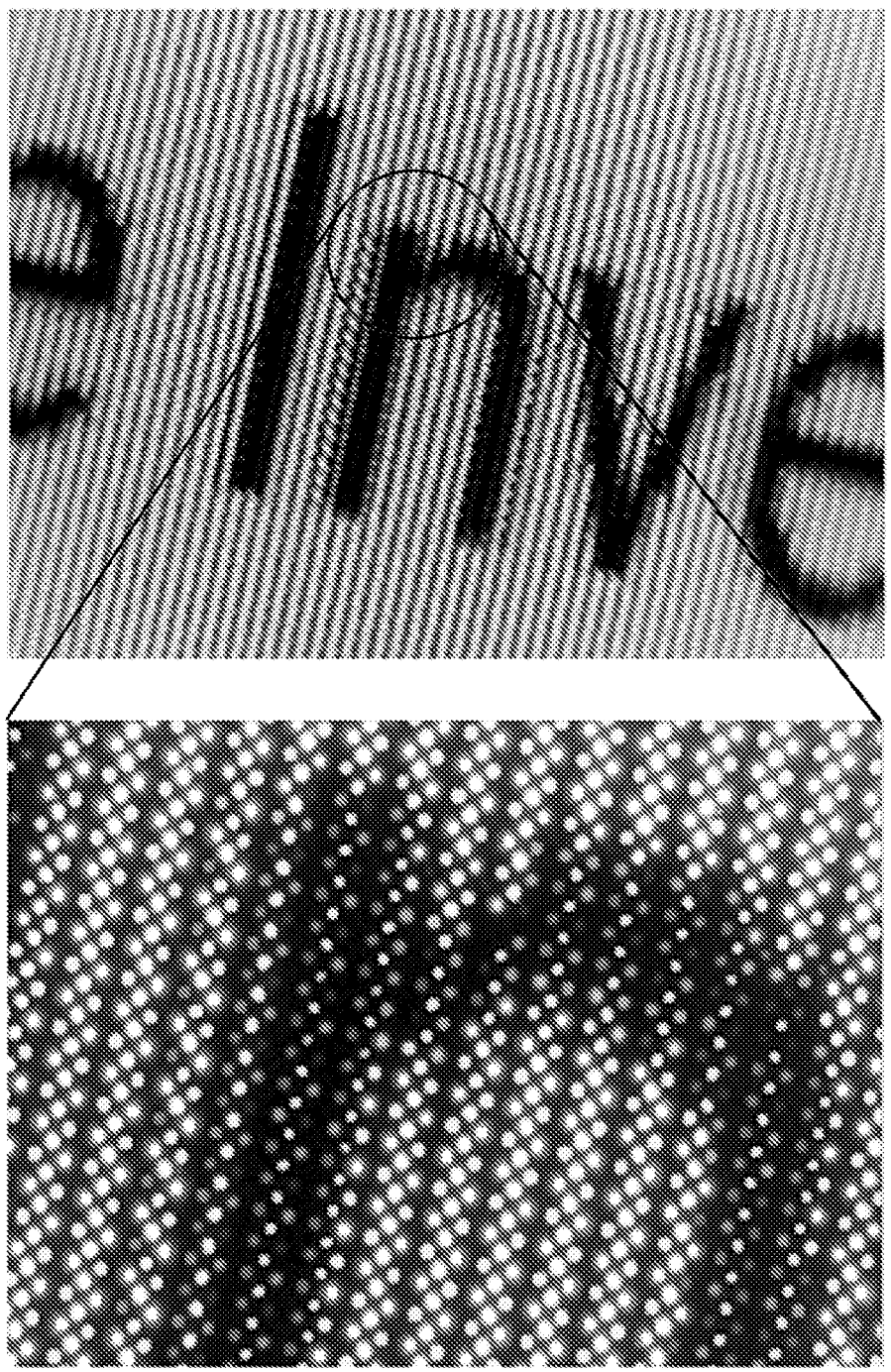
FIG. 10 is a diagram illustrating a sample image displayed on a pixel array of the first sensing area shown in FIG. 6 according to an embodiment of the present disclosure.

FIG. 8 is a diagram illustrating a sample image displayed on a pixel array of the display area DA shown in FIG. 4 according to one embodiment. FIG. 9 is a diagram illustrating a sample image displayed on a pixel array of the first sensing area SA shown in FIG. 5 according to one embodiment. FIG. 10 is a diagram illustrating a sample image displayed on a pixel array of the first sensing area SA shown in FIG. 6 according to one embodiment. As can be seen from FIGS. 9 and 10, which show a result of displaying a sample image on the first sensing area SA, the image quality of the first sensing area SA may be evaluated at a level similar to that of the display area DA. When the first sensing area SA is enlarged, it may be seen that the display pixel resolution and PPI of the first sensing area SA are low due to the sensor pixels S, but the difference in image quality or visibility is not clearly recognized in a general image.

Figure 11:
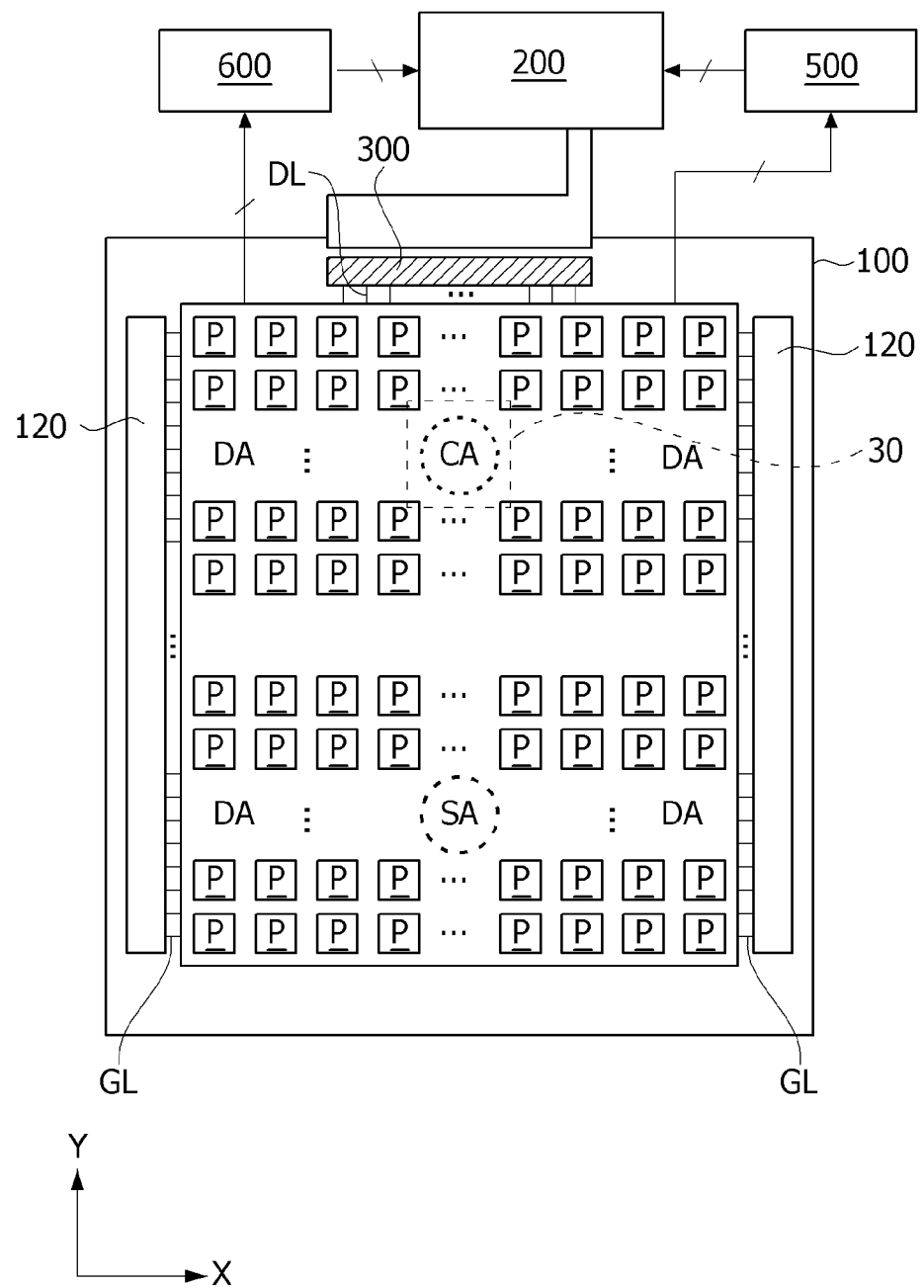
FIG. 11 is a block diagram illustrating a display panel and a display panel driver according to an embodiment of the present disclosure.
Figure 12:
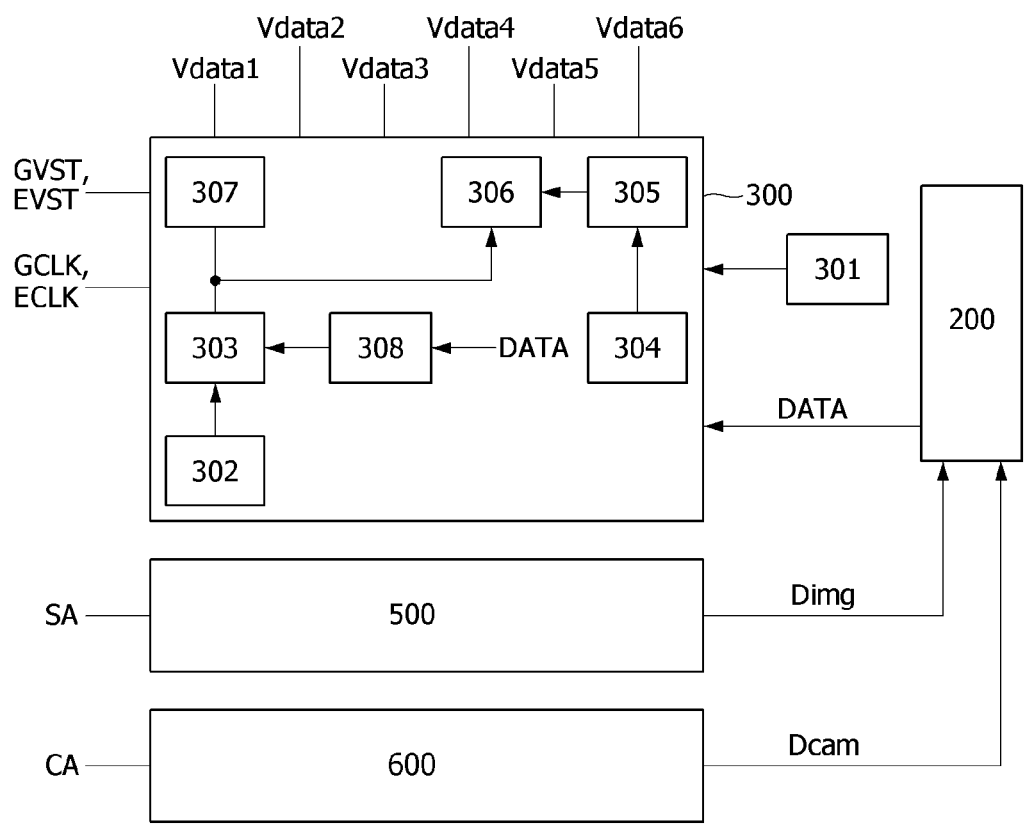
FIG. 12 is a block diagram schematically showing the configuration of a drive integrated circuit (IC) according to an embodiment of the present disclosure.

FIGS. 11 and 12 are diagrams illustrating a display device according to an embodiment of the present disclosure.

With reference to FIGS. 11 and 12, the display device includes a display panel 100 in which a pixel array is disposed on the screen, a display panel driver, a fingerprint recognition processor 500, an optical sensor driver 600, and the like.

The pixel array of the display panel 100 includes data lines DL, gate lines GL crossing the data lines DL, and display pixels P arranged in a matrix form defined by the data lines DL and gate lines GL. The pixel array may further include power lines for supplying power to the pixels. The pixel array includes the display area DA and sensing areas SA and CA for displaying an input image in the display mode.

The first sensing area SA senses a user's fingerprint pattern by using sensor pixels embedded in the pixel array in the fingerprint recognition mode. Light traveling through the second sensing area CA is incident on the light-receiving surface of the optical sensor 30 disposed under the display panel 100.

The pixel array may be divided into the circuit layer 12 and the light emitting element and sensor layer 14 as shown in FIG. 1. Touch sensor may be disposed on the display area DA and the sensing areas SA and CA. The touch sensors may be disposed on the light emitting element and sensor layer 14 in the display area DA and the sensing areas SA and CA. Each of the pixels of the pixel array may include two to four subpixels as described above. Each of the subpixels includes a pixel circuit disposed in the circuit layer 12.

Each subpixel of the display pixels in the display area DA and the sensing areas SA and CA includes the pixel circuit. The pixel circuit may include a driving element that supplies a current to the light emitting element OLED, a plurality of switch elements for sampling the threshold voltage of the driving element and switching the current paths of the pixel circuit, and a capacitor maintaining the gate voltage of the driving element. Each of the sensor pixels S in the first sensing area SA includes an organic photodiode and a sensor driving circuit for driving the photodiode.

While the display pixels in the first sensing area SA display input data in the display mode by emitting light according to the data voltage of the pixel data, they may be driven as a light source in the fingerprint recognition mode by emitting light with high luminance according to the voltage of the light source driving data. In the fingerprint recognition mode, the light source driving data is set to data unrelated to the pixel data of the input image and is written to the display pixels of the first sensing area SA. Hence, the display pixels in the first sensing area SA may emit light with a luminance corresponding to a grayscale value of the light source driving data in the fingerprint recognition mode.

Figure 17:
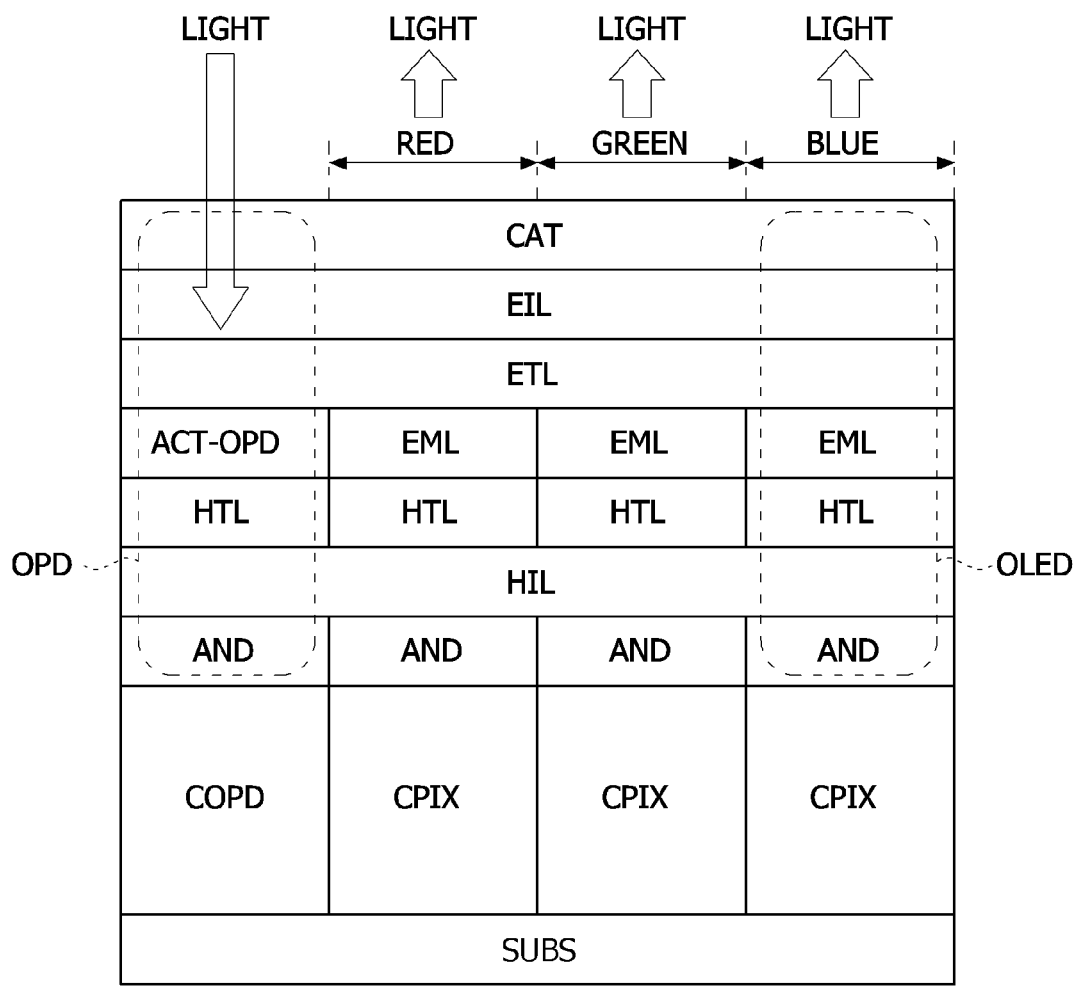
FIG. 17 is a cross-sectional view schematically showing the cross-sectional structure of a sensor pixel and a display pixel according to an embodiment of the present disclosure.

As shown in FIG. 17, the pixel circuit CPIX may be disposed under the light emitting element OLED. The sensor driving circuit COPD may be disposed under the organic light emitting diode OPD.

The display panel driver writes pixel data of an input image to the display pixels P. The display panel driver includes a data driver 306 that supplies a data voltage of pixel data to the data lines DL, and a gate driver 120 that sequentially supplies a gate pulse to the gate lines GL. The display panel driver may further include a touch sensor driver. The data driver 306 may be integrated in a drive IC 300. The data driver 306 may be integrated in the drive IC 300 together with the timing controller 303.

The drive IC 300 may include a data receiving and calculating unit 308, a timing controller 303, a data driver 306, a gamma compensation voltage generator 305, a power supply 304, a second memory 302, and the like. The drive IC 300 may be connected to the host system 200, the first memory 301, and the display panel 100.

The drive IC 300 may be adhered to the display panel 100. The drive IC 300 receives pixel data of an input image and a timing signal from the host system 200, supplies a data voltage of the pixel data to the display pixels through the data lines DL, and synchronizes the data driver 306 and the gate driver 120.

The drive IC 300 is connected to the data lines DL through data output channels, and supplies a data voltage Vdata1-Vdata6 of pixel data DATA to the data lines DL. The drive IC 300 may output a gate timing signal for controlling the gate driver 120 through gate timing signal output channels. The gate timing signal generated from the timing controller 303 may include a start pulse (gate start pulse, VST), a shift clock (gate shift clock, CLK), and the like. The start pulse VST and the shift clock CLK swing between the gate-on voltage VGL and the gate-off voltage VGH. The gate timing signal (VST, CLK) output from the level shifter 307 is applied to the gate driver 120 and controls the shift operation of the gate driver 120.

The gate driver 120 may include a shift register formed on the circuit layer of the display panel 100 together with the pixel array. The shift register of the gate driver 120 supplies a gate signal to the gate lines GL in sequence under the control of the timing controller 30. The gate signal includes a scan pulse applied to the pixel circuit, a pulse of an emission control signal (hereinafter, referred to as "EM pulse"), an exposure signal TG applied to the sensor driving circuit, and the like. The shift register may include a scan driver that outputs a scan pulse and an EM driver that outputs an EM pulse. In FIG. 8, GVST and GCLK are a gate timing signal input to the scan driver. EVST and ECLK are a gate timing signal input to the EM driver.

The data receiving and calculating unit 308 includes a receiving unit for receiving pixel data input as a digital signal from the host system 200, and a data operation unit that processes pixel data input through the receiving unit to improve image quality. The data operation unit may include a data restoration unit that decodes and restores compressed pixel data, and an optical compensation unit that adds a preset optical compensation value to the pixel data. The optical compensation value may be derived for each pixel to compensate for measured luminance variations between the pixels based on the image captured by a camera in the manufacturing process, and may be stored in the memory 301 or 302 in the form of a look-up table.

An external compensation circuit can be applied to the display pixels and the drive IC. In this case, the data receiving and calculating unit 308 may compensate for driving variations and deterioration of the pixels by adding or multiplying the sensing result of the display pixels and the pixel data of the input image together.

The timing controller 303 provides pixel data of an input image received from the host system 200 to the data driver 306. The timing controller 303 generates a gate timing signal for controlling the gate driver 120 and a source timing signal for controlling the data driver 306 to thereby control operation timings of the gate driver 120 and the data driver 306.

The data driver 306 converts the pixel data (digital data) received from the timing controller 303 into a gamma compensation voltage through a digital to analog converter (DAC) to output a data voltage. The data voltage output from the data driver 306 is supplied to the data lines DL of the pixel array through an output buffer connected to the data channel of the drive IC 300.

Figure 29:
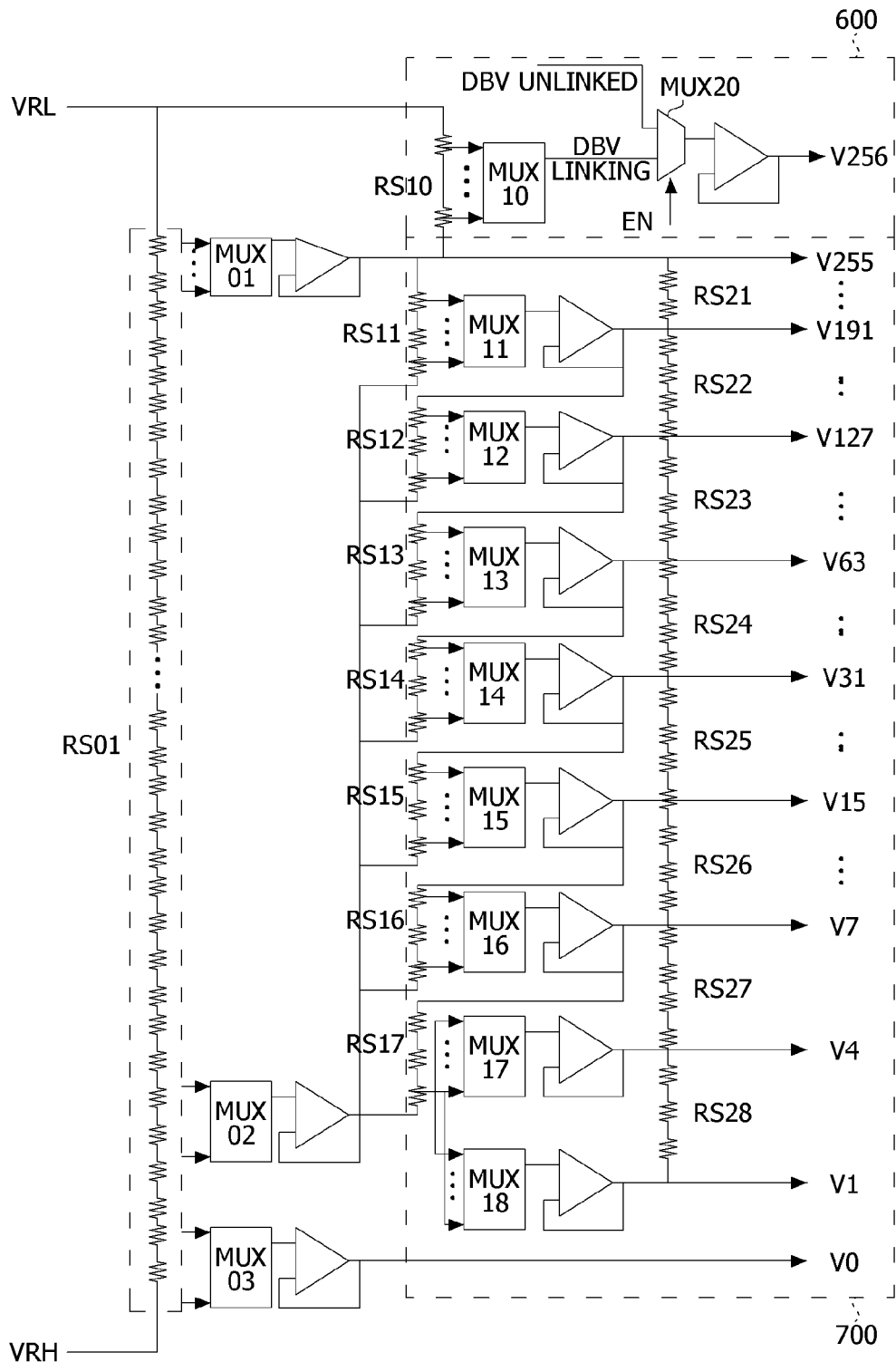
FIG. 29 is a circuit diagram showing a gamma compensation voltage generator according to an embodiment of the present disclosure.

The gamma compensation voltage generator 305 divides the gamma reference voltage from the power supply 304 through a divider circuit to generate a gamma compensation voltage for each grayscale. The gamma compensation voltage is an analog voltage in which a voltage is set for each grayscale of pixel data. The gamma compensation voltage output from the gamma compensation voltage generator 305 is provided to the DAC of the data driver 306. The gamma compensation voltage generator 305 may be implemented as a programmable voltage generation circuit capable of varying the voltage level of the output voltage according to a resistor setting value as shown in FIG. 29.

The power supply 304 generates power required for driving the pixel array of the display panel 100, the gate driver 120, and the drive IC 300 by using a DC-DC converter. The DC-DC converter may include a charge pump, a regulator, a buck converter, a boost converter, and the like. The power supply 304 may adjust the DC input voltage from the host system 200 to generate DC power, such as gamma reference voltage, gate-on voltage VGL, gate-off voltage VGH, pixel driving voltage ELVDD, low-potential power voltage ELVSS, reference voltage Vref, or initialization voltage Vini. The gamma reference voltage is supplied to the gamma compensation voltage generator 305. The gate-on voltage VGL and the gate-off voltage VGH are supplied to the level shifter 307 and the gate driver 120.

Pixel power such as pixel driving voltage ELVDD, low-potential power voltage ELVSS, or initialization voltage Vini is supplied commonly to the pixels P. The pixel driving voltage ELVDD is set to a voltage higher than the low-potential power voltage ELVSS. The initialization voltage Vini and the reference voltage Vref may be set to a voltage that is lower than the pixel driving voltage ELVDD and is lower than or equal to the low-potential power voltage ELVSS.

The second memory 302 stores compensation values, register setting data, and the like received from the first memory 301 when power is supplied to the drive IC 300. The compensation values can be applied to various algorithms for improving image quality. The compensation values may include an optical compensation value. The register setting data is set in advance to control the operations of the data driver 306, the timing controller 303, the gamma compensation voltage generator 305, and the like. The first memory 301 may include a flash memory. The second memory 302 may include a static RAM (SRAM).

The host system 200 for mobile terminals, may be implemented with an application processor (AP). The host system 200 may transmit pixel data of an input image to the drive IC 300 through a mobile industry processor interface (MIPI). The host system 200 may be connected to the drive IC 300 through, for example, a flexible printed circuit (FPC).

The fingerprint recognition processor 500 is connected to the sensor pixels S of the sensing area SA. The fingerprint recognition processor 500 amplifies the output voltage of the sensor pixels S, converts it to digital data by using an analog-to-digital converter (ADC), and generates fingerprint pattern data Dimg. In the fingerprint recognition mode, the host system 200 receives the fingerprint pattern data Dimg from the fingerprint recognition processor 500 and performs fingerprint authentication based on the result of comparing it with a previously registered fingerprint image.

The optical sensor driver 600 drives the optical sensor 30 and transmits output data Dcam of the optical sensor 30 to the host system 200. The host system 200 transmits an enable signal to the optical sensor driver 600 and receives data from the optical sensor driver 600 in the sensing mode.

The display panel 100 may be implemented with a flexible panel applicable to a flexible display. The flexible display can be changed in screen size by winding, folding or bending the flexible panel, and can be easily manufactured in various designs. The flexible display may be implemented as a rollable display, a foldable display, a bendable display, a slideable display, or the like. A flexible panel may be made of so-called "plastic OLED panel". The plastic OLED panel may include a backplane and a pixel array disposed on an organic thin film on the backplane.

The backplane may be a polyethylene terephthalate (PET) substrate. The pixel array and the touch sensor array may be formed on the organic thin film substrate. The backplane can block moisture permeation toward the organic thin film so that the pixel array is not exposed to humidity. The organic thin film substrate may be a polyimide (PI) film substrate. A multi-layered buffer film (not shown) made of an insulating material may be formed on the organic thin film substrate. The circuit layer 12 and the light emitting element and sensor layer 14 may be stacked on the organic thin film.

In the display device of the present disclosure, the pixel circuit CPIX, the sensor driving circuit COPD, and the gate driver 120 disposed on the circuit layer 12 may include a plurality of transistors. The transistors may be implemented with an oxide thin film transistor (oxide TFT) including an oxide semiconductor, or a low temperature polysilicon (LTPS) TFT including LTPS. Each of the transistors can be implemented with a p-channel TFT or an n-channel TFT.

The transistor is a three-electrode element including a gate, a source, and a drain. The source is an electrode that supplies carriers to the transistor. Within the transistor, carriers start to flow from the source. The drain is an electrode through which carriers exit from the transistor. In the transistor, carriers flow from the source to the drain. In the case of an n-channel transistor, as carriers are electrons, the source voltage has a voltage lower than the drain voltage so that electrons can flow from the source to the drain. In the n-channel transistor, a current flows in a direction from the drain to the source. In the case of a p-channel transistor (PMOS), as carriers are holes, the source voltage is higher than the drain voltage so that holes can flow from the source to the drain. In the p-channel transistor, as holes flow from the source to the drain, a current flows from the source to the drain. It should be noted that the source and the drain of the transistor are not fixed. For example, the source and the drain may be changed according to an applied voltage. Therefore, the present disclosure is not limited due to the source and drain of the transistor. In the following description, the source and drain of the transistor will be referred to as first and second electrodes.

The gate pulse swings between a gate-on voltage and a gate-off voltage. The gate-on voltage is set to a voltage higher than the threshold voltage of the transistor, and the gate-off voltage is set to a voltage lower than the threshold voltage of the transistor. The transistor is turned on in response to the gate-on voltage, but it is turned off in response to the gate-off voltage. In the case of an n-channel transistor, the gate-on voltage may be a gate high voltage VGH, and the gate-off voltage may be a gate low voltage VGL. In the case of a p-channel transistor, the gate-on voltage may be a gate low voltage VGL, and the gate-off voltage may be a gate high voltage VGH.

The driving element of the pixel circuit may be implemented with a transistor. The driving element should have uniform electrical characteristics among all pixels, but there may be differences between pixels due to process variations and variations in element characteristics, and it may change according to the lapse of display driving time. To compensate for variations in electrical characteristics of the driving element, the display device may include an internal compensation circuit and an external compensation circuit. The internal compensation circuit is added to the pixel circuit at each of the subpixels, and samples the threshold voltage Vth and/or the mobility p of the driving element, which vary according to the electrical characteristics of the driving element, and compensates the change in real time. The external compensation circuit transmits a threshold voltage and/or mobility of the driving element sensed through a sensing line connected to each of the subpixels to an external compensation unit. The compensation unit of the external compensation circuit compensates for changes in electrical characteristics of the driving element by modulating the pixel data of the input image in consideration of the sensing result. The external compensation circuit senses a voltage of the pixel that changes according to electrical characteristics of the driving element, and modulates the data of an input image in an external circuit based on the sensed voltage, thereby compensating for variations in electrical characteristics of the driving element between pixels.

Figure 13:
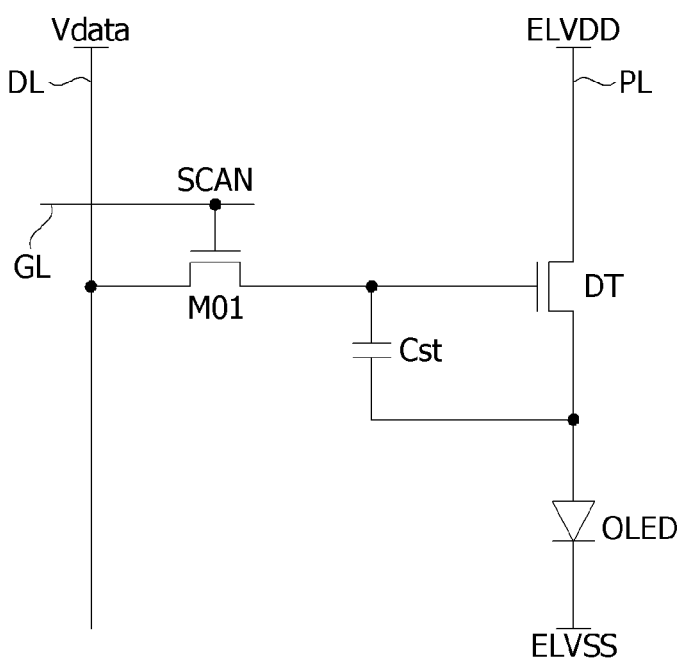
FIGS. 13 to 15 are circuit diagrams showing various pixel circuits applicable to the pixel circuit of the present disclosure.
Figure 14:
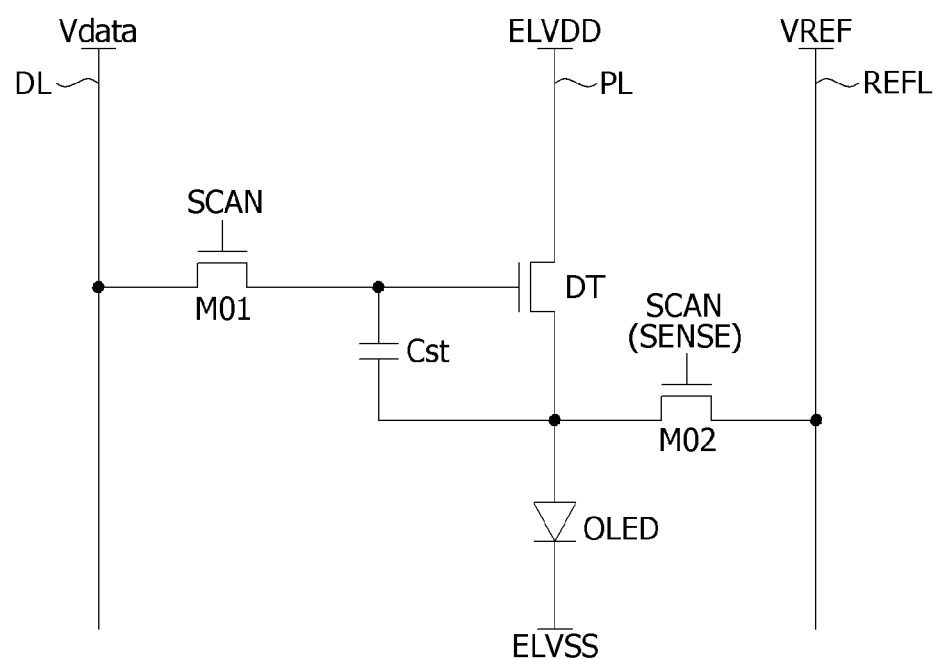
Figure 15:
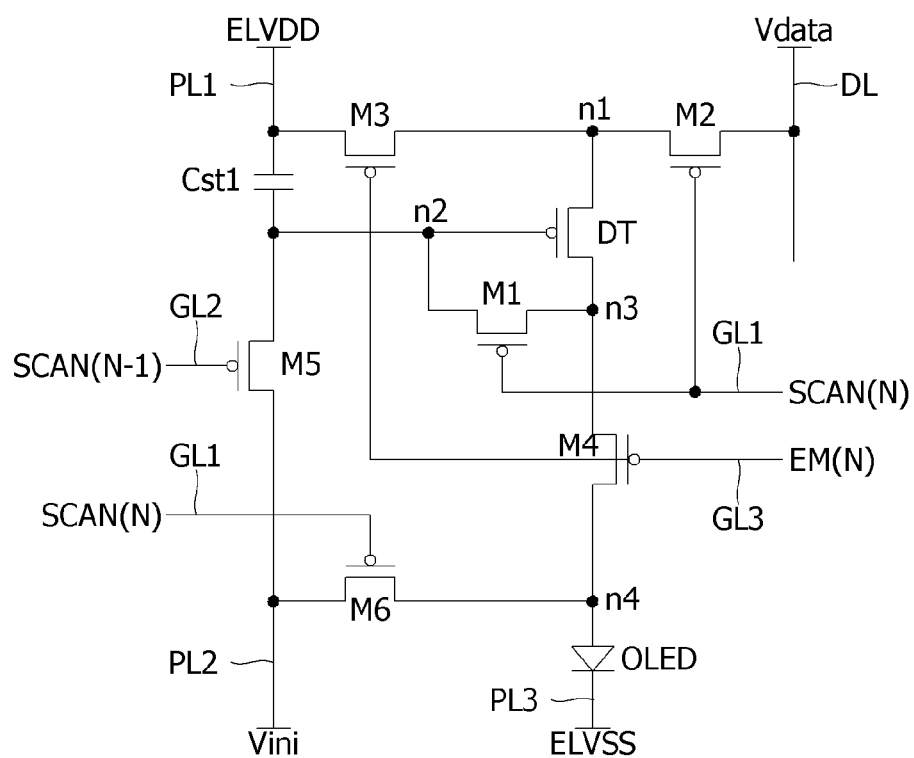

FIGS. 13 to 15 are circuit diagrams showing various pixel circuits applicable to the pixel circuit of the present disclosure. The pixel circuits shown in FIGS. 13 to 15 may be applied to the display pixels of the display area DA, the first sensing area SA, and the second sensing area CA as the same circuit or selectively as partially different circuits.

With reference to FIG. 13, the pixel circuit includes a light emitting element OLED, a driving element DT that supplies a current to the light emitting element OLED, a switch element M01 connecting the data line DL in response to the scan pulse SCAN, and a capacitor Cst connected to the gate of the driving element DT.

The pixel driving voltage ELVDD is applied through the power line PL to the first electrode (or driving drain) of the driving element. The driving element DT drives the light emitting element OLED by supplying a current to the light emitting element OLED according to the gate-source voltage Vgs. When the forward voltage between the anode electrode and the cathode electrode is higher than or equal to the threshold voltage, the light emitting element OLED is turned on to emit light. The capacitor Cst is connected between the gate electrode and the source electrode of the driving element DT to maintain the gate-source voltage Vgs of the driving element DT.

FIG. 14 shows an example of a pixel circuit connected to an external compensation circuit.

With reference to FIG. 14, the pixel circuit further includes a second switch element M02 connected between the reference voltage line REFL and the second electrode (or source) of the driving element DT. The second switch element M02 applies the reference voltage Vref in response to the scan pulse SCAN or a separate sensing pulse SENSE.

In the sensing mode, a current flowing through the channel of the driving element DT or a node voltage between the driving element DT and the light emitting element OLED is sensed through the reference line REFL. The current flowing through the reference line REFL is converted into a voltage through an integrator and the voltage is converted into digital data through an ADC. This digital data is sensing data including information on the threshold voltage or mobility of the driving element DT. The sensing data is transmitted to the data receiving and calculating unit 308.

Figure 16:
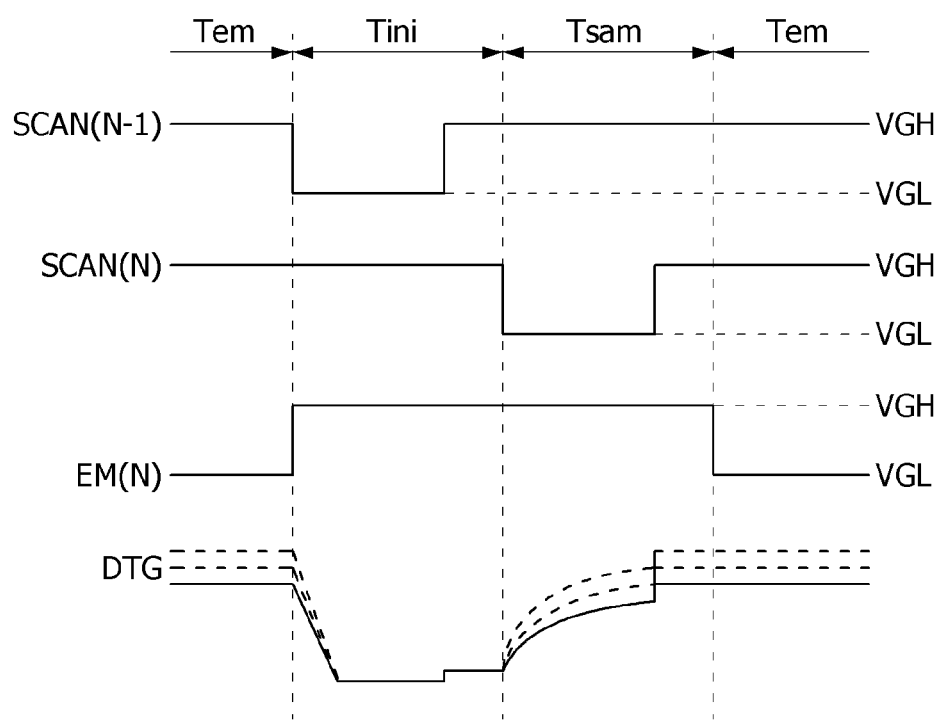
FIG. 16 is a waveform diagram depicting a method for driving the pixel circuit shown in FIG. 15 according to an embodiment of the present disclosure.

FIG. 15 is a circuit diagram showing an example of a pixel circuit to which an internal compensation circuit is applied. FIG. 16 is a diagram depicting a method for driving the pixel circuit shown in FIG. 15.

With reference to FIGS. 15 and 16, the pixel circuit includes a light emitting element OLED, a driving element DT for supplying a current to the light emitting element OLED, and a switch circuit for switching voltages applied to the light emitting element OLED and the driving element DT.

The switch circuit is connected to the power lines PL1, PL2 and PL3 to which the pixel driving voltage ELVDD, the low-potential power voltage ELVSS and the initialization voltage Vini are applied, the data line DL, and the gate lines GL1, GL2 and GL3, and it switches the voltage applied to the light emitting element OLED and the driving element DT in response to the scan pulse SCAN(N−1) or SCAN(N) and the EM pulse EM(N).

The switch circuit includes an internal compensation circuit that samples the threshold voltage Vth of the driving element DT by using a plurality of switch elements M1 to M6 and stores it in the capacitor Cst1, and compensates for the gate voltage of the driving element DT as much as the threshold voltage Vth of the driving element DT. Each of the driving element DT and the switch elements M1 to M6 may be implemented with a p-channel TFT.

The driving period of the pixel circuit may be divided into an initialization period Tini, a sampling period Tsam, and an emission period Tem as shown in FIG. 12.

The $N^{th}$ scan pulse SCAN(N) is generated as the gate-on voltage VGL during the sampling period Tsam and is applied to the first gate line GL1. The $N-1^{th}$ scan pulse SCAN(N−1) is generated as the gate-on voltage VGL during the initialization period Tini prior to the sampling period and is applied to the second gate line GL2. The EM pulse EM(N) is generated as the gate-off voltage VGH during the initialization period Tini and the sampling period Tsam and is applied to the third gate line GL3.

During the initialization period Tini, the $N-1^{th}$ scan pulse SCAN(N−1) is generated as the gate-on voltage VGL, and the voltage of each of the $N^{th}$ scan pulse SCAN(N) and the EM pulse EM(N) is the gate-off voltage VGH. During the sampling period Tsam, the $N^{th}$ scan pulse SCAN(N) is generated as a pulse of the gate-on voltage (VGL), and the voltage of each of the $N-1^{th}$ scan pulse SCAN(N−1) and the EM pulse EM(N) is the gate-off voltage VGH. During at least some of the emission period Tem, the EM pulse EM(N) is generated as the gate-on voltage VGL, and the voltage of each of the $N-1^{th}$ scan pulse SCAN(N−1) and the $N^{th}$ scan pulse SCAN(N) is generated as the gate-off voltage VGH.

During the initialization period Tini, the fifth switch element M5 is turned on according to the gate-on voltage VGL of the $N-1^{th}$ scan pulse SCAN(N−1), initializing the pixel circuit. During the sampling period Tsam, the first and second switch elements M1 and M2 are turned on according to the gate-on voltage VGL of the $N^{th}$ scan pulse SCAN(N), and the data voltage Vdata compensated as much as the threshold voltage of the driving element DT is stored in the capacitor Cst1. At the same time, the sixth switch element M6 is turned on during the sampling period Tsam and lowers the voltage of the fourth node n4 to the reference voltage Vref, suppressing the emission of the light emitting element OLED.

During the emission period Tem, the third and fourth switch elements M3 and M4 are turned on and the light emitting element OLED emits light. During the emission period Tem, to accurately express the luminance of the low grayscale, the voltage level of the EM pulse EM(N) may be inverted at a preset duty ratio between the gate-on voltage VGL and the gate-off voltage VGH. In this case, the third and fourth switch elements M3 and M4 may be repeatedly turned on and off according to the duty ratio of the EM pulse EM(N) during the emission period Tem.

The light emitting element OLED may be implemented with an organic light emitting diode or an inorganic light emitting diode. Hereinafter, a description is given of an example in which the light emitting element OLED is implemented with an organic light emitting diode.

The anode electrode of the light emitting element OLED is connected to the fourth node n4 between the fourth and sixth switch elements M4 and M6. The fourth node n4 is connected to the anode electrode of the light emitting element OLED, the second electrode of the fourth switch element M4, and the second electrode of the sixth switch element M6. The cathode electrode of the light emitting element OLED is connected to the VSS line PL3 to which the low-potential power voltage ELVSS is applied. The light emitting element OLED emits light with a current Ids flowing according to the gate-source voltage Vgs of the driving element DT. The current path of the light emitting element OLED is switched by the third and fourth switch elements M3 and M4.

The capacitor Cst1 is connected between the VDD line PL1 and the second node n2. The data voltage Vdata compensated as much as the threshold voltage Vth of the driving element DT is charged in the capacitor Cst1. As the data voltage Vdata is compensated as much as the threshold voltage Vth of the driving element DT at each of the subpixels, characteristic variations of the driving element DT are compensated for at the subpixels.

The first switch element M1 is turned on in response to the gate-on voltage VGL of the $N^{th}$ scan pulse SCAN(N) to thereby connect the second node n2 and the third node n3. The second node n2 is connected to the gate electrode of the driving element DT, the first electrode of the capacitor Cst1, and the first electrode of the first switch element ML. The third node n3 is connected to the second electrode of the driving element DT, the second electrode of the first switch element M1, and the first electrode of the fourth switch element M4. The gate electrode of the first switch element M1 is connected to the first gate line GL1 to receive the $N^{th}$ scan pulse SCAN(N). The first electrode of the first switch element M1 is connected to the second node n2, and the second electrode of the first switch element M1 is connected to the third node n3.

As the first switch element M1 is turned on for very short one horizontal period (1H) in which the $N^{th}$ scan pulse SCAN(N) is generated as the gate-on voltage VGL in one frame period, a leakage current may occur in the off state. To suppress the leakage current of the first switch element M1, the first switch element M1 may be implemented with a transistor having a dual gate structure in which two transistors M1a and M1b are connected in series.

The second switch element M2 is turned on in response to the gate-on voltage VGL of the $N^{th}$ scan pulse SCAN(N) to thereby supply the data voltage Vdata to the first node n1. The gate electrode of the second switch element M2 is connected to the first gate line GL1 to receive the $N^{th}$ scan pulse SCAN(N). The first electrode of the second switch element M2 is connected to the first node n1. The second electrode of the second switch element M2 is connected to the data line DL to which the data voltage Vdata is applied. The first node n1 is connected to the first electrode of the second switch element M2, the second electrode of the third switch element M3, and the first electrode of the driving element DT.

The third switch element M3 is turned on in response to the gate-on voltage VGL of the EM pulse EM(N) to thereby connect the VDD line PL1 to the first node n1. The gate electrode of the third switch element M3 is connected to the third gate line GL3 to receive the EM pulse EM(N). The first electrode of the third switch element M3 is connected to the VDD line PL1. The second electrode of the third switch element M3 is connected to the first node n1.

The fourth switch element M4 is turned on in response to the gate-on voltage VGL of the EM pulse EM(N) to thereby connect the third node n3 to the anode electrode of the light emitting element OLED. The gate electrode of the fourth switch element M4 is connected to the third gate line GL3 to receive the EM pulse EM(N). The first electrode of the fourth switch element M4 is connected to the third node n3, and the second electrode is connected to the fourth node n4.

The fifth switch element M5 is turned on in response to the gate-on voltage VGL of the N-1$^{th}$ scan pulse SCAN(N-1) to thereby connect the second node n2 to the Vini line PL2. The gate electrode of the fifth switch element M5 is connected to the second gate line GL2 to receive the N-1$^{th}$ scan pulse SCAN(N-1). The first electrode of the fifth switch element M5 is connected to the second node n2, and the second electrode is connected to the Vini line PL2. To suppress the leakage current of the fifth switch element M5, the fifth switch element M5 may be implemented with a transistor having a dual gate structure in which two transistors M5a and M5b are connected in series.

The sixth switch element M6 is turned on in response to the gate-on voltage VGL of the $N^{th}$ scan pulse SCAN(N) to thereby connect the Vini line PL2 to the fourth node n4. The gate electrode of the sixth switch element M6 is connected to the first gate line GL1 to receive the $N^{th}$ scan pulse SCAN(N). The first electrode of the sixth switch element M6 is connected to the Vini line PL2, and the second electrode is connected to the fourth node n4.

The gate electrodes of the fifth and sixth switch elements M5 and M6 may be commonly connected to the second gate line GL2 to which the N-1$^{th}$ scan pulse SCAN(N-1) is applied. In this case, the fifth and sixth switch elements M5 and M6 may be turned on at the same time in response to the N-1$^{th}$ scan pulse SCAN(N-1).

The driving element DT drives the light emitting element OLED by adjusting the current flowing through the light emitting element OLED according to the gate-source voltage Vgs. The driving element DT includes a gate electrode connected to the second node n2, a first electrode connected to the first node n1, and a second electrode connected to the third node n3.

During the initialization period Tini, the N-1$^{th}$ scan pulse SCAN(N-1) is generated as the gate-on voltage VGL. The $N^{th}$ scan pulse SCAN(N) and the EM pulse EM(N) maintain the gate-off voltage VGH during the initialization period Tini. Hence, the fifth switch element M5 is turned on during the initialization period Tini, so that the second and fourth nodes n2 and n4 are initialized to Vini. A hold period Th may be configured between the initialization period Tini and the sampling period Tsam. In the hold period Th, the scan pulses SCAN(N-1) and SCAN(N) and the EM pulse EM(N) are at the gate-off voltage VGH.

During the sampling period Tsam, the $N^{th}$ scan pulse SCAN(N) is generated as the gate-on voltage VGL. The pulse of the $N^{th}$ scan pulse SCAN(N) is synchronized with the data voltage Vdata of the $N^{th}$ pixel line. The N-1$^{th}$ scan pulse SCAN(N-1) and the EM pulse EM(N) maintain the gate-off voltage VGH during the sampling period Tsam. Hence, the first and second switch elements M1 and M2 are turned on during the sampling period Tsam.

During the sampling period Tsam, the gate voltage DTG of the driving element DT is raised due to the current flowing through the first and second switch elements M1 and M2. When the driving element DT is turned off, the gate voltage DTG is Vdata−|Vth|. Here, the voltage of the first node n1 is also Vdata−|Vth|. During the sampling period Tsam, the gate-source voltage Vgs of the driving element DT is |Vgs|=Vdata−(Vdata−|Vth|)=|Vth|.

During the emission period Tem, the EM pulse EM(N) may be generated as the gate-on voltage VGL. During the emission period Tem, the voltage of the EM pulse EM(N) may be inverted at a preset duty ratio. Hence, the EM pulse EM(N) may be generated as the gate-on voltage VGL during at least some of the emission period Tem.

When the EM pulse EM(N) is at the gate-on voltage VGL, a current flows between the ELVDD and the light emitting element OLED, so that the light emitting element OLED may emit light. During the emission period Tem, the N-1$^{th}$, and $N^{th}$ scan pulses SCAN(N-1) and SCAN(N) maintain the gate-off voltage VGH. During the emission period Tem, the third and fourth switch elements M3 and M4 are turned on according to the gate-on voltage VGL of the EM pulse EM(N). When the EM pulse EM(N) is at the gate-on voltage VGL, the third and fourth switch elements M3 and M4 are turned on, so that a current flows through the light emitting element OLED. Here, Vgs of the driving element DT is |Vgs|=ELVDD−(Vdata−|Vth|), and the current flowing through the light emitting element OLED is K(VDD−Vdata)$^2$, where K is a constant value determined according to the charge mobility, parasitic capacitance, and channel capacity of the driving element DT.

FIG. 17 is a cross-sectional view schematically showing the cross-sectional structure of a sensor pixel and a display pixel according to an embodiment of the present disclosure.

With reference to FIG. 17, the sensor pixel may include an organic photodiode OPD. The organic photodiode OPD may be implemented with substantially the same structure as the light emitting element OLED.

With reference to FIG. 17, the sensor pixel may include an organic photodiode (OPD). The organic photodiode OPD may be implemented with substantially the same structure as the light emitting element OLED.

The light emitting element OLED includes an organic compound layer sandwiched between the anode electrode AND and the cathode electrode CAT. The anode electrode AND of the light emitting element OLED may be connected to the pixel circuit CPIX. The anode electrode AND of the light emitting element OLED is formed in an independent pattern separated between subpixels in each of the display pixels. The cathode electrode CAT is a common electrode connected to the display pixels and the sensor pixel. The organic compound layer of the light emitting element OLED may include, but not limited to, a hole injection layer HIL, a hole transport layer HTL, an emission layer EML, an electron transport layer ETL, and an electron injection layer EIL. The hole injection layer HID may be in contact with the anode electrode AND, and the electron injection layer EIL may be in contact with the cathode electrode CAT.

The organic photodiode OPD includes an organic compound layer sandwiched between the anode electrode AND and the cathode electrode CAT. The anode electrode AND of the organic photodiode OPD may be connected to the sensor driving circuit COPD. The anode electrode AND of the organic photodiode OPD is formed in an independent pattern separated in each of the sensor pixels. The organic compound layer of the organic photodiode OPD may include, but not limited to, a hole injection layer HIL, a hole transport layer HTL, an active layer ACT-OPD, an electron transport layer ETL, and an electron injection layer EIL. The electron injection layer EIL, the electron transport layer ETL, and the hole injection layer HIT may be shared by the display pixel and the sensor pixel. The active layer ACT-OPD includes an organic semiconductor material.

The active layer ACT-OPD of the organic photodiode OPD may use, but not limited to, an organic semiconductor material coatable by a solution process, for example, a compound of one or more organic materials among P3HT:PC61BM, squaraine:PC61BM, C60, PBDTTT-C:PC71 BM, PDPP3T:PC71 BM, PCDTBT:PC61BM, PVK:PC71BM, PCDTBT:PC71BM, ZnO:F8T2, PBDT-TFTTE:PC71BM, P3HT:PC61BM, TAPC:C60, P3HT:PC60BM, PFBT20BT:PC71BM, PIDT-TPD:PC61BM, P3HT:PC71BM, PV-D4650:PC61BM, P3HT:O-IDTBR, and 2,9-dimethylquinacridone (2,9-DMQA). Compared to an inorganic semiconductor material formed in a high-temperature deposition process, as the organic semiconductor material can be processed at a relatively low temperature in a solution process, the manufacturing cost can be reduced and it can be applied to a flexible display.

The low-potential power voltage ELVDD and the pixel driving voltage ELVDD may be commonly applied to the pixel circuit CPIX and the sensor driving circuit COPD. The cathode electrode CAT of the light emitting element OLED and the cathode electrode CAT of the photodiode OPD may share the same metal electrode, and may be commonly connected to the VSS line PL3. The anode electrode AND of the light emitting element OLED and the anode electrode AND of the photodiode OPD may be divided by metal patterns formed on the same layer. The anode electrode AND of the light emitting element OLED and the anode electrode AND of the organic photodiode OPD are electrically separated.

As can be seen in FIG. 17, the organic photodiode OPD has substantially the same cross-sectional structure as the light emitting element OLED, and most layers may be made of the same material as the light emitting element OLED. The organic photodiode OPD and the light emitting element CAT may be shared, and may share power lines and gate lines. Hence, the light emitting element OLED and the organic photodiode OPD may be formed in the same manufacturing process, and since they have the same cross-sectional structure, most circuit components may be shared, thereby simplifying the structure of the display panel.

Figure 18:
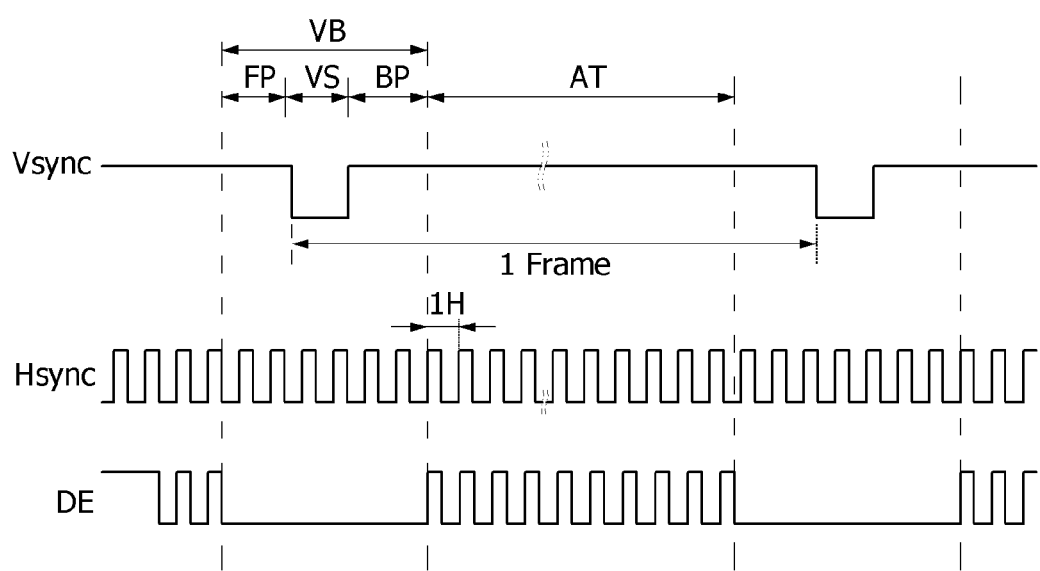
FIG. 18 is a diagram showing in detail an active interval and a vertical blank interval in one frame period according to an embodiment of the present disclosure.

FIG. 18 is a diagram showing in detail an active period and a vertical blank period in one frame period according to one embodiment. In FIG. 18, the vertical synchronization signal Vsync, the horizontal synchronization signal Vsync, and the data enable signal DE are timing signals synchronized with the input video signal. Such a timing signal may be generated from the host system, synchronized with the input video signal, and input to the timing controller of the display device. In a mobile device, the above timing signal may be generated in a simpler format.

With reference to FIG. 18, one frame period (1 frame) is divided into an active interval AT in which pixel data of an input image is input from the host system 200 and a vertical blank interval VB without pixel data. During the active interval AT, one frame of pixel data to be written to all pixels on the screen AA of the display panel 100 is received by the drive IC 300 and written to the pixels P.

The vertical blank interval VB is a blank period in which pixel data is not received by the drive IC 300 between the active interval AT of the N−1$^{th}$ frame period (N is a natural number) and the active interval AT of the N$^{th}$ frame period. The vertical blank interval VB includes a vertical sync time VS, a vertical front porch FP, and a vertical back porch BP.

The vertical synchronization signal Vsync defines one frame period. The horizontal synchronization signal Hsync defines one horizontal period 1H. The data enable signal DE defines a period of valid data including pixel data to be displayed on the screen. The pulse of the data enable signal DE is synchronized with pixel data to be written to the pixels of the display panel 100. One pulse period of the data enable signal DE is one horizontal period 1H.

Figure 19:
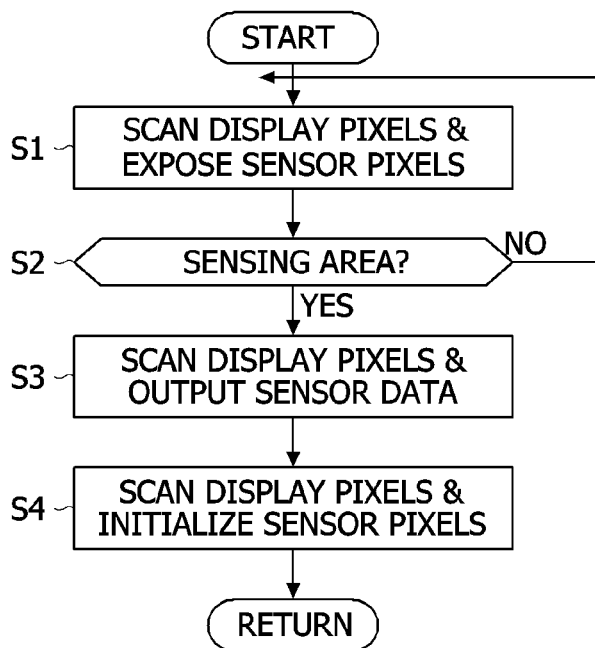
FIGS. 19 and 20 are a diagram illustrating a method for driving a display device according to an embodiment of the present disclosure.
Figure 20:
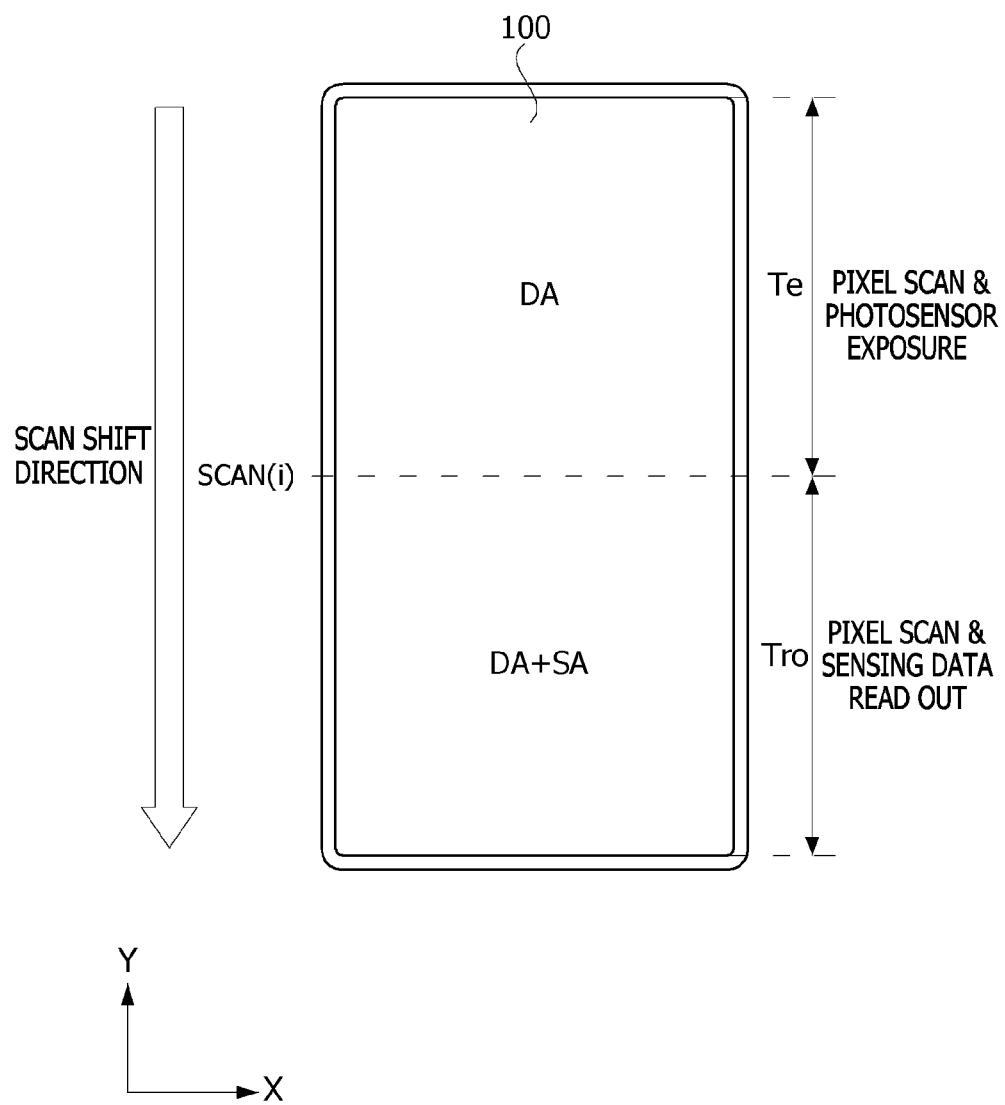

FIGS. 19 and 20 are a diagram illustrating a method for driving a display device according to an embodiment of the present disclosure.

With reference to FIGS. 19 and 20, the display device of the present disclosure may determine the pixel position to which pixel data currently being input is to be written by counting the timing signal synchronized with an input image.

The display device sequentially scans the display pixels of the display panel 100 in units of pixel lines to write pixel data to the display pixels.

Some of the pixel lines of the display panel 100 may include display pixels of the display area DA and display pixels of the first sensing area SA sharing gate lines. In FIG. 20, "SCAN shift direction" indicates the shift direction of the scan pulse. Display pixels are sequentially driven in units of pixel lines along the shift direction of the scan pulse, so that pixel data is sequentially written to the pixel lines. The display pixels of the first sensing area SA and the display area DA may be driven simultaneously at some pixel lines by sharing gate lines to which the scan pulse is applied.

The display pixels of the display area DA are scanned before reaching the first sensing area SA.

The sensor pixels may be exposed for a preset exposure time Te, next output a photoelectric conversion signal (sensor data), and then be initialized. The sensor pixels may be exposed within the scan period in which only the display pixels of the display area DA are driven. Hence, the sensor pixels are exposed to light, and at the same time the display pixels of the display area DA are scanned, so that pixel data may be written to the display pixels (S1).

In the process of sequentially shifting scan pulses in the display area DA, when a pixel line including the sensor pixels of the sensing area SA (e.g., pixel line to which the $i^{th}$, scan pulse SCAN(i) (i is a positive integer greater than 2) is applied) is scanned, the display pixels are scanned and at the same time output signals (e.g., sensor data) of the sensor pixels may be read out through the RX line RXL. The sensor driving circuit COPD of the sensor pixels S is driven in a source follower mode to output sensor data to the RX line RXL. Hence, during the output and initialization time Tro of the sensor pixels after the exposure time Te of the sensor pixels, the display pixels are scanned and pixel data is written to the display pixels, and at the same time sensor data may be output from the sensor pixels (S2 and S3).

In the pixel lines including the first sensing area SA, the sensor pixel may be initialized to the initialization voltage Vini. When the sensor pixel is initialized, pixel data may be written to the display pixels that share the gate line with the sensor pixel. In the pixel lines including the sensor pixels of the first sensing area SA, the sensor pixels output sensor data in sequence pixel line by pixel line according to scan pulses that are shifted sequentially and then are initialized, and the display pixels are scanned in sequence pixel line by pixel line (S4).

Figure 21:
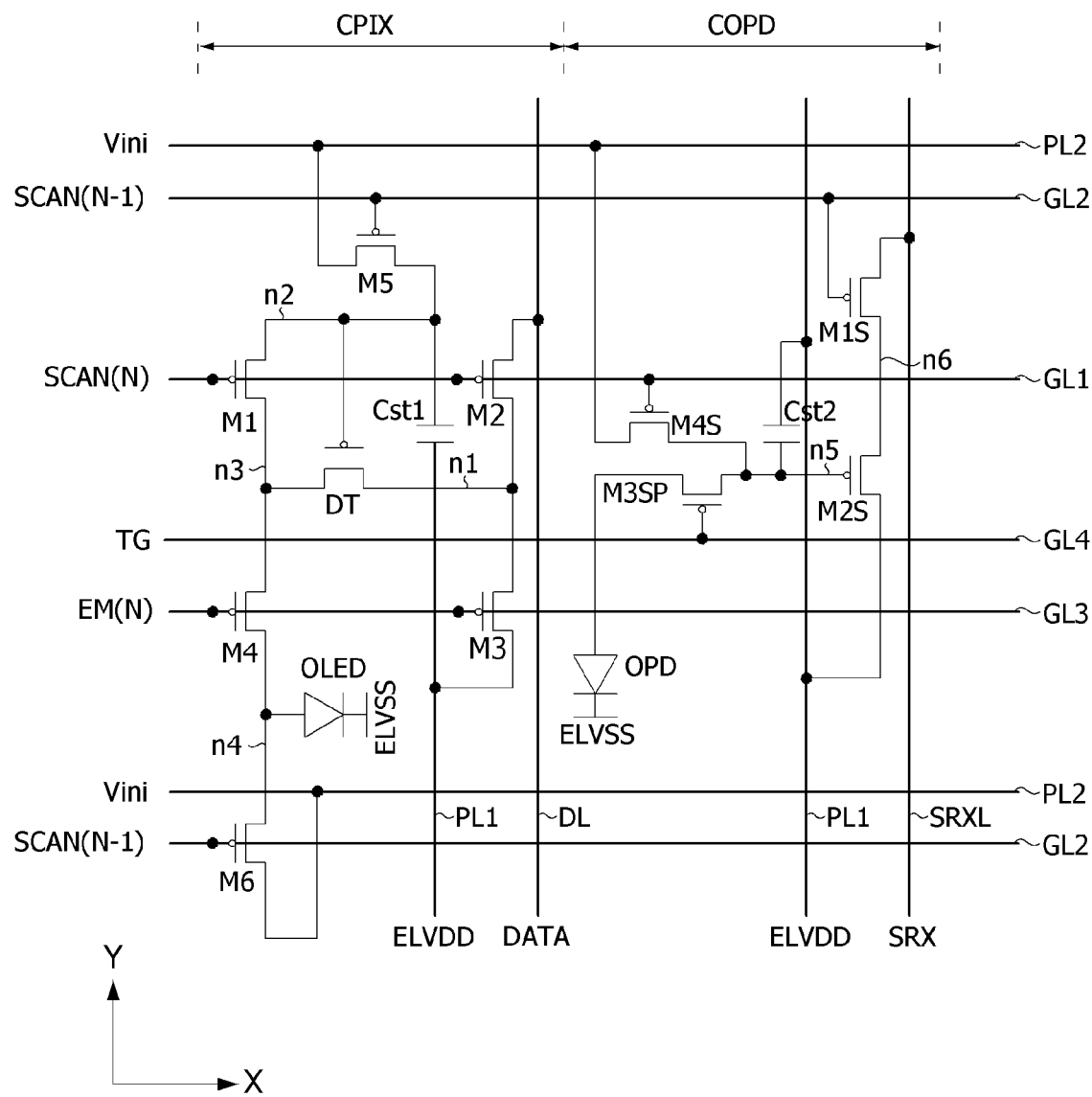
FIG. 21 is a circuit diagram showing a pixel circuit and a sensor driving circuit according to a first embodiment of the present disclosure.
Figure 22:
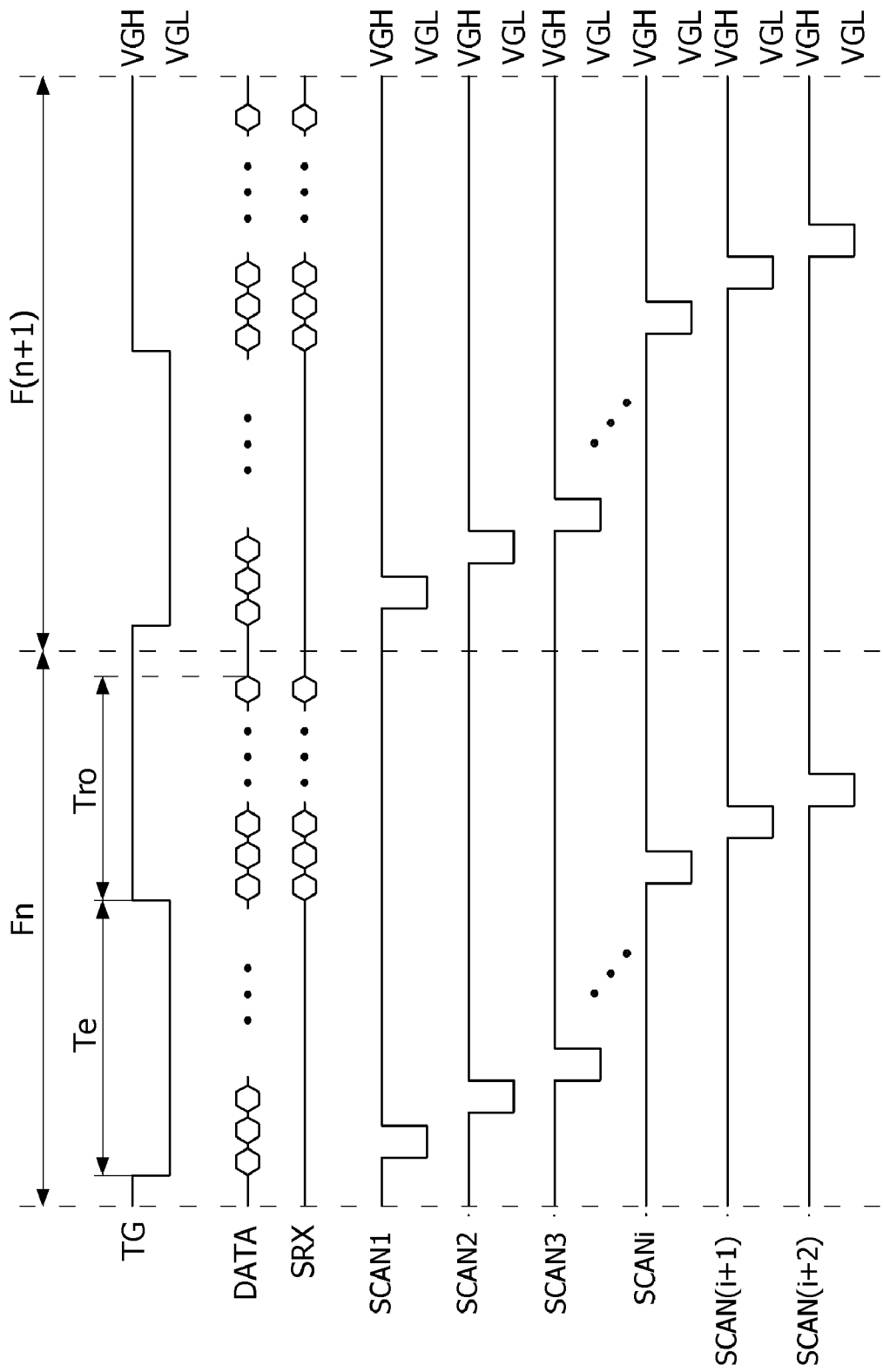
FIG. 22 is a waveform diagram depicting a method for driving the pixel circuit and sensor driving circuit shown in FIG. 21 according to the first embodiment of the present disclosure.

FIG. 21 is a circuit diagram showing a pixel circuit and a sensor driving circuit according to a first embodiment of the present disclosure. FIG. 22 is a waveform diagram depicting a method for driving the pixel circuit CPIX and sensor driving circuit COPD shown in FIG. 21 according to the first embodiment. The pixel circuit CPIX is exemplified by, but not limited to, the pixel circuit shown in FIG. 15. As the pixel circuit has been described above in the embodiment of FIGS. 15 and 16, a detailed description thereof will be omitted. In FIG. 22, "DATA" indicates pixel data written to the display pixels R, G and B in synchronization with the scan pulses SCAN1 to SCAN(i+2), and "SRX" indicates sensor data output from the sensor pixels in synchronization with the scan pulses SCANi to SCAN(i+2). "Fn" indicates the $n^{th}$ frame period (n is a positive integer), and "F(n+1)" indicates the $n+1^{th}$ frame period.

Among the pixel lines including the sensor pixels S, sensor data SRX starts to be output from the sensor pixel in the pixel line to which the pixel data is written in response to the $i^{th}$ scan pulse SCANi. Hence, the output and initialization time Tro of the sensor pixel may be set to a duration ranging from the $i^{th}$ scan pulse SCANi to the scan pulse applied to the last pixel line of the sensing area SA. In FIG. 20, SCAN(i) may be interpreted as the same gate pulse as the $i^{th}$ scan pulse SCANi shown in FIG. 22.

With reference to FIG. 21, the pixel circuit CPIX and the sensor driving circuit COPD share the power lines PL1, PL2 and PL3. In FIG. 21, the VSS line PL3 is omitted. Hence, power sources such as ELVDD, Vini, and ELVSS are commonly applied to the pixel circuit CPIX and the sensor driving circuit COPD.

The sensor driving circuit COPD drives the organic photodiode OPD and outputs sensor data SRX that is generated as a signal photoelectrically converted by the organic photodiode OPD. The sensor data SRX generated by the organic photodiode OPD may be transmitted to the fingerprint recognition processor 500 through the RX line SRXL.

The sensor driving circuit COPD is connected to the VDD line PL1, the Vini line PL2, the VSS line PL3, the gate lines GL1, GL2 and GL4, the RX line SRXL of the sensor pixel, and the like. The gate lines GL1, GL2 and GL4 may be formed of parallel lines crossing the RX line SRXL and the data line DL. The RX line SRXL may be formed of lines parallel to the data line DL and the VDD line PL1.

The sensor driving circuit COPD outputs sensor data SRX in response to the $N-1^{th}$ scan pulse SCAN(N-1) and then is initialized according to the $N^{th}$, scan pulse SCAN(N). The $N-1^{th}$ scan pulse SCAN(N-1) is an example of a scan pulse generated before the $N^{th}$ scan pulse SCAN(N). It should be noted that the $N-1^{th}$ scan pulse SCAN(N-1) is not limited to itself because the $N-1^{th}$ scan pulse SCAN(N-1) can be replaced with another scan pulse, for example, the $N-2^{th}$ scan pulse.

The sensor driving circuit COPD includes an organic photodiode OPD, a capacitor Cst2, and a switch circuit. The switch circuit switches the current path between the organic photodiode OPD and the RX line SRXL in response to the scan pulses SCAN(N-1) and SCAN(N) and the exposure signal TG.

The switch circuit is connected to the organic photodiode OPD, the capacitor Cst2, the first power line PL1, the second power line PL2, the third power line PL3, the RX line SRXL, and the gate lines GL1, GL2 and GL4. The switch circuit includes first to fourth S-switch elements M1S~M4S. The first to fourth S-switch elements M1S~M4S may be implemented with a p-channel TFT.

The organic photodiode OPD includes an anode electrode connected to the third S-switch element M3SP, a cathode electrode to which the low-potential power voltage ELVSS is applied, and an active layer formed between the anode electrode and the cathode electrode. The cathode electrode is connected to the third power line PL3. The active layer ACT-OPD of the organic photodiode OPD includes an organic semiconductor material. The organic photodiode OPD generates a photocurrent according to the received light when a reverse bias voltage is applied. The voltage of the fifth node n5 to which the gate electrode of the second S-switch element M2S is connected is changed due to the electric charge generated by the photocurrent. The capacitor Cst2 is charged with a voltage difference between the voltage of the fifth node n5 and the pixel driving voltage ELVDD.

The capacitor Cst2 is connected between the fifth node n5 and the VDD line PL1. The capacitor Cst2 maintains the voltage of the fifth node n5 that charges electric charges from the organic photodiode OPD when the third S-switch element M3SP is turned on. The exposure time Te of the sensor pixel S is determined according to the pulse width of the exposure signal TG applied to the gate electrode of the third S-switch element M3SP. As the pulse width of the exposure signal TG generated as the gate-on voltage VGL lengthens, the exposure time Te increases, and thus the amount of charge flowing to the fifth node n5 increases.

The first S-switch element M1S is turned on in response to the gate-on voltage VGL of the N−1$^{th}$ scan pulse SCAN(N−1) to thereby connect the sixth node n6 to the RX line RXL. The sixth node n6 is connected to the second electrode of the first S-switch element M1S and the first electrode of the second S-switch element M2S. The gate electrode of the first S-switch element M1S is connected to the second gate line GL2 to which the N−1$^{vth}$ scan pulse SCAN(N−1) is applied. The first electrode of the first S-switch element M1S is connected to the RX line SRXL, and the second electrode of the first S-switch element M1S is connected to the sixth node n6. When the first S-switch element M1S is turned on, the sensor data SRX is output through the RX line SRXL.

The second S-switch element M2S adjusts the amount of current flowing through the RX line SRXL between the VDD line PL1 and the sixth node n6 according to the gate voltage, that is, the voltage of the fifth node n5. The second S-switch element M2S includes a gate electrode connected to the fifth node n5, a first electrode connected to the sixth node n6, and a second electrode connected to the VDD line PL1. The fifth node n5 is connected to the second electrode of the third S-switch element M3SP, the capacitor Cst2, and the gate electrode of the second S-switch element M2S.

The third S-switch element M3SP is turned on according to the gate-on voltage VGL of the exposure signal TG to thereby connect the anode electrode of the organic photodiode OPD to the fifth node n5. When the third S-switch element M3SP is in the on state, a charge from the organic photodiode OPD flows to the fifth node n5. The third S-switch element M3SP includes a gate electrode connected to the fourth gate line GL4 to which the exposure signal TG is applied, a first electrode connected to the anode electrode of the organic photodiode OPD, and a second electrode connected to the fifth node n5. The exposure signal TG is generated as the gate-on voltage VGL during the exposure time Te, and is generated as the gate-off voltage VGH during the output and initialization time Tro of the sensor pixel. Hence, the third S-switch element M3SP is turned on during the exposure time Te, and is turned off during the output and initialization time Tro of the sensor pixel.

The fourth S-switch element M4S is turned on according to the gate-on voltage VGL of the N$^{th}$ scan pulse SCAN(N) to thereby initialize the fifth node n5 to the initialization voltage Vini. The fourth S-switch element M4S includes a gate electrode connected to the first gate line GL1 to which the N$^{th}$ scan pulse SCAN(N) is applied, a first electrode connected to the Vini line PL2 to which the initialization voltage Vini is applied, and a second electrode connected to the fifth node n5.

The initialization voltage Vini charges main nodes of the pixel circuit CPIX and initializes main nodes of the sensor driving circuit COPD. The initialization voltage Vini may be set to a voltage equal to or lower than the low-potential power voltage ELVSS.

With reference to FIG. 22, the display pixels are sequentially scanned line by line during the active interval AT. From the viewpoint of driving the sensor pixels, one frame period of the display device may be divided into an exposure time Te and an output and initialization time Tro of the sensor pixel. For each frame period Fn or F(n+1), the exposure time Te may be set to a duration within the active interval AT or to a duration including the active interval AT and at least a portion of the vertical blank interval VB. The sensor data output time Tro may be set as a time during which a scan signal can be applied to the sensor pixels of the sensing area SA.

During the exposure time Te of the sensor pixel, the first to third scan pulses SCAN1 to SCAN3 may be applied to the gate lines of the pixel lines without a sensor pixel S. During the exposure time Te, pixel data may be written in sequence to the display pixels of the display area DA and/or the second sensing area CA according to the shift direction of the scan pulse, and the organic photodiodes OPD of the sensor pixels S may be exposed to light to generate a photocurrent.

During the output and initialization time Tro of the sensor pixel, the i to i+$_2$th scan pulses SCANi to SCAN(i+2) may be applied to the gate lines of the pixel lines in which the display pixels of the display area DA, and the display pixels and the sensor pixels of the first sensing area SA are disposed. During the output and initialization time Tro of the sensor pixel, pixel data is written to the display pixels, sensor data SRX is output from the sensor pixels, and then the sensor pixels are initialized.

Figure 23:
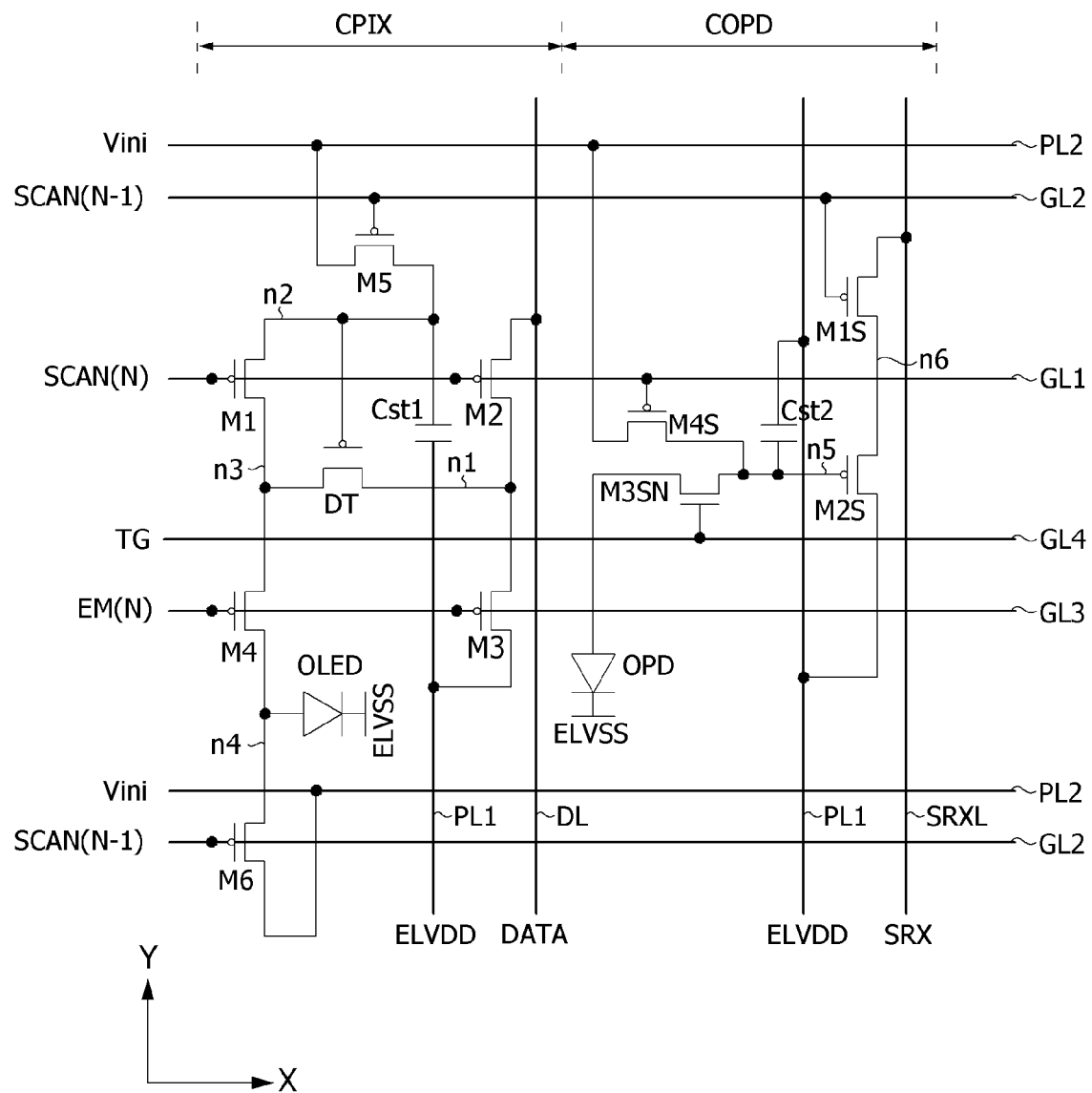
FIG. 23 is a circuit diagram showing a pixel circuit and a sensor driving circuit according to a second embodiment of the present disclosure.
Figure 24:
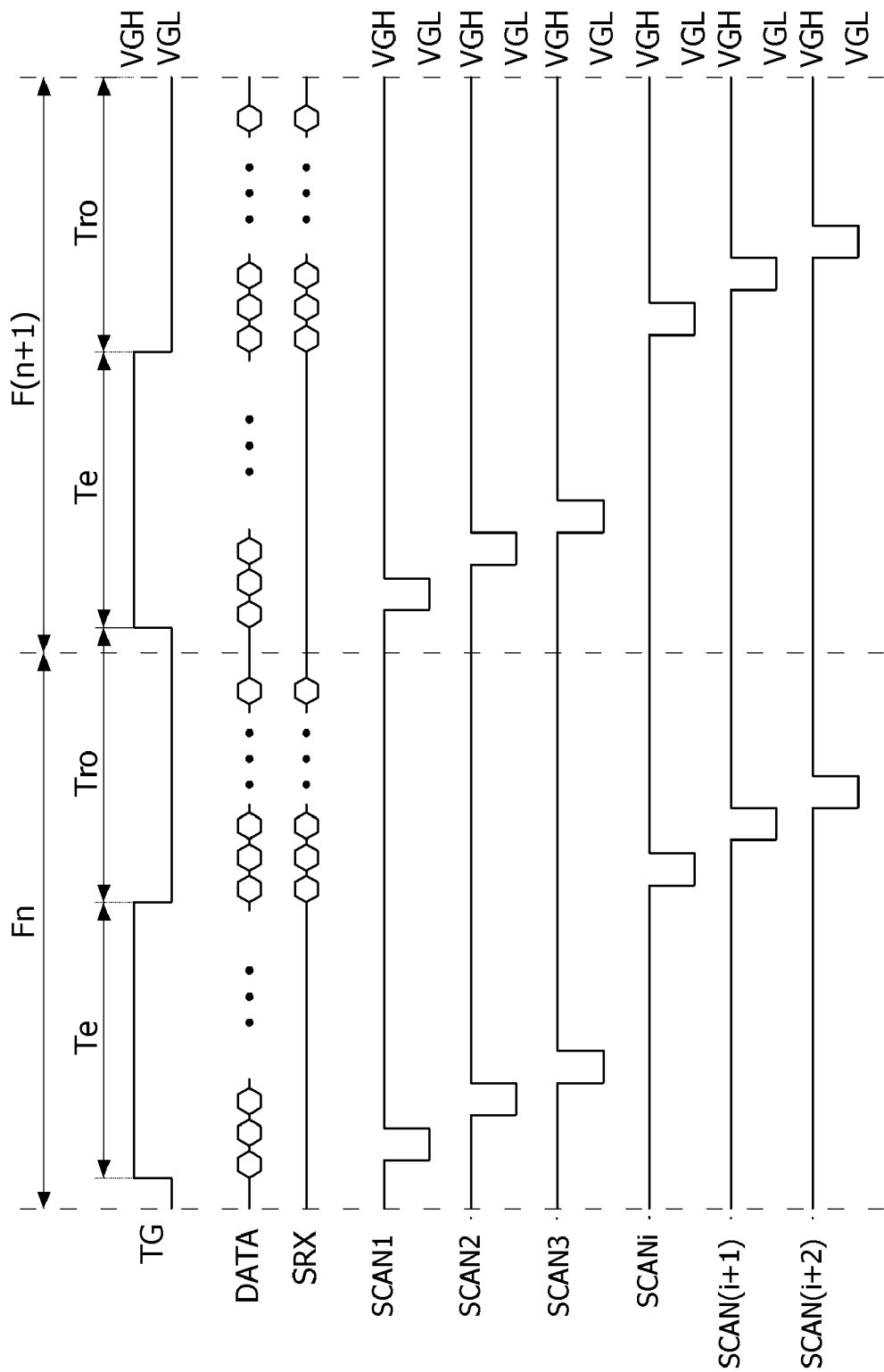
FIG. 24 is a waveform diagram depicting a method for driving the pixel circuit and sensor driving circuit shown in FIG. 23 according to the second embodiment of the present disclosure.

FIG. 23 is a circuit diagram showing a pixel circuit and a sensor driving circuit according to a second embodiment of the present disclosure. FIG. 24 is a waveform diagram depicting a method for driving the pixel circuit and sensor driving circuit shown in FIG. 23 according to the second embodiment. The same reference symbols are assigned to the components substantially the same as those of the embodiment described in FIGS. 19 and 21, and detailed descriptions thereof will be omitted.

With reference to FIGS. 23 and 24, the third S-switch element M3SN of the sensor driving circuit COPD may be implemented with an n-channel oxide TFT to reduce an off current in the off state. In the n-channel oxide TFT, the gate-on voltage is VGH. The pulse of the exposure signal TG is generated as a pulse of the gate-on voltage VGH during the exposure time Te, and is generated as the gate-off voltage VGL during the output and initialization time Tro of the sensor pixel. Hence, the third S-switch element M3SN is turned on during the exposure time Te, and is turned off during the output and initialization time Tro of the sensor pixel.

Figure 25:
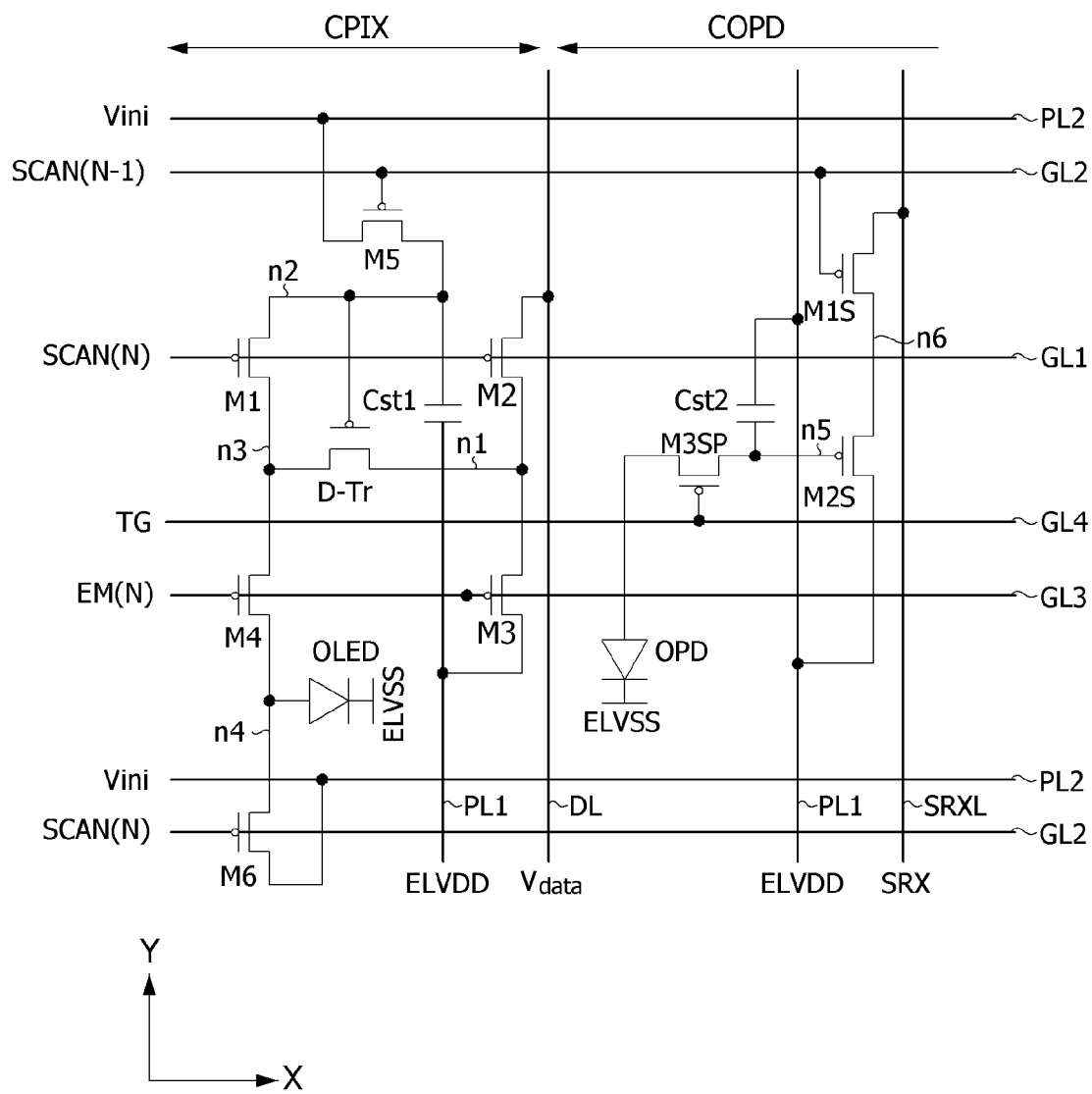
FIG. 25 is a circuit diagram showing a pixel circuit and a photosensor driving circuit according to a third embodiment of the present disclosure.
Figure 26:
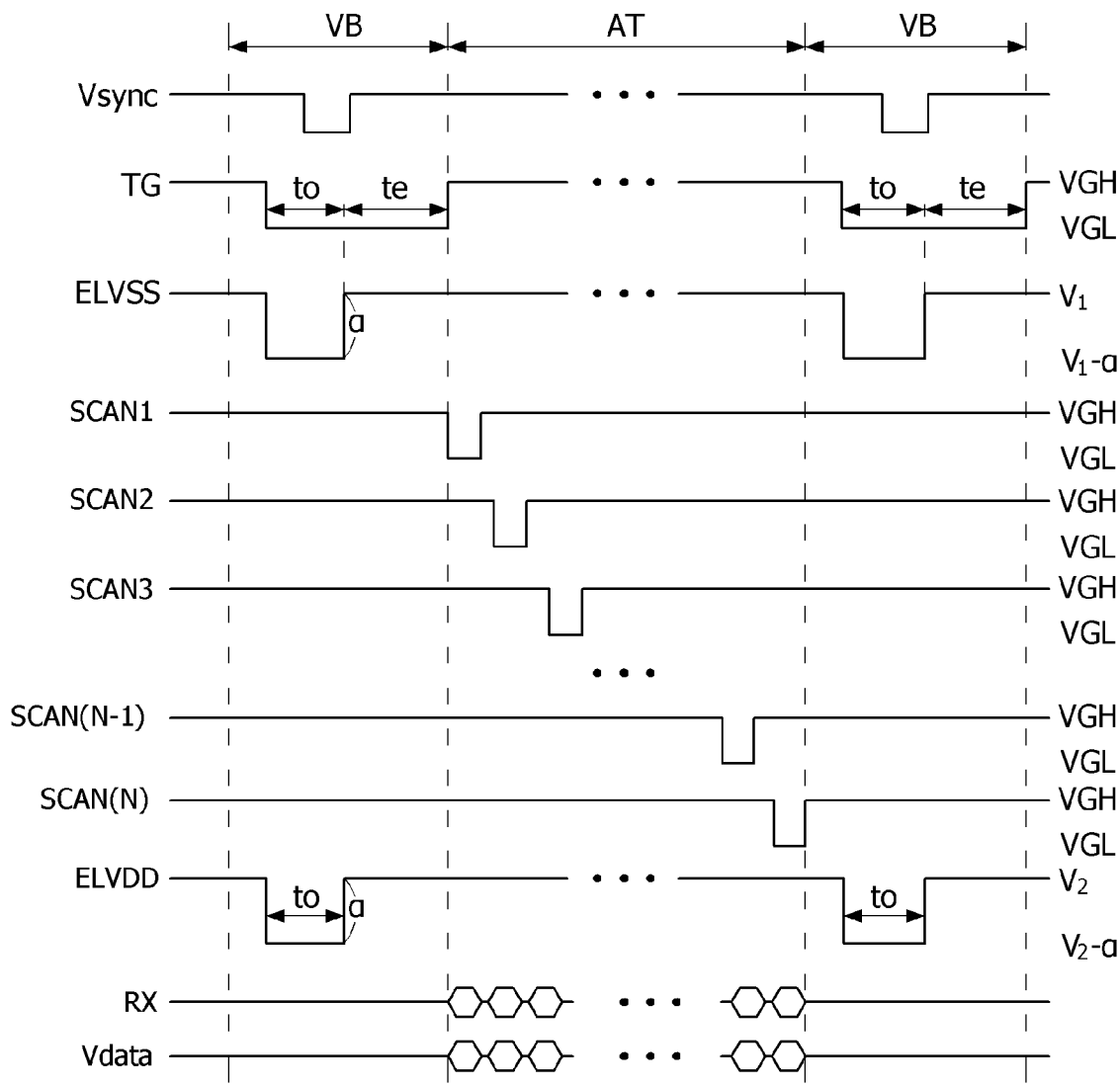
FIG. 26 is a waveform diagram depicting a method for driving the pixel circuit and photosensor driving circuit shown in FIG. 25 according to the third embodiment of the present disclosure.

FIG. 25 is a circuit diagram showing a pixel circuit and a sensor driving circuit according to a third embodiment of the present disclosure. FIG. 26 is a waveform diagram depicting a method for driving the pixel circuit and sensor driving circuit shown in FIG. 25 according to the third embodiment of the present disclosure. As the pixel circuit has been described above, a detailed description thereof will be omitted.

With reference to FIG. 25, power such as ELVDD and ELVSS is applied to the pixel circuit CPIX and the sensor driving circuit COPD.

The sensor driving circuit COPD drives the organic photodiode OPD and outputs sensor data SRX that is obtained from a signal photoelectrically converted by the organic photodiode OPD. The sensor data SRX may be transmitted to the fingerprint recognition processor 500 through the RX line SRXL.

The sensor driving circuit COPD is connected to the VDD line PL1, the VSS line PL3, the second and fourth gate lines GL2 and GL4, the RX line SRXL, and the like. The second and fourth gate lines GL2 and GL4 may be formed of parallel lines crossing the RX line SRXL and the data line DL on the pixel array. The RX line SRXL may be formed of lines parallel to the data line DL and the VDD line PL1.

The sensor driving circuit COPD includes an organic photodiode OPD, a capacitor Cst2, and a switch circuit that is connected to the gate lines GL2 and GL4 and switches the current path between the organic photodiode OPD and the RX line SRXL in response to the scan pulse SCAN(N−1) and the exposure signal TG.

The switch circuit is connected to the organic photodiode OPD, the capacitor Cst2, the VDD line PL1, the VSS line PL3, the RX line SRXL, and the second gate line GL2, and the fourth gate line GL4. The switch circuit includes first to third S-switch elements M1S to M3SP. The first to third S-switch elements M1S to M3SP may be implemented with a p-channel TFT.

The organic photodiode OPD includes an anode electrode connected to the third S-switch element M3SP, a cathode electrode to which the low-potential power voltage ELVSS is applied, and an active layer formed between the anode electrode and the cathode electrode. The active layer of the organic photodiode OPD includes an organic semiconductor material. The organic photodiode OPD generates a photocurrent according to the received light when a reverse bias voltage is applied.

It should be noted that the anode electrode of the organic photodiode OPD and the anode electrode of the light emitting element OLED are disposed on the same layer in the cross-sectional structure of the display panel 100, and the cathode electrode is shared. Due to this structure, the anode electrode of the organic photodiode OPD is connected to the first electrode of the third S-switch element M3SP.

The capacitor Cst2 is connected between the gate electrode of the second S-switch element M2S connected to the fifth node n5 and the VDD line PL1. When the third S-switch element M3SP is turned on, the capacitor Cst2 is charged with the electric charge from the organic photodiode OPD to thereby store the voltage of the photoelectrically converted signal. The exposure time of the photosensor S is determined according to the pulse width of the exposure signal TG applied to the gate electrode of the third S-switch element M3SP. As the pulse width of the exposure signal TG lengthens, the amount of charge of the capacitor Cst2 due to the photosensor S may increase.

The first S-switch element M1S is turned on in response to the gate-on voltage VGL of the N−1$^{th}$ scan pulse SCAN(N−1) to thereby connect the fourth node n4 to the RX line SRXL. The sixth node n6 is connected to the second electrode of the first S-switch element M1S and the first electrode of the second S-switch element M2S. The gate electrode of the first S-switch element M1S is connected to the second gate line GL2 to receive the N−1$^{th}$ scan pulse SCAN(N−1). The first electrode of the first S-switch element M1S is connected to the RX line SRXL, and the second electrode of the first S-switch element M1S is connected to the sixth node n6.

The second S-switch element M2S adjusts the amount of current flowing between the VDD line PL1 and the sixth node n6 according to the gate voltage, that is, the voltage of the fifth node n5. The second S-switch element M2S includes a gate electrode connected to the fifth node n5, a first electrode connected to the sixth node n6, and a second electrode connected to the VDD line PL1. The fifth node n5 is connected to the second electrode of the third S-switch element M3SP, the capacitor Cst2, and the gate electrode of the second S-switch element M2S.

The third S-switch element M3SP is turned on according to the gate-on voltage VGL of the exposure signal TG to thereby connect the anode electrode of the organic photodiode OPD to the fifth node n5. When the third S-switch element M3SP is in the on state, electric charges from the organic photodiode OPD are charged in the capacitor Cst2. The third S-switch element M3SP includes a gate electrode connected to the fourth gate line GL4 to which the exposure signal TG is applied, a first electrode connected to the anode electrode of the organic photodiode OPD, and a second electrode connected to the fifth node n5.

The sensor driving circuit COPD is initialized during the vertical blank interval VB as shown in FIG. 26.

With reference to FIG. 26, the vertical blank interval VB includes a reset time (to) and an exposure time te for the sensor driving circuit COPD. During the active interval AT in which pixel data is received by the timing controller 303, the scan pulses SCAN(N−1) and SCAN(N) and the EM pulse EM(N) are generated and shifted in sequence.

To reset the sensor driving circuit COPD, the voltage levels of the exposure signal TG, the low-potential power voltage ELVSS, and the pixel driving voltage ELVDD are changed within the vertical blank interval VB. During the reset time (to), the organic photodiode OPD and the third S-switch element M3SP are turned on, and the voltage of the fifth node n5 is set to a low-potential power voltage (VSS=$V_1$−α).

As the pixel circuit CPIX and the sensor driving circuit COPD share the power lines PL1 and PL3, the low-potential power voltage ELVSS and the pixel driving voltage ELVDD are applied. In the pixel circuit CPIX, when the voltage applied across the light emitting element OLED changes, the current changes and the luminance changes accordingly. Hence, to keep the luminance of the pixel circuit fixed during the reset time (to) of the sensor driving circuit COPD, although the voltage level of the low-potential power voltage ELVSS and the pixel driving voltage ELVDD may change, the voltage across the light emitting element OLED must not change. In other words, the variation ranges of the low-potential power voltage ELVSS and the pixel driving voltage ELVDD are set to be equal.

The exposure signal TG is generated as a pulse of the gate-on voltage VGL during the reset time (to) and the exposure time te, and it maintains the gate-off voltage VGH for other times. Hence, the third S-switch element M3SP is turned on during the reset time (to) and the exposure time te. The capacitor Cst2 is discharged during the reset time (to), and then is charged with the electric charge from the organic photodiode OPD during the exposure time te to store the electric charge of the photoelectrically converted signal RX.

The low-potential power voltage ELVSS is lowered to a preset voltage $V_1$−α during the reset time (to), and maintains a voltage V1 for other times. During the reset time (to), the cathode voltage of the organic photodiode OPD is lowered to $V_1$−a, so that a forward bias is applied to the organic photodiode OPD. Hence, during the reset time (to), the organic photodiode OPD and the third S-switch element M3SP are turned on to thereby set the voltage of the fifth node n5 to $V_1$−α. The second S-switch element M2S is turned on during the reset time (to). $V_1$−α may be set to a voltage lower than V1 and higher than the gate-on voltage VGL.

During the reset time (to), the voltage across the light emitting element OLED should not be changed so that the current of the light emitting element OLED does not change. To this end, during the reset time (to), the pixel driving voltage ELVDD is lowered as much as the change of the low-potential power voltage ELVSS (u). The pixel driving voltage ELVDD is lowered to $V_2$−α during the reset time (to), and maintains a voltage V2 for other times. The voltage levels of the pixel driving voltage ELVDD and the low-potential power voltage ELVSS may be lowered at the same time and may be raised at the same time. $V_2$ may be set to a voltage higher than $V_1$ and lower than the gate-off voltage VGH.

During the exposure time te, the low-potential power voltage ELVSS rises to $V_1$. The third S-switch element M3SP remains in the on state according to the gate-on voltage VGL during the exposure time te. Here, as the cathode voltage of the organic photodiode OPD rises to $V_1$ and the anode voltage is $V_1-\alpha$, a reverse bias is applied to the organic photodiode OPD. During the exposure time te, the second S-switch element M2S remains in the on state because the gate voltage is $V_1-\alpha$.

When light is irradiated to the active layer ACT-OPD of the organic photodiode OPD during the exposure time te, a photocurrent is generated, the voltage of the capacitor Cst2 changes in proportion to the amount of received light, and the sensor data SRX is stored.

The exposure time te is determined according to the pulse width of the exposure signal TG. The exposure time te may be configured in, but not limited to, the vertical blank interval VB before pixel data is written to the display pixels. The exposure time te may be extended up to a time before the first scan pulse SCAN1 is generated as the gate-on voltage VGL according to the pulse width of the exposure signal TG. In another embodiment, the exposure time te may be extended to the inside of the active interval AT to overlap one or more scan pulses depending on the position of the sensing area SA.

During the active interval AT, the display pixels are sequentially scanned so that pixel data is written to the display pixels, and sensing data, that is, sensor data SRX obtained from the photosensors is read out. During the active interval AT, scan pulses SCAN1 to SCAN(N) synchronized with the data voltage Vdata of the pixel data are applied in sequence to the gate lines GL1 and GL2. The first S-switch element M1S of the sensor driving circuit COPD is turned on according to the gate-on voltage VGL of the scan pulse SCAN(N-1) during the active interval AT to thereby connect the sixth node n6 to the RX line SRXL. At this time, a current flowing through the channel of the second S-switch element M2S, in which the gate-source voltage of the photoelectrically converted signal is set, flows through the first S-switch element M1S to the RX line SRXL.

To prevent or at least reduce the data voltage Vdata from affecting the sensor data RX, in the pixel circuit CPIX and the sensor driving circuit COPD sharing the gate lines GL2 and GL4, the scan pulse for controlling the second switch element M2 of the pixel circuit is separated from the scan pulse for controlling the first S-switch element M1S of the sensor driving circuit COPD. For example, the gate electrode of the second switch element M2 may be connected to the first gate line GL1 to which the $N^{th}$ scan pulse SCAN(N) is applied, and the gate electrode of the first S-switch element M1S may be connected to the second gate line GL2 to which the $N-1^{th}$ scan pulse SCAN(N-1) is applied. The scan pulse for controlling the first S-switch element M1S is not limited to the $N-1^{th}$, scan pulse SCAN(N-1).

Figure 27:
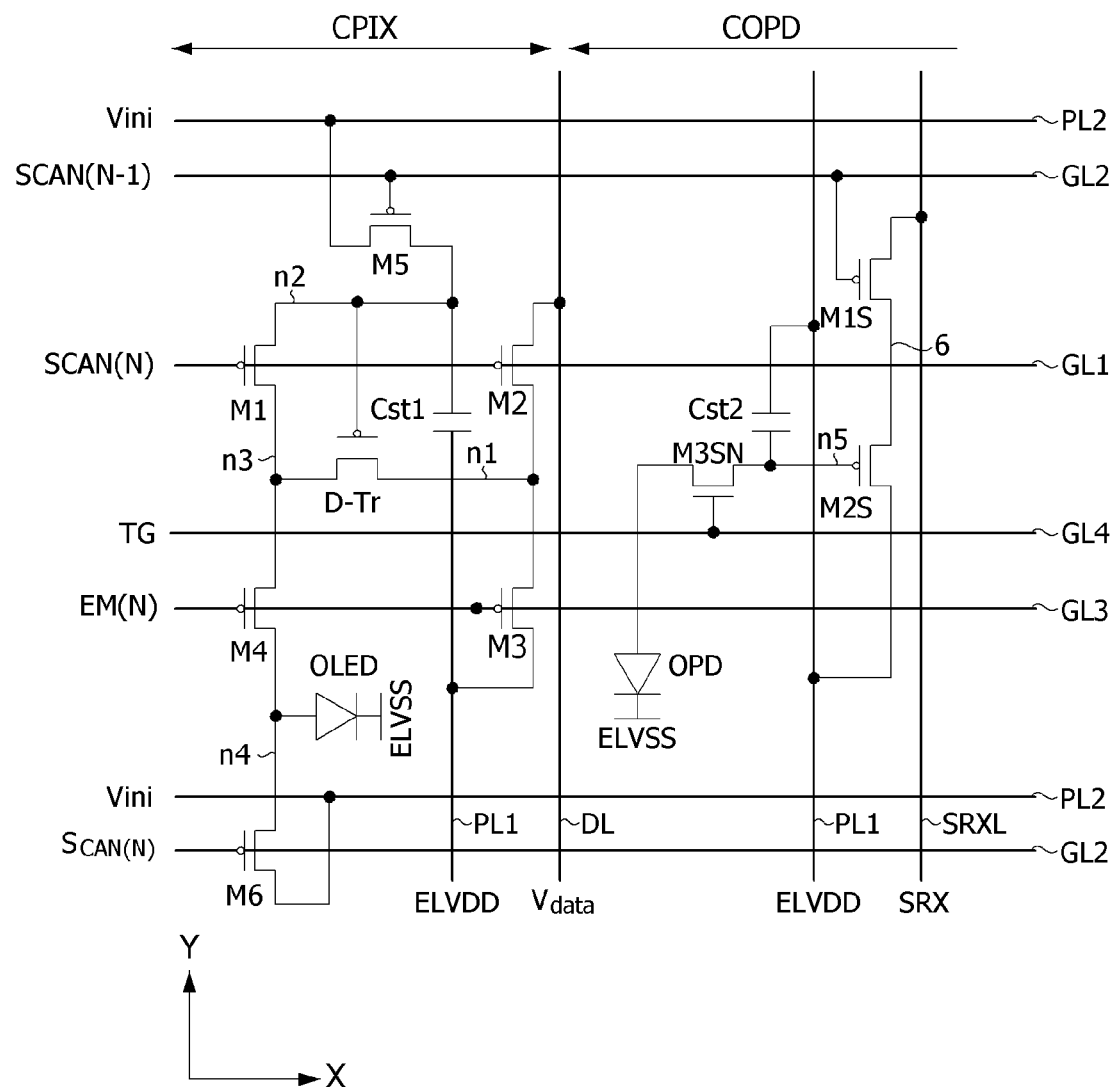
FIG. 27 is a circuit diagram showing a pixel circuit and a photosensor driving circuit according to a fourth embodiment of the present disclosure.
Figure 28:
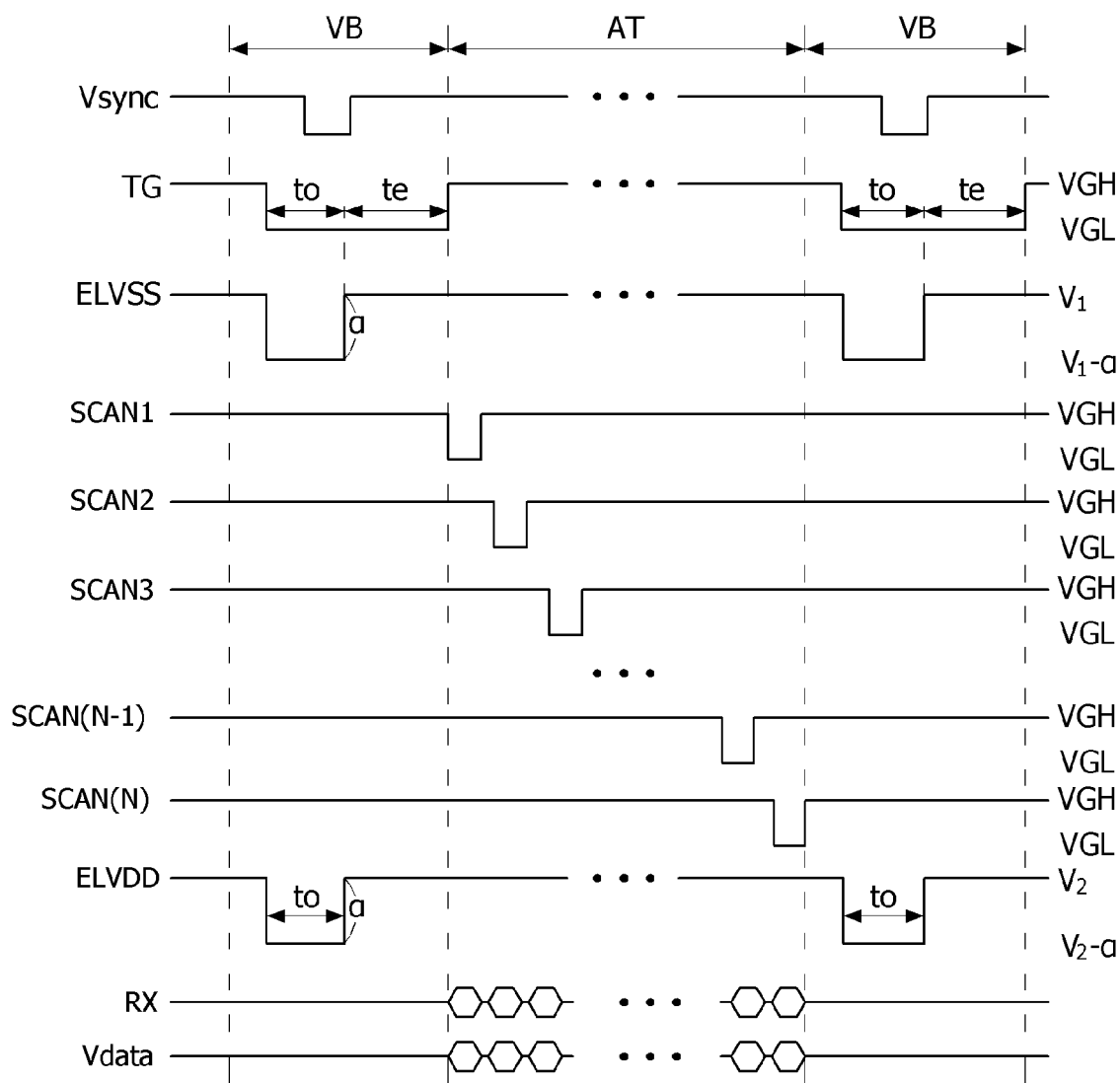
FIG. 28 is a waveform diagram depicting a method for driving the pixel circuit and photosensor driving circuit shown in FIG. 27 according to the fourth embodiment of the present disclosure.

FIG. 27 is a circuit diagram showing a pixel circuit and a sensor driving circuit according to a fourth embodiment of the present disclosure. FIG. 28 is a waveform diagram depicting a method for driving the pixel circuit and sensor driving circuit shown in FIG. 27 according to the fourth embodiment. In FIGS. 27 and 28, components that are substantially the same as those of the above-described embodiment are denoted by the same reference symbols, and detailed descriptions thereof will be omitted.

With reference to FIGS. 28 and 29, the third S-switch element M3SN of the sensor driving circuit COPD may be implemented with an n-channel oxide TFT to reduce an off current in the off state. In the n-channel TFT, the gate-on voltage is VGH. Hence, the pulse of the exposure signal TG is generated as a pulse of the gate-on voltage VGH during the initialization time to and the exposure time te.

FIG. 29 is a circuit diagram showing a gamma compensation voltage generator according to an embodiment of the present disclosure.

With reference to FIG. 29, the gamma compensation voltage generator 305 receives a high-potential gamma reference voltage VRH and a low-potential gamma reference voltage VRL from the power supply 304, and outputs a gamma compensation voltage (or, display driving voltage) for each grayscale for driving the display and a light source driving voltage. When the driving element DT of the pixel circuit CPIX is driven as a p-channel TFT, the amount of current increases as the gate voltage decreases. Hence, as the gamma compensation voltage output from the gamma compensation voltage generator 305 is lower, the light emitting elements OLED of the pixels and the sensing light source may emit light with higher luminance.

The gamma compensation voltage generator 305 includes an input voltage selector, a grayscale voltage generator 700 for generating a gamma compensation voltage for display driving, and a light source driving voltage generator 800.

The gamma compensation voltage generator 305 includes a plurality of voltage divider circuits and a plurality of multiplexers MUX01 to MUX18. The voltage divider circuit divides a voltage between the high-potential voltage and the low-potential voltage by using resistors connected in series to output voltages having different voltage levels. Each of the multiplexers MUX01 to MUX18 selects a voltage indicated by a resistor setting value REG01 to REG18 from among the voltages divided by the divider circuit. The timing controller 303 may input register setting values to the control terminals of the multiplexers MUX01 to MUX18 in each of the display mode and the fingerprint recognition mode to adjust the voltage level of the output voltages V0 to V256 of the gamma compensation voltage generator 305 for each mode. The register setting values REG01 to REG18 may be defined by the register setting data stored in the memory 302 and may be updated through a standard communication interface such as I²C.

The input voltage selector includes a voltage divider circuit RS01, a multiplexer MUX01 that selects the highest grayscale voltage V255 according to a first register setting value REG01, a multiplexer MUX02 that selects a lower gamma compensation voltage according to a second register setting value REG02, and a multiplexer MUX03 that outputs the lowest gamma compensation voltage V0 according to a third register setting value REG03. The voltage V255 output from the multiplexers MUX01 is supplied to the grayscale voltage generator 700 and the voltage divider circuit of the light source driving voltage generator 800.

The light source driving voltage generator 800 includes a tenth voltage divider circuit RS10 connected between the VRL node and the V255 node, and multiplexers MUX10 and MUX20. The voltage divider circuit RS10 divides a voltage between the low-potential gamma reference voltage VRL and the highest grayscale voltage V255. The output voltages of the voltage divider circuit RS10 have voltage levels higher than that of the highest grayscale voltage V255. The multiplexer MUX10 selects and outputs one of the voltages divided by the divider circuit RS10 according to a fourth register setting value REG10. A voltage from the multiplex MUX10 may be linked to the display brightness value (DBV) so that the voltage level thereof may be variable. For example, a higher DBV value may result in a higher output voltage for the multiplexer MUX10. The DBV is luminance setting data for varying luminance according to a luminance sensor output signal of the host system 200 or a luminance input value of the user. The register setting value REG10 may be varied depending on the DBV. The output voltage of the multiplexer MUX10 may be selected from a grayscale voltage range higher than the highest grayscale voltage V255.

In the fingerprint recognition mode, as the display pixels of the first sensing area SA are driven as a light source, they may emit light with a luminance higher than that of the display area DA. In this case, the data voltage applied to the display pixels of the first sensing area SA in the fingerprint recognition mode may be applied to the light source driving voltage V256 having a grayscale higher than the highest grayscale voltage V255 of the display mode.

The multiplexer MUX20 selects one of a separate reference voltage (DBV unlinked voltage) set independently of the DBV and the DBV linked voltage output from the multiplexer MUX10 to output a light source driving voltage V256 under the control of the host system 200. The DBV unlinked voltage is a voltage of a grayscale higher than the highest grayscale voltage V255. The host system 200 may control the output voltage of the multiplexer MUX20 by using the enable signal EN in the fingerprint recognition mode. Hence, the DBV linked voltage or the DBV unlinked voltage output from the multiplexer MUX20 is a light source driving voltage V256 higher than the highest grayscale voltage V255.

The grayscale voltage generator 700 includes a plurality of divider circuits RS11 to RS17 and a plurality of multiplexers MUX11 to MUX18.

The first-first divider circuit R11 divides a voltage between the output voltage of the zeroth-first multiplexer MUX01 and the output voltage of the zeroth-second multiplexer MUX02. The first-first multiplexer MUX11 selects one of the voltages divided by the first-first voltage divider circuit R11 according to a register setting value REG11. The output voltage of the first-first multiplexer MUX11 may be output through a buffer and may be a gamma compensation voltage V191 corresponding to grayscale 191. The first-second voltage divider circuit R12 divides a voltage between the output voltage of the first-first multiplexer MUX11 and the output voltage of the zeroth-second multiplexer MUX02. The first-second multiplexer MUX12 selects one of the voltages divided by the voltage divider circuit R12 according to a register setting value REG12. The output voltage of the first-second multiplexer MUX12 may be output through a buffer and may be a gamma compensation voltage V127 corresponding to grayscale 127.

The first-third divider circuit R13 divides a voltage between the output voltage of the first-second multiplexer MUX12 and the output voltage of the zeroth-second multiplexer MUX02. The first-third multiplexer MUX13 selects one of the voltages divided by the voltage divider circuit R13 according to a register setting value REG13. The output voltage of the first-third multiplexer MUX13 may be output through a buffer and may be a gamma compensation voltage V63 corresponding to grayscale 63. The first-fourth divider circuit R14 divides a voltage between the output voltage of the first-third multiplexer MUX13 and the output voltage of the zeroth-second multiplexer MUX02. The first-fourth multiplexer MUX14 selects one of the voltages divided by the voltage divider circuit R14 according to a register setting value REG14. The output voltage of the first-fourth multiplexer MUX14 may be output through a buffer and may be a gamma compensation voltage V31 corresponding to grayscale 31.

The first-fifth divider circuit R15 divides a voltage between the output voltage of the first-fourth multiplexer MUX14 and the output voltage of the zeroth-second multiplexer MUX02. The first-fifth multiplexer MUX15 selects one of the voltages divided by the voltage divider circuit R15 according to a register setting value REG15. The output voltage of the first-fifth multiplexer MUX15 may be output through a buffer and may be a gamma compensation voltage V15 corresponding to grayscale 15. The first-sixth divider circuit R16 divides a voltage between the output voltage of the first-fifth multiplexer MUX15 and the output voltage of the zeroth-second multiplexer MUX02. The first-sixth multiplexer MUX16 selects one of the voltages divided by the voltage divider circuit R16 according to a register setting value REG16. The output voltage of the first-sixth multiplexer MUX16 may be output through a buffer and may be a gamma compensation voltage V7 corresponding to grayscale 7.

The first-seventh divider circuit R17 divides a voltage between the output voltage of the first-sixth multiplexer MUX16 and the output voltage of the zeroth-second multiplexer MUX02. The first-seventh multiplexer MUX17 selects one of the voltages divided by the voltage divider circuit R17 according to a register setting value REG17. The output voltage of the first-seventh multiplexer MUX17 may be output through a buffer and may be a gamma compensation voltage V4 corresponding to grayscale 4. The first-eighth divider circuit R18 divides a voltage between the highest grayscale voltage and the lowest grayscale voltage among the voltages divided by the first-seventh divider circuit R17. The first-eighth multiplexer MUX18 selects one of the voltages divided by the voltage divider circuit R18 according to a register setting value REG18. The output voltage of the first-eighth multiplexer MUX18 may be output through a buffer and may be a gamma compensation voltage V1 corresponding to grayscale 1.

The grayscale voltage generator 700 further includes a plurality of voltage divider circuits RS21 to RS28. The second-first voltage divider circuit R21 divides a voltage between the highest gamma compensation voltage V255 and a voltage V191 of grayscale 191 to output a gamma compensation voltage between the highest grayscale and grayscale 191. The second-second voltage divider circuit R22 divides a voltage between a voltage V191 of grayscale 191 and a voltage V127 of grayscale 127 to output a gamma compensation voltage between grayscale 191 and grayscale 127. The second-third voltage divider circuit R23 divides a voltage between a voltage V127 of grayscale 127 and a voltage V63 of grayscale 63 to output a gamma compensation voltage between grayscale 127 and grayscale 63. The second-fourth voltage divider circuit R24 divides a voltage between a voltage V63 of grayscale 63 and a voltage V31 of grayscale 31 to output a gamma compensation voltage between grayscale 63 and grayscale 31. The second-fifth voltage divider circuit R25 divides a voltage between a voltage V31 of grayscale 31 and a voltage V15 of grayscale 15 to output a gamma compensation voltage between grayscale 31 and grayscale 15. The second-sixth voltage divider circuit R26 divides a voltage between a voltage V15 of grayscale 15 and a voltage V7 of grayscale 7 to output a gamma compensation voltage between grayscale 15 and grayscale 7. The second-seventh voltage divider circuit R27 divides a voltage between a voltage V7 of grayscale 7 and a voltage V4 of grayscale 4 to output a gamma compensation voltage between grayscale 7 and grayscale 4. The second-eighth voltage divider circuit R28 divides a voltage between a voltage V4 of grayscale 4 and a voltage V1 of grayscale 1 to output a gamma compensation voltage between grayscale 4 and grayscale 1.

The gamma compensation voltage generator 305 may include an R gamma compensation voltage generator, a G gamma compensation voltage generator, and a B gamma compensation voltage generator in order to obtain an optimum gamma compensation voltage for each color of the subpixels. In this case, the resistor setting value may be set to different voltages for the R gamma compensation voltage generator, the G gamma compensation voltage generator, and the B gamma compensation voltage generator. The gamma compensation voltages output from the R gamma compensation voltage generator are a grayscale voltage of the data voltage to be supplied to the R subpixel. The gamma compensation voltages V0 to V256 output from the G gamma compensation voltage generator are a grayscale voltage of the data voltage to be supplied to the G subpixel. The gamma compensation voltages output from the B gamma compensation voltage generator are a grayscale voltage of the data voltage to be supplied to the B subpixel.

The gamma compensation voltages V0 to V255 for individual grayscales and the light source driving voltage V256 are input to the DAC of the data driver 306. The DAC of the data driver 306 converts the pixel data received from the timing controller 303 into different gamma compensation voltages for individual grayscales and generates a data voltage Vdata for display driving. In the fingerprint recognition mode, the data driver 306 converts the light source driving data received from the timing controller 303 into a light source driving voltage V256, and supplies it to the display pixels of the first sensing area SA being used as a light source through the data line.

The PPI of the first and second sensing areas SA and CA is lower than that of the display area DA. For this reason, when the display pixels of the display area DA and the display pixels of the sensing areas SA and CA are driven with the same data voltage at the same grayscale, the luminance of the sensing areas SA and CA may be lowered. According to the present disclosure, in the fingerprint sensing mode, the register setting value of the gamma compensation voltage generator 305 is changed so as to expand the dynamic range of the data voltage applied to the display pixels of the sensing area SA, thereby increasing the luminance of the display pixels in the sensing areas SA and CA. The gate-source voltage of the driving element may be varied according to the data voltage, so that the amount of currents flowing to the light emitting element OLED increases, thereby increasing the luminance of display pixels.

Figure 30:
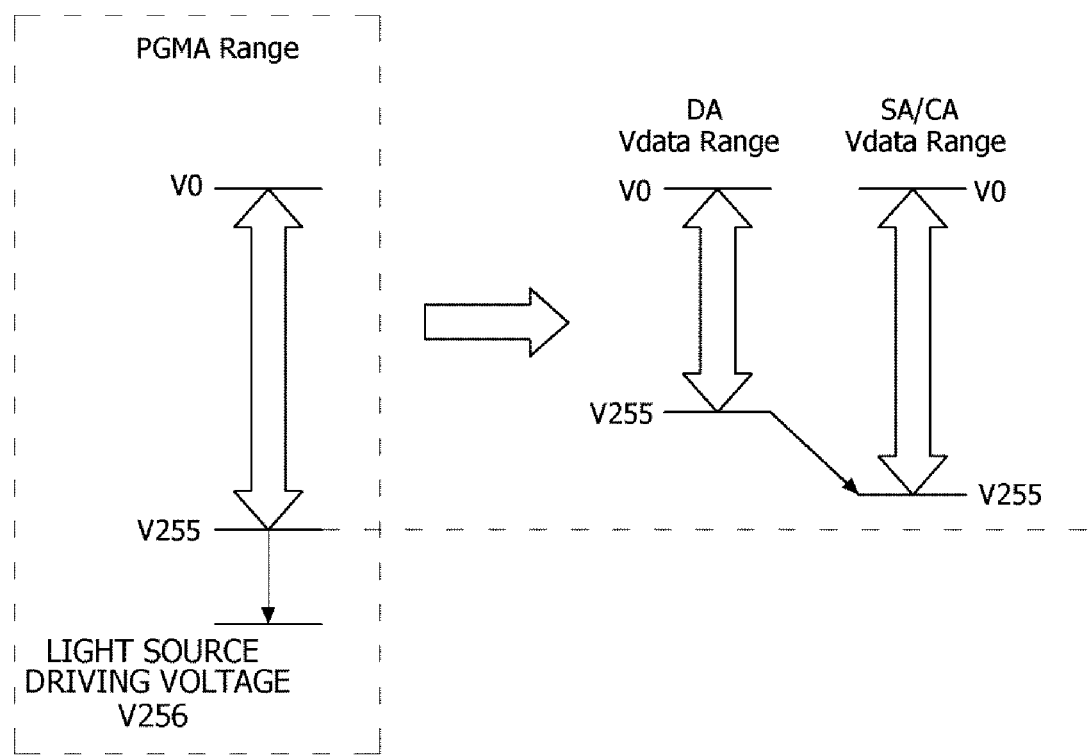
FIG. 30 is a diagram illustrating a data voltage applied to pixels in the display area and a data voltage applied to pixels in the sensing area according to an embodiment of the present disclosure.

FIG. 30 is a diagram illustrating a data voltage applied to pixels in the display area DA and a data voltage applied to pixels in the sensing area according to one embodiment. "PGMA Range" in FIG. 26 represents the range of the output voltage of the grayscale voltage generator 305.

With reference to FIG. 30, the data voltage of the pixel data output from the data driver 306 may be set differently in the display area DA and the sensing areas SA and CA. As the PPI of the sensing areas SA and CA is low, the range of the data voltage to be applied to the display pixels of the sensing area SA is larger than that of the data voltage Vdata to be applied to the display pixels of the display area DA. Hence, the data voltage Vdata applied to the gate of the driving element DT of the display pixels in the sensing areas SA and CA is set to a voltage lower than that of the display area DA. As a result, when the voltage V255 of grayscale 255 is applied to the driving element DT of the sensing areas SA and CA, as the voltage (anode voltage) applied to the anode electrode of the light emitting element OLED through the driving element DT becomes higher than the anode voltage of the display area DA, it is possible to compensate for a decrease in luminance of the sensing areas SA and CA.

As described above, since the resolution and PPI of the sensing areas SA and CA are lower than that of the display area DA, when the same current is supplied to the light emitting elements OLED at the same grayscale, the luminance of the sensing areas SA and CA may be lowered. To compensate for this luminance difference, the data voltage Vdata applied to the sensing areas SA and CA may be raised to further increase the current applied to the light emitting elements OLED. The data voltage Vdata is determined according to the gamma compensation voltage. To this end, the gamma compensation voltage may be set with different register setting values for different areas DA, SA and CA.

Figure 32:
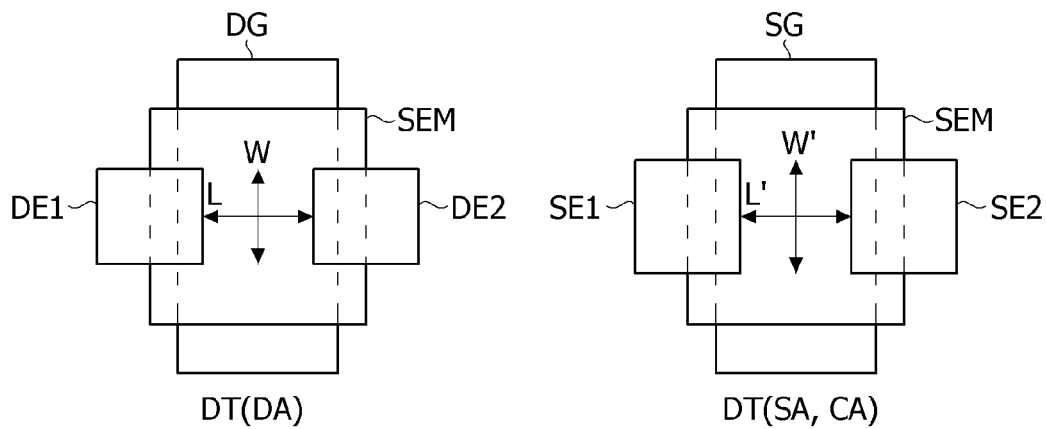
FIG. 32 is a plan view schematically showing the channel of a transistor in the display area and the sensing area according to an embodiment of the present disclosure.
Figure 33:
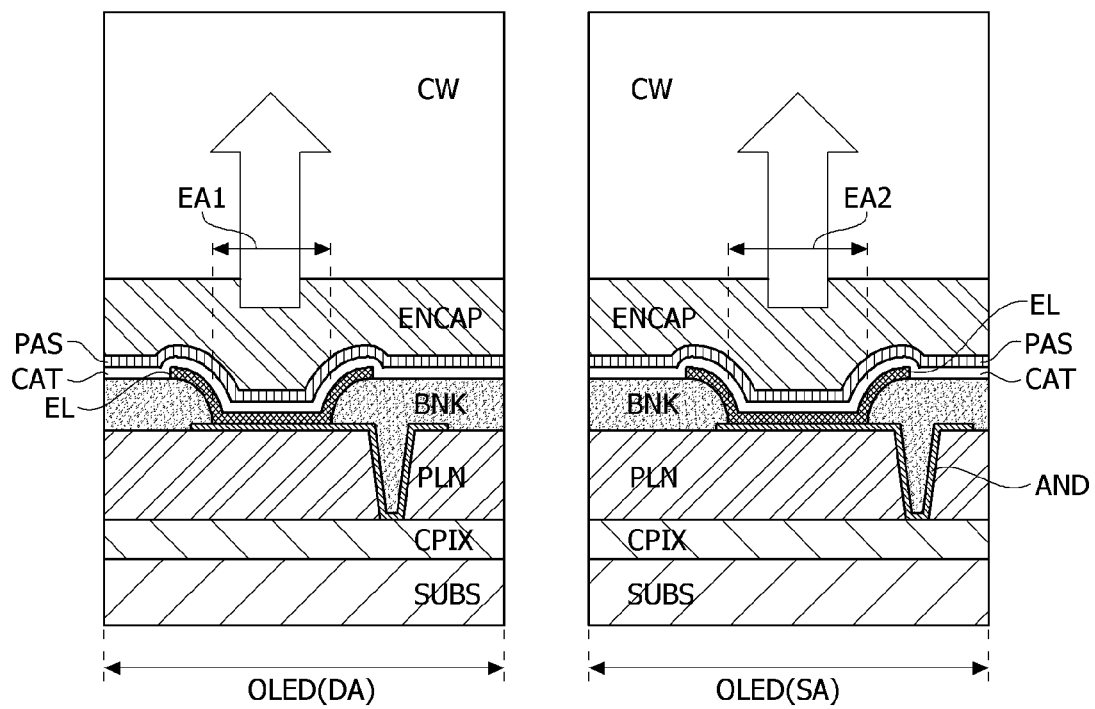
FIG. 33 is a cross-sectional view illustrating emission areas of display pixels in the display area and the sensing area according to an embodiment of the present disclosure.

To compensate for the decrease in luminance of the sensing areas SA and CA, in another embodiment, as shown in FIG. 32, the channel ratio W/L of the driving element DT for driving the light emitting element OLED may be designed to be larger in the sensing areas SA and CA than in the display area DA. In another embodiment, as shown in FIG. 33, the emission area of the display pixels R, G and B may be designed to be larger in the sensing areas SA and CA than in the display area DA.

Figure 31:
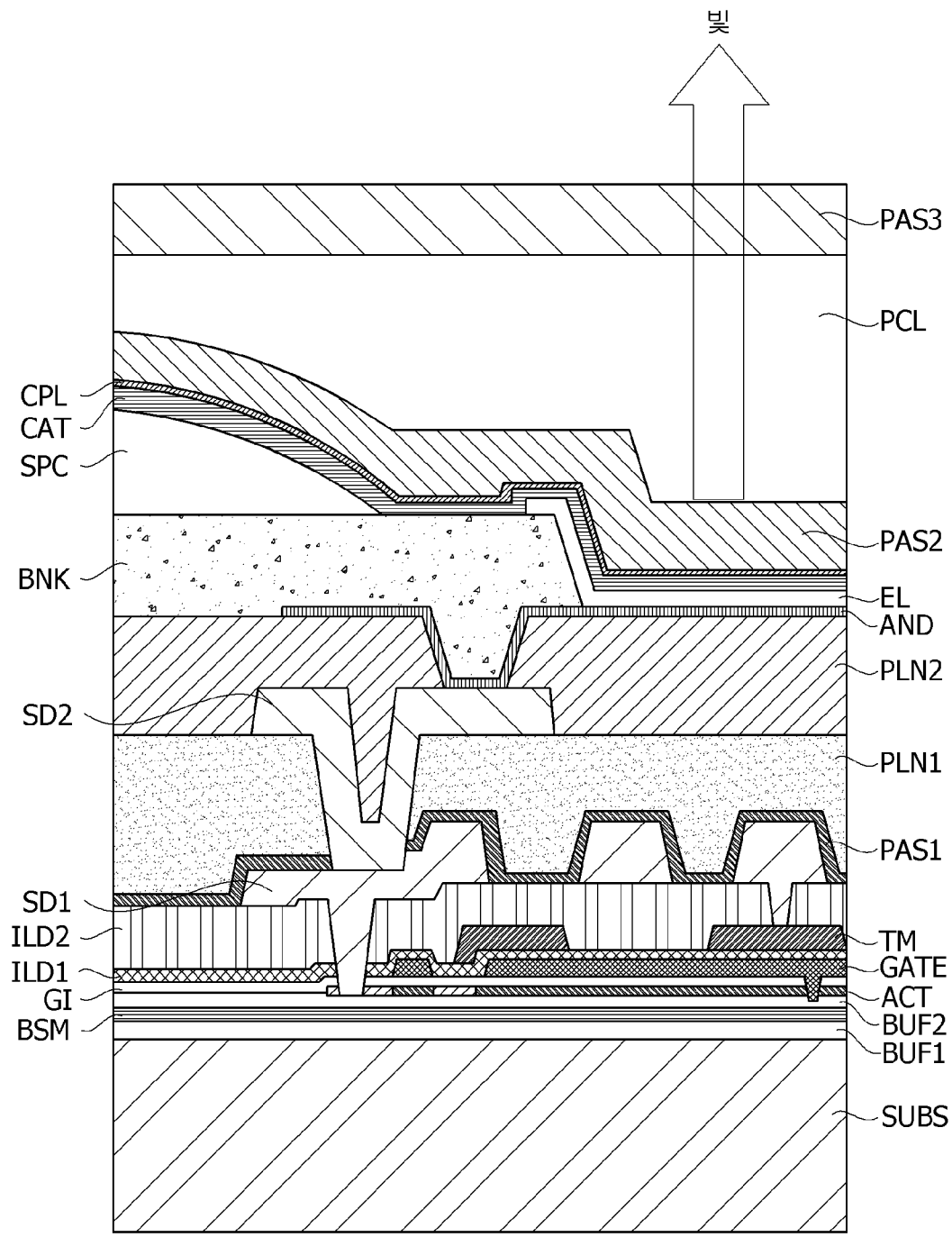
FIG. 31 is a cross-sectional view illustrating in detail a cross-sectional structure of a display pixel according to an embodiment of the present disclosure.

FIG. 31 is a cross-sectional view illustrating in detail a cross-sectional structure of a display pixel according to one embodiment.

With reference to FIG. 31, a first buffer layer BUF1 may be formed on the substrate SUBS. A first metal layer may be formed on the first buffer layer BUF1. A second buffer layer BUF2 may be formed on the first metal layer. The first metal layer is patterned in a photolithography process. The first metal layer may include a light shield pattern BSM. The light shield pattern BSM blocks or at least reduces external light so that light is not irradiated to the active layer of the transistor. Each of the first and second buffer layers BUF1 and BUF2 may be made of an inorganic insulating material, and may have a structure in which one or more insulating layers are stacked.

An active layer ACT may be formed of a semiconductor material, for example, a-Si, deposited on the second buffer layer BUF2, and may be patterned through a photolithography process. The active layer ACT includes an active pattern of a transistor. A portion of the active layer ACT may be metallized by ion doping. The metallized portion may be used as a jumper pattern connecting metal layers at some nodes of the pixel circuit so as to connect components of the pixel circuit.

A gate insulating film GI may be formed on the active layer ACT. The gate insulating film GI may be made of an inorganic insulating material. A second metal layer may be formed on the gate insulating film GI. The second metal layer may be patterned through a photolithography process. The second metal layer may include a gate line and a gate electrode GATE, a bottom electrode of the storage capacitor Cst1, a jumper pattern connecting the patterns of the first metal layer and the third metal layer, and the like.

A first interlayer insulating film ILD1 may cover the second metal layer. A third metal layer may be formed on the first interlayer insulating film ILD2, and a second interlayer insulating film ILD2 may cover the third metal layer. The third metal layer may be patterned through a photolithography process. The third metal layer may include metal patterns TM such as the top electrode of the storage capacitor Cst1 and the third power line. The first and second interlayer insulating films ILD1 and ILD2 may include an inorganic insulating material.

A fourth metal layer may be formed on the second interlayer insulating film ILD2, and an inorganic insulating film PAS1 and a first planarization layer PLN1 may be stacked thereon. A fifth metal layer may be formed on the first planarization layer PLN1.

Some patterns of the fourth metal layer may be connected to the third metal layer through a contact hole penetrating the first planarization layer PLN1 and the inorganic insulating film PAS1. The first and second planarization layers PLN1 and PLN2 may be made of an organic insulating material that planarizes the surface.

The fourth metal layer may include the first and second electrodes of a transistor connected to the active pattern of the transistor through a contact hole penetrating the second interlayer insulating film ILD2. The data line DL and the power lines PL1, PL2 and PL3 may be implemented with a fourth metal layer pattern SD1 or a fifth metal layer pattern SD2.

The anode electrode AND of the light emitting element OLED may be formed on the second planarization layer PLN2. The anode electrode AND may be connected to an electrode of a transistor used as a switch element or a driving element through a contact hole penetrating the second planarization layer PLN2. The anode electrode AND may be made of a transparent or translucent electrode material.

The pixel defining film BNK may cover the anode electrode AND of the light emitting element OLED. The pixel defining film BNK is formed in a pattern defining an emission area (or, opening area) through which light passes from each of the pixels to the outside. A spacer SPC may be formed on the pixel defining film BNK. The pixel defining film BNK and the spacer SPC may be integrated with the same organic insulating material. The spacer SPC secures a gap between an FMM and the anode electrode AND so that the FMM does not contact the anode electrode AND in the deposition process of the organic compound layer EL.

An organic compound layer EL is formed in the emission area of each of the pixels defined by the pixel defining film BNK. The cathode electrode CAT of the light emitting element OLED is formed on the entire surface of the display panel 100 so as to cover the pixel defining film BNK, the spacer SPC, and the organic compound layer EL. The cathode electrode CAT may be connected to the VSS line PL3 formed by any one of the lower metal layers. A capping layer CPL may cover the cathode electrode CAT. The capping layer CPL is formed of an inorganic insulating material and protects the cathode electrode CAT by blocking the penetration of air and out-gassing of an organic insulating material applied on the capping layer CPL. An inorganic insulating film PAS2 may cover the capping layer CPL, and a planarization layer PCL of the encapsulation layer may be formed on the inorganic insulating film PAS2. The planarization layer PCL may include an organic insulating material. The inorganic insulating film PAS3 of the encapsulation layer may be formed on the planarization layer PCL.

In the first sensing area SA, the organic compound layer of the organic photodiode OPD may be formed between the anode electrode AND and the cathode electrode CAT on the same plane as the organic compound layer EL of the light emitting element OLED.

FIG. 32 is a plan view schematically showing the channel of a transistor in the display area and the sensing area according to one embodiment. In FIG. 32, "DT(DA)" is a driving element DT of the pixel circuit CPIX disposed in the display area DA. "DT(SA, CA)" is a driving element DT of the pixel circuit CPIX disposed in at least one of the sensing areas SA and CA.

With reference to FIG. 32, the driving element DT of the display area DA includes a gate electrode DG, an active pattern SEM made of a semiconductor, and a first electrode DE1 and a second electrode DE2. Similarly, the driving element DT of the sensing areas SA and CA includes a gate electrode SG, an active pattern SEM made of a semiconductor, and a first electrode SE1 and a second electrode SE2. In the driving element DT, a current I flows through a channel between the first electrode DE1 or SE1 and the second electrode DE2 or SE2 on the active pattern SEM.

The current I flowing through the driving element DT is proportional to the channel ratio W/L of the driving element DT as shown in the following equation. The following equation is the current equation (saturation Ids equation) in the saturation mode of the transistor.

$$I=kw/2L(x-IR)^2(1+\lambda Vds)$$

Here, k is a constant value obtained by multiplying the channel capacity and the charge mobility together. W is the channel width of the transistor, and L is the channel length of the transistor. x is Vgs−Vth, where Vgs is the gate-source voltage of the transistor and Vth is the threshold voltage of the transistor. IR is the IR drop of the pixel driving voltage. λVds is the amount of off current of the transistor.

To compensate for the luminance of the sensing areas SA and CA to the same level as that of the display area DA, the channel ratio W/L of the driving element DT disposed in the sensing areas SA and CA may be further increased. This may be represented as the following equation.

$$I_{DA}=kw/2L(x-IR)^2(1+\lambda Vds)=I_{SA,CA}=kAw/2L(x-IR)^2(1+\lambda Vds)$$

Here, $I_{DA}$ is the current of the driving element DT disposed in the display area DA. $I_{SA,CA}$ is the current of the driving element DT disposed in the sensing area SA or CA. A is a proportional constant value that increases the channel ratio of the driving element DT disposed in the sensing areas SA and CA. To make the luminance of the display area DA and the sensing areas SA and CA uniform, the channel ratio of the driving element DT disposed in the sensing areas SA and CA may be increased by A. To increase the channel ratio W/L by A, the channel ratio of the transistor may be designed such that the channel width W is increased to W' or the channel length L is decreased.

The driving element DT having a larger channel ratio W/L compared to the display area DA may correspond to all the R, G and B subpixels or subpixels of one color in the first sensing area SA. In addition, the driving element DT having a larger channel ratio W/L compared to the display area DA may correspond to all the R, G and B subpixels or subpixels of one color in the second sensing area CA.

The number of G subpixels in the unit pixel areas PG1 and PG2 of the first sensing area SA is one less than that in the unit pixel areas PG1 and PG2 of the display area. Hence, the channel ratio W/L of the driving element DT for driving the light emitting element OLED of the G subpixel in the unit pixel areas PG1 and PG2 of the first sensing area SA may be set to be larger than the channel ratio W/L of the driving element DT disposed in the G subpixel of the display area DA. For example, the channel ratio of the driving element DT disposed in the G subpixel of the first sensing area SA may be designed to be 1.78 times greater than the channel ratio of the driving element DT disposed in the G subpixel of the display area DA.

To compensate for the difference in luminance between the display area DA and the sensing area SA or CA, the emission area of at least one color, for example, a green subpixel may be larger than the emission area of the same color among subpixels disposed in the first unit pixel area.

FIG. 33 is a cross-sectional view illustrating emission areas of display pixels in the display area and the sensing area according to one embodiment. In FIG. 33, the detailed cross-sectional structure of the pixel circuit CPIX is omitted. The encapsulation layer ENCAP may include the inorganic insulating film PAS3 and the planarization layer PCL shown in FIG. 31. "OLED(DA)" is a light emitting element OLED in the display area DA. "CW" indicates the cover glass.

With reference to FIG. 33, the emission area EA1 or EA2 of the light emitting element OLED is determined by the pixel defining film BNK and the anode electrode AND of the light emitting element OLED.

In the present disclosure, to increase the luminance of the sensing areas SA and CA to the same level as that of the display area DA, the emission area EA2 of the sensing area SA or CA may be designed to be larger than the emission area EA1 of the display area DA.

The anode electrode AND of the light emitting element OLED disposed in the sensing areas SA and CA may be larger than the anode electrode AND of the light emitting element OLED disposed in the display area DA. In addition, the opening of the pixel defining film BNK disposed in the sensing areas SA and CA may be larger than that for the light emitting element OLED disposed in the display area DA. At the opening of the pixel defining film BNK, the anode electrode AND may be exposed to contact the organic compound layer EL.

The number of G subpixels in the unit pixel areas PG1 and PG2 of the first sensing area SA is one less than that of the unit pixel areas PG1 and PG2 of the display area. Hence, the emission area EA2 of the G subpixel in the first sensing area SA may be set to be larger than the emission area EA1 of the G subpixel in the display area DA.

Figure 34:
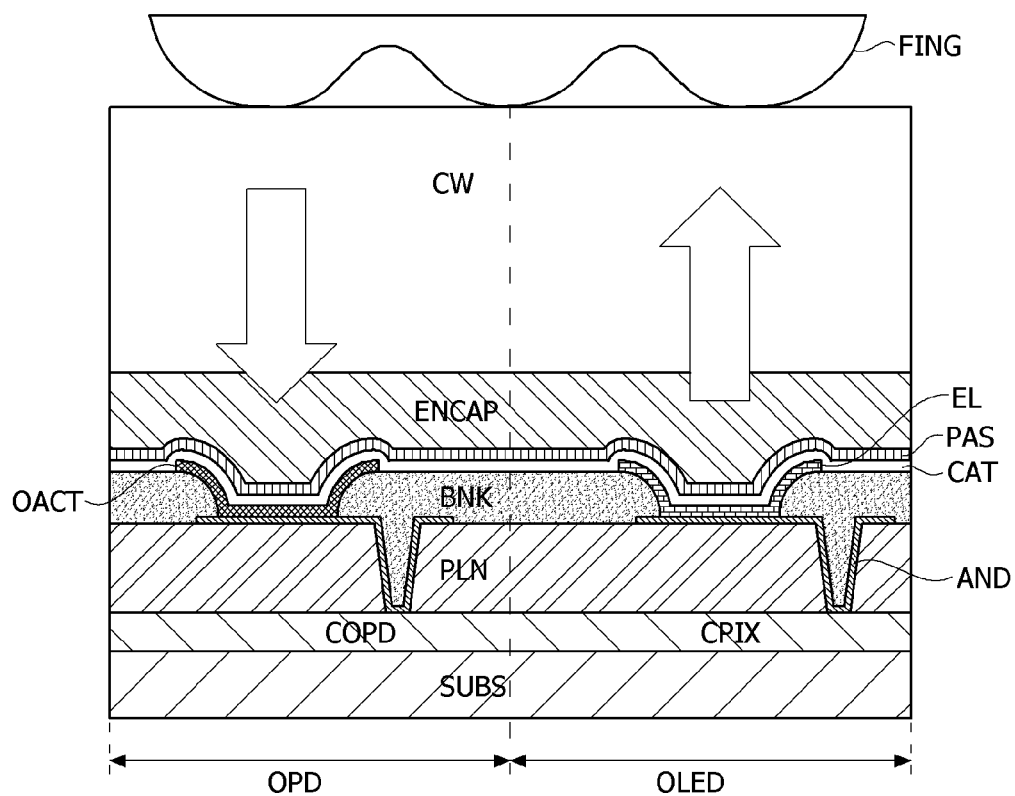
FIG. 34 is a cross-sectional view illustrating a light emitting element and a photodiode in the first sensing area according to an embodiment of the present disclosure.

FIG. 34 is a cross-sectional view illustrating a light emitting element and a photodiode in the first sensing area SA according to one embodiment. In FIG. 34, "OPD" is the organic photodiode of a sensor pixel S. "OACT" indicates an organic compound layer of the organic photodiode. Detailed cross-sectional structures of the sensor driving circuit COPD and the pixel circuit CPIX are omitted.

With reference to FIG. 34, the light emitting element OLED and the organic photodiode OPD are disposed on the same layer in the display panel. The organic photodiode OPD may be replaced with an inorganic photodiode including an inorganic semiconductor layer.

In the fingerprint recognition mode, the G subpixel is driven as a light source to irradiate light toward the fingerprint FING, and the light reflected from the fingerprint FING is incident on the light-receiving surface of the organic photodiode OPD through the opening of the sensor pixel S. The organic photodiode OPD generates a current according to the received light.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display panel comprising:
a plurality of first unit pixel areas in a display area of the display panel; and
a plurality of second unit pixel areas in a first sensing area of the display panel,
wherein each of the plurality of first unit pixel areas includes N subpixels displaying data where N is a positive integer equal to or greater than 3,
wherein each of the plurality of second unit pixel areas includes N−1 subpixels displaying data and the plurality of second unit pixel areas are configured to sense a fingerprint in the first sensing area,
wherein the plurality of first unit pixel areas are arranged at equal intervals in a first direction and a second direction crossing the first direction in a plan view of the display panel,
wherein the plurality of second unit pixel areas are arranged at equal intervals in the first direction and the second direction in the plan view of the display panel,
wherein each of the plurality of first unit pixel areas and each of the plurality of second unit pixel areas have a same size,
wherein each of the plurality of first unit pixel areas is a pixel area in a parallelogram shape or a rhombus shape that is different from the parallelogram shape from a perspective of the plan view of the display panel, and the plurality of second unit pixel areas includes a second unit pixel area in the parallelogram shape from the same perspective of the plan view of the display panel and another second unit pixel area having the rhombus shape that is different from the parallelogram shape from the same perspective of the plan view of the display panel,
wherein each of the second unit pixel area in the parallelogram shape and the other second unit pixel area in the rhombus shape that is different from the parallelogram shape from the same perspective of the plan view of the display panel includes a sensor pixel and subpixels of three different primary colors such that the subpixels include a single instance of each primary color,
wherein the plurality of second unit pixel areas in the first sensing area are configured to display an image associated with the first sensing area, the displayed image guiding a finger of a user to the first sensing area,
wherein each of the plurality of first unit pixel areas includes subpixels of three different primary colors, where two of the subpixels have one color among the three different primary colors and remaining subpixels in the first unit pixel area include a single instance of each remaining primary color, wherein each of the plurality of first unit pixel areas includes two green subpixels, and wherein green subpixels disposed in the plurality of second unit pixel areas are in a same row of subpixels as the sensor pixel and display the data in a display mode, and are driven as a light source in a fingerprint recognition mode.

2. The display panel of claim 1, wherein the sensor pixel includes a photodiode.

3. The display panel of claim 2, wherein light emitting elements of the N−1 subpixels and the photodiode in each of the plurality of second unit pixel areas are disposed on a same layer.

4. The display panel of claim 3, wherein:
the N subpixels of each of the plurality of first unit pixel areas and the N−1 subpixels of each of the plurality of second unit pixel areas include a pixel circuit; and
the pixel circuit includes a light emitting element, and a transistor to supply a current to the light emitting element.

5. The display panel of claim 2, wherein a display resolution or pixels-per-inch (PPI) of the first sensing area is less than a display resolution or PPI of the display area.

6. The display panel of claim 2, further comprising a second sensing area in which a plurality of light transmitting portions are disposed together with the plurality of first unit pixel areas, and wherein adjacent first unit pixel areas in the second sensing area are spaced apart with a light transmitting portion interposed therebetween.

7. The display panel of claim 6, wherein, when a same grayscale data voltage is applied to transistors of the plurality of first unit pixel areas and the plurality of second unit pixel areas, an amount of current flowing through a transistor of the second unit pixel area is greater than an amount of current flowing through a transistor of the first unit pixel area.

8. The display panel of claim 6, wherein a channel ratio of a transistor disposed in the second unit pixel area is greater than a channel ratio of a transistor disposed in the first unit pixel area.

9. The display panel of claim 6, wherein an emission area of at least one subpixel having one color among the N−1 subpixels disposed in the second unit pixel area is larger than an emission area of a subpixel having a same color among the N subpixels disposed in the first unit pixel area.

10. The display panel of claim 6, wherein, when a same grayscale data voltage is applied to transistors of the plurality of first unit pixel areas and the plurality of second unit pixel areas, an amount of current flowing through a transistor disposed at a green subpixel of the second unit pixel area is greater than an amount of current flowing through a transistor disposed at a green subpixel of the first unit pixel area.

11. The display panel of claim 6, wherein a channel ratio of a transistor disposed at a green subpixel of the second unit pixel area is greater than a channel ratio of a transistor disposed at a green subpixel of the first unit pixel area.

12. The display panel of claim 6, wherein an emission area of a green subpixel disposed in the second unit pixel area is larger than an emission area of a green subpixel disposed in the first unit pixel area.

13. The display panel of claim 1, wherein:
the three different primary color subpixels of the plurality of second unit pixel areas are arranged in a zigzag form for each primary color in each of the first direction and the second direction; and sensor pixels are arranged in a zigzag form for each primary color in each of the first direction and the second direction.

14. The display panel of claim 1, wherein:
the sensor pixels are spaced apart at equal intervals in an inclination angle direction between the first direction and the second direction; and
a pitch between adjacent sensor pixels is 80 μm or less.

15. The display panel of claim 14, wherein the sensor pixels are spaced apart at equal intervals in each of the first direction and the second direction.

16. The display panel of claim 15, wherein one green subpixel is disposed between the adjacent sensor pixels in the first direction.

17. The display panel of claim 16, wherein in the first sensing area, a shortest distance between a red subpixel or blue subpixel and a sensor pixel is less than a shortest distance between a green subpixel and the sensor pixel.

18. The display panel of claim 1, wherein:
in the first sensing area, a red subpixel and a blue subpixel are arranged in a zigzag form for each primary color in each of the first direction and the second direction;
green subpixels disposed between adjacent sensor pixels in the first direction of the first sensing area are arranged in a line along the second direction; and
the sensor pixels are arranged in a line along the second direction.

19. The display panel of claim 18, wherein:
the sensor pixels are equally spaced apart by a first distance in the first direction; and
the sensor pixels are equally spaced apart by a second distance less than the first distance in the second direction.

20. A display device comprising:
a display panel that includes a plurality of first unit pixel areas in which N subpixels (N is a positive integer greater than or equal to 3) for displaying data are disposed in a display area of the display panel, and a plurality of second unit pixel areas in which N−1 subpixels for displaying data and fingerprint sensing are disposed in a sensing area of the display panel; and
a display panel driver configured to write the data to the N subpixels and the N−1 subpixels,
wherein the plurality of first unit pixel areas are arranged at equal intervals in a first direction and a second direction crossing the first direction in a plan view of the display panel,
wherein the plurality of second unit pixel areas are arranged at equal intervals in the first direction and the second direction in the plan view of the display panel,
wherein each of the plurality of first unit pixel areas and each of the plurality of second unit pixel areas have a same size, and
wherein each of the plurality of first unit pixel areas is a pixel area in a parallelogram or rhombus shape that is different from the parallelogram shape from a perspective of the plan view of the display panel, and the plurality of second unit pixel areas includes a second unit pixel area in the parallelogram shape from the same perspective of the plan view of the display panel and another second unit pixel area having the rhombus shape that is different from the parallelogram shape from the same perspective of the plan view of the display panel,
wherein each of the second unit pixel area in the parallelogram shape and the other second unit pixel area in the rhombus shape that is different from the parallelogram shape from the same perspective of the plan view of the display panel includes a sensor pixel and subpixels of three different primary colors such that the subpixels include a single instance of each primary color, wherein the plurality of second unit pixel areas in the sensing area are configured to display an image associated with the sensing area, the displayed image guiding a finger of a user to the sensing area, wherein each of the plurality of first unit pixel areas includes subpixels of three different primary colors, where two of the subpixels have one color among the three different primary colors and remaining subpixels in the first unit pixel area include a single instance of each remaining primary color, wherein each of the plurality of first unit pixel areas includes two green subpixels, and wherein green subpixels disposed in the plurality of second unit pixel areas are in a same row of subpixels as the sensor pixel and display the data in a display mode, and are driven as a light source in a fingerprint recognition mode.

21. A mobile terminal comprising:

a display panel that includes a plurality of first unit pixel areas in which N subpixels (N is a positive integer greater than or equal to 3) for displaying data are disposed in a display area of the display panel, and a plurality of second unit pixel areas in which N−1 subpixels for displaying data and one sensor pixel for fingerprint sensing are disposed in a sensing area of the display panel;

a display panel driver configured to write the data to the N subpixels and N−1 subpixels;

a fingerprint recognition processor configured to amplify an output signal of sensor pixels of the plurality of second unit pixel areas, convert the amplified output signal into digital data, and output fingerprint pattern data; and a host system configured to supply data of an input image to the display panel driver, receive the fingerprint pattern data from the fingerprint recognition processor, and process fingerprint authentication, wherein the plurality of first unit pixel areas are arranged at equal intervals in a first direction and a second direction crossing the first direction in a plan view of the display panel, wherein the plurality of second unit pixel areas are arranged at equal intervals in the first direction and the second direction in the plan view of the display panel, wherein each of the plurality of first unit pixel areas and each of the plurality of second unit pixel areas have a same size, and wherein each of the plurality of first unit pixel areas is a pixel area in a parallelogram or rhombus shape that is different from the parallelogram shape from a perspective of the plan view of the display panel, and the plurality of second unit pixel areas includes a second unit pixel area in the parallelogram shape from the same perspective of the plan view of the display panel and another second unit pixel area having the rhombus shape that is different from the parallelogram shape from the same perspective of the plan view of the display panel, wherein each of the second unit pixel area in the parallelogram shape and the other second unit pixel area in the rhombus shape that is different from the parallelogram shape from the same perspective of the plan view of the display panel includes a sensor pixel and subpixels of three different primary colors such that the subpixels include a single instance of each primary color, wherein the plurality of second unit pixel areas in the sensing area are configured to display an image associated with the sensing area, the displayed image guiding a finger of a user to the sensing area, wherein each of the plurality of first unit pixel areas includes subpixels of three different primary colors, where two of the subpixels have one color among the three different primary colors and remaining subpixels in the first unit pixel area include a single instance of each remaining primary color, wherein each of the plurality of first unit pixel areas includes two green subpixels, and wherein green subpixels disposed in the plurality of second unit pixel areas are in a same row of subpixels as the sensor pixel and display the data in a display mode, and are driven as a light source in a fingerprint recognition mode.

* * * * *